US007515718B2

(12) United States Patent
Nguyen et al.

(10) Patent No.: US 7,515,718 B2
(45) Date of Patent: Apr. 7, 2009

(54) SECURED VIRTUAL NETWORK IN A GAMING ENVIRONMENT

(75) Inventors: Binh T. Nguyen, Reno, NV (US); Michael M. Oberberger, Reno, NV (US); Greg Parrott, Reno, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 683 days.

(21) Appl. No.: 11/078,966

(22) Filed: Mar. 10, 2005

(65) Prior Publication Data
US 2005/0192099 A1    Sep. 1, 2005

Related U.S. Application Data

(63) Continuation-in-part of application No. 09/732,650, filed on Dec. 7, 2000, now Pat. No. 7,127,069, and a continuation-in-part of application No. 10/116,424, filed on Apr. 3, 2002, now Pat. No. 7,168,089.

(51) Int. Cl.
*H04L 21/00* (2006.01)
(52) U.S. Cl. ..................................... 380/278
(58) Field of Classification Search .................. 705/59, 705/77; 380/278
See application file for complete search history.

(56) References Cited
U.S. PATENT DOCUMENTS

| 3,931,504 A | 1/1976 | Jacoby |
| 4,430,728 A | 2/1984 | Beitel et al. |
| 4,454,594 A | 6/1984 | Heffron et al. |
| 5,136,644 A | 8/1992 | Audebert et al. |
| 5,155,837 A | 10/1992 | Liu et al. |
| 5,410,703 A | 4/1995 | Nilsson et al. |
| 5,421,009 A | 5/1995 | Platt |
| 5,421,017 A | 5/1995 | Scholz et al. |
| 5,473,772 A | 12/1995 | Halliwell et al. |
| 5,555,418 A | 9/1996 | Nilsson et al. |
| 5,643,086 A * | 7/1997 | Alcorn et al. ................. 463/29 |

(Continued)

FOREIGN PATENT DOCUMENTS

EP    0 689 325    12/1995

(Continued)

OTHER PUBLICATIONS

International Search Report and Written Opinion dated Jul. 19, 2006 from corresponding PCT Application No. PCT/US2006/008785 (11 pages).

(Continued)

*Primary Examiner*—Andrew L Nalven
(74) *Attorney, Agent, or Firm*—Weaver Austin Villeneuve & Sampson LLP

(57) ABSTRACT

A disclosed gaming machine may securely communicate with devices over a public network such as the Internet. The gaming machine utilizes a combination of symmetric and asymmetric encryption that allows a single gaming machine to securely communicate with a remote server using a public network. The secure communication methods may be used to transfer gaming software and gaming information between two gaming devices, such as between a game server and a gaming machine. For regulatory and tracking purposes, the transfer of gaming software between the two gaming devices may be authorized and monitored by a software authorization agent.

160 Claims, 24 Drawing Sheets

U.S. PATENT DOCUMENTS

| | | | |
|---|---|---|---|
| 5,654,746 | A | 8/1997 | McMullan, Jr. et al. |
| 5,671,412 | A * | 9/1997 | Christiano ............... 707/104.1 |
| 5,682,533 | A | 10/1997 | Siljestroemer |
| 5,707,286 | A | 1/1998 | Carlson |
| 5,715,403 | A * | 2/1998 | Stefik ........................ 705/44 |
| 5,715,462 | A | 2/1998 | Iwmoto et al. |
| 5,759,102 | A | 6/1998 | Pease et al. |
| 5,761,647 | A | 6/1998 | Boushy |
| 5,762,552 | A | 6/1998 | Vuong et al. |
| 5,768,382 | A | 6/1998 | Schneier et al. |
| 5,770,533 | A | 6/1998 | Franchi |
| 5,779,545 | A | 7/1998 | Berg et al. |
| 5,836,817 | A | 11/1998 | Acres et al. |
| 5,845,077 | A | 12/1998 | Fawcett |
| 5,845,090 | A | 12/1998 | Collins et al. |
| 5,848,064 | A | 12/1998 | Cowan |
| 5,851,149 | A | 12/1998 | Xidos et al. |
| 5,870,723 | A | 2/1999 | Pare, Jr. et al. |
| 5,885,158 | A | 3/1999 | Torango et al. |
| 5,896,566 | A | 4/1999 | Acerbuch et al. |
| 5,905,523 | A | 5/1999 | Woodfield et al. |
| 5,925,127 | A * | 7/1999 | Ahmad ........................ 726/31 |
| 5,970,143 | A | 10/1999 | Schneier et al. |
| 5,999,808 | A * | 12/1999 | LaDue .................... 455/412.2 |
| 6,002,772 | A | 12/1999 | Saito |
| 6,006,034 | A | 12/1999 | Heath et al. |
| 6,029,046 | A | 2/2000 | Khan et al. |
| 6,047,128 | A | 4/2000 | Zander |
| 6,052,512 | A * | 4/2000 | Peterson et al. ............. 709/220 |
| 6,099,408 | A | 8/2000 | Schneier et al. |
| 6,104,815 | A | 8/2000 | Alcorn et al. |
| 6,106,396 | A * | 8/2000 | Alcorn et al. ................. 463/29 |
| 6,125,185 | A * | 9/2000 | Boesch ....................... 380/285 |
| 6,149,522 | A | 11/2000 | Alcorn et al. |
| 6,154,878 | A | 11/2000 | Saboff |
| 6,165,072 | A * | 12/2000 | Davis et al. .................... 463/29 |
| 6,169,976 | B1 * | 1/2001 | Colosso ........................ 705/59 |
| 6,178,510 | B1 | 1/2001 | O'Connor et al. |
| 6,253,374 | B1 | 6/2001 | Dresevic et al. |
| 6,264,561 | B1 | 7/2001 | Saffari et al. |
| 6,270,410 | B1 | 8/2001 | DeMar et al. |
| 6,272,223 | B1 | 8/2001 | Carlson |
| 6,285,868 | B1 | 9/2001 | LaDue |
| 6,285,886 | B1 | 9/2001 | Kamel et al. |
| 6,317,827 | B1 | 11/2001 | Cooper |
| 6,364,769 | B1 * | 4/2002 | Weiss et al. ................... 463/29 |
| 6,368,219 | B1 | 4/2002 | Szrek et al. |
| 6,446,257 | B1 | 9/2002 | Pradhan et al. |
| 6,449,687 | B1 | 9/2002 | Moriya |
| 6,453,319 | B1 | 9/2002 | Mattis et al. |
| 6,454,648 | B1 | 9/2002 | Kelly et al. |
| 6,508,709 | B1 | 1/2003 | Karmarkar |
| 6,508,710 | B1 * | 1/2003 | Paravia et al. ................. 463/42 |
| 6,519,730 | B1 * | 2/2003 | Ando et al. ................. 714/746 |
| 6,574,612 | B1 | 6/2003 | Baratti et al. ................. 705/59 |
| 6,805,634 | B1 * | 10/2004 | Wells et al. ................... 463/42 |
| 7,043,641 | B1 | 5/2006 | Martinek et al. |
| 7,260,834 | B1 | 8/2007 | Carlson |
| 2002/0045477 | A1 | 4/2002 | Dabrowski |
| 2002/0049909 | A1 | 4/2002 | Jackson et al. |
| 2002/0116615 | A1 | 4/2002 | Nguyen et al. |
| 2002/0071557 | A1 | 6/2002 | Nguyen |
| 2002/0137217 | A1 | 9/2002 | Rowe |
| 2002/0155887 | A1 | 10/2002 | Criss-Puszkiewicz et al. |
| 2003/0054880 | A1 | 3/2003 | Lam et al. |
| 2003/0064771 | A1 | 4/2003 | Morrow et al. |
| 2003/0188306 | A1 | 10/2003 | Harris et al. |
| 2004/0002385 | A1 | 1/2004 | Nguyen |
| 2004/0209660 | A1 | 10/2004 | Carlson et al. |
| 2005/0192099 | A1 | 3/2005 | Nguyen et al. |

FOREIGN PATENT DOCUMENTS

| | | |
|---|---|---|
| EP | 0 706 275 | 4/1996 |
| EP | 0715245 A1 | 6/1996 |
| EP | 0744786 | 11/1996 |
| EP | 0 841 615 | 5/1998 |
| EP | 0 905 614 | 3/1999 |
| EP | 1 004 970 | 5/2000 |
| EP | 1061430 A1 | 12/2000 |
| EP | 1074955 A2 | 2/2001 |
| WO | WO 95/24689 | 9/1995 |
| WO | WO 96/00950 | 1/1996 |
| WO | WO 99/01188 | 1/1999 |
| WO | WO 01/20424 | 3/2001 |
| WO | 02/05229 A2 | 1/2002 |
| WO | WO 03/085613 | 10/2003 |

OTHER PUBLICATIONS

Hiroaki Higaki, "Group Communication Algorithm for Dynamically Updating in Distributed Systems" Copyright 1994 IEEE International Conference on Parallel and Distributed Systems (pp. 56-62) 08-8186-655 Jun. 1994, higaki@sdesun.slab.ntt.jp.

Steffen Hauptmann et al., "On-line Maintenance with On-the-Fly Software Replacement" Copyright 1996 IEEE Proceedings, Third International Conference on Configurable Distributed Systems, (pp. 70-80) 0-8186-7395 Aug. 1996.

Hiroaki Higaki, "Extended Group Communication Algorithm for Updating Dynamically Programs" Copyright 1996, IEEE, International Conference on Parallel and Distributed Systems 08-8186-7267 Jun. 1996, hig@takilab.k.dendai.as.jp.

Non-final Office Action dated for U.S. Appl. No. 09/732,650 dated May 20, 2004.

Final Office Action for U.S. Appl. No. 09/732,650 dated Feb. 25, 2005.

Non-final Office Action for U.S. Appl. No. 09/732,650 dated Jun. 8, 2005.

Notice of Allowance for U.S. Appl. No. 09/732,650 dated May 20, 2004.

Non-final Office Action for U.S. Appl. No. 10/116,424 dated Feb. 8, 2006.

Notice of Allowance for U.S. Appl. No. 10/116,424 dated Sep. 18, 2006.

Non-Final Office Action for U.S. Appl. No. 11/078,966 dated May 13, 2008.

International Search Report dated Aug. 7, 2003 from corresponding PCT Application No. PCT/US2003/09669, 7 pages.

Written Opinion dated Nov. 5, 2003 from corresponding PCT Application No. PCT/US2003/09669, 3 pages.

Office Action for AU Patent Application 97154/01 dated Sep. 29, 2005.

Office Action for EP Patent Application 06 737 915.6-2221 dated Jul. 8, 2008.

Russian Office Action dated Jan. 25, 2007 from related RU Application No. 2004129600.

Russian Office Action dated Jul. 5, 2007 from related RU Application No. 2004129600.

Russian Office Action dated Jan. 21, 2008 from related RU Application No. 2004129600.

European Office Action dated Nov. 23, 2007 from related EP Application No. 06737915.6.

Allowed Claims for U.S. Appl. No. 09/732,650.

Allowed Claims for U.S. Appl. No. 10/116,424.

Australian Office Action dated Jul. 3, 2008 from related AU Application No. 2003231979.

* cited by examiner

SECURED VIRTUAL NETWORK IN A GAMING ENVIRONMENT

CROSS-REFERENCE TO RELATED APPLICATIONS

This application is a continuation-in-part of U.S. patent application Ser. No. 09/732,650 entitled "SECURED VIRTUAL NETWORK IN A GAMING ENVIRONMENT", filed Dec. 7, 2000, now U.S. Pat. No. 7,127,069 by Nguyen et al., which is incorporated herein by reference in its entirety and for all purposes and this application is a continuation-in-part of U.S. patent application Ser. No. 10/116,424, filed Apr. 3, 2002 now U.S. Pat No. 7,168,089 and entitled "SECURED VIRTUAL NETWORK IN A GAMING ENVIRONMENT," by Nguyen et al, which is incorporated herein by reference in its entirety and for all purposes.

BACKGROUND OF THE INVENTION

This invention relates to game playing services for gaming machines such as slot machines and video poker machines. More particularly, the present invention relates to providing methods of communication for game services such as licensing and accounting on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, such as bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

The operations described above may be carried out on the gaming machine when the gaming machine is operating as a "stand alone" unit or linked in a network of some type to a group of gaming machines. As technology in the gaming industry progresses, more and more gaming services are being provided to gaming machines via communication networks that link groups of gaming machines to a remote computer that provides one or more gaming services. As an example, gaming services that may be provided by a remote computer to a gaming machine via a communication network of some type include player tracking, accounting, cashless award ticketing, lottery, progressive games and bonus games.

Typically, network gaming services enhance the game playing capabilities of the gaming machine or provide some operational advantage in regards to maintaining the gaming machine. Thus, network gaming services provided to groups of gaming machines linked over a dedicated communication network of some type have become very popular in the gaming industry. In general, the dedicated communication network is not accessible to the public. To justify the costs associated with the infrastructure needed to provide network gaming services on a dedicated communication network, a certain critical number of gaming machines linked in a network of some type must utilize the service. Thus, many of the network gaming services are only provided at larger gaming establishments where a large number of gaming machines are deployed.

A progressive game network offering progressive game services is one example where a group of gaming machines are linked together using a dedicated network to provide a network gaming service. The progressive game services enabled by the progressive game network increase the game playing capabilities of a particular gaming machine by enabling a larger jackpot than would be possible if the gaming machine was operating in a "stand alone" mode. The potential size of the jackpot increases as the number gaming machines connected in the progressive network is increased. The size of the jackpot tends to increase game play on gaming machines offering a progressive jackpot which justifies the costs associated with installing and maintaining the dedicated progressive game network.

Within the gaming industry, a particular gaming entity may desire to provide network gaming services and track the performance of all the gaming machines under the control of the entity. The gaming machines under the control of a particular entity may be globally distributed in many different types of establishments. Casinos, convenience stores, supermarkets, bars and boats are a few examples of establishments where gaming machines may be placed.

FIG. 1 is a block diagram depicting gaming machines distributed in different establishments partially connected by a dedicated communication network for a typical gaming entity currently operating in the gaming industry. In FIG. 1, the gaming entity utilizes a central office 142. The gaming machines, 102, 104, 106, 114, 116, 136 and 138 for the gaming entity are located in two casinos, 110 and 122, and a store 140. A gaming entity may operate hundreds, thousands or ten of thousands of gaming machines. Since gaming is allowed in many locations throughout the world, the two casinos, 110 and 122, the central office 142 and the store may be distributed over a wide geographic area. For instance, the casino 110 may be located in Atlantic City, N.J., the casino 122 may be located in Australia, the central office may be located in Las Vegas, Nev. and the store may be located in Reno, Nev.

Within the casinos, the gaming machines may be connected to one or more database servers via one or more dedicated networks. The database servers are usually located in the backroom of the casino. For instance, in casino 110, gaming machines 102, 104 and 106 are connected to a database server 100 via a dedicated network 108. The dedicated network 108 may be used to send accounting information and player tracking information from the gaming machines to the database server 110. In casino 122, the gaming machines 114, 116, 118 may send accounting information and player tracking information to a database server using the dedicated network 120. Other dedicated networks (not shown) in casinos, 110 and 112, may provide such network gaming services as bonus game play, progressive game play and cashless ticketing.

In casinos 110 and 122, the database servers 100 and 112 may store and process accounting data from the gaming machines in communication with the database servers. For instance, an accounting report detailing the performance of individual and groups of gaming machines may be generated from the data stored on the database servers 100 and 112. In addition, accounting data or reports may be sent to the database server 124 in the central office 142 from each casino. These reports may contain game performance data collected from a number of gaming machines as well as hotel operations data. The data from the casinos may be sent to the central office using an expensive dedicated leased line 132 using a frame relay network.

The database server 124 may be used to generate reports summarizing the performance of all the gaming machines within the gaming entity (e.g. casino 110, casino 122 and store 140). The reports may be accessed locally using the local access points 126 and 128 via the local network. In addition, reports may be remotely accessed using a dial in number for a limited number of users. For instance, an executive travelling on the road might view gaming machine performance data from the remote access point 134 where the remote access point 134 may be a hotel room.

For the store 140, the gaming machines, 136 and 138 may be leased by the store operator. However, the cost of a dedicated communication network for a small number of gaming machines is usually not justified. Thus, the gaming machines operate in a "stand alone" mode. While operating in "stand alone" mode, network gaming services are not available to these gaming machines. To obtain performance data for the gaming machines, 136 and 138, a route operator may regularly extract performance data from the machines and manually transmit the information to the central office 142. A route may consist of a number gaming machines located in various locations such as bars, convenience stores and supermarkets. Usually, the route operator manually extracts performance data for all of the gaming machines located on their route. For a large route, this process may be both time consuming and costly.

Within the gaming industry, there is some desire to provide centralized network gaming services, centralized data access and centralized data acquisition to all of the gaming machines or a larger proportion of gaming machines within a gaming entity. For the casinos, 110 and 122, the gaming machines are connected via local dedicated networks that do not generally allow, for security reasons, the gaming machines to communicate with devices located outside of the casino. For instance, in FIG. 1, the database server 124 may not directly communicate with gaming machine 102 or gaming machine 114. Further, as described above, a dedicated network is usually not cost effective for smaller gaming establishments. Thus, with the communication infrastructure described in FIG. 1 which is representative of the communication infrastructure currently available in the gaming industry, the implementation of centralized network gaming services, such as centralized data acquisition may be difficult.

A current barrier to providing centralized network gaming services and centralized data acquisition for gaming machines diversely distributed throughout a gaming entity is the complexity and costs of the dedicated communication networks currently used in the gaming industry. The costs of installing and maintaining a dedicated communication network typically limit the application of dedicated networks to large establishments with a large number of gaming machines. Further, even in the larger establishments, the dedicated network are usually only implemented locally and centralized network gaming services (e.g. from a central office) are usually not provided. In view of the above, it would be desirable to provide gaming communication methods for gaming machines that reduce the complexity of the gaming network environment, reduce the costs associated with adding new network gaming services and simplify the data acquisition process for gaming machines widely distributed within a gaming entity.

Another desire within the gaming industry is to electronically download gaming software from one or more remote locations to a gaming machine. The capability to electronically download gaming software is desirable because it may enable gaming machines to be quickly reconfigured to account for changes in popularity of various games played on the gaming machines and it may simplify software maintenance issues on the gaming machine such as gaming software updates. Currently, in a time consuming process, gaming software is manually loaded onto each gaming machine by a technician. The software is manually loaded because the gaming software is usually very highly regulated and in most gaming jurisdictions only approved gaming software may be installed on a gaming machine. Further, the gaming software is manually loaded for security reasons to prevent the source code from being obtained by individuals which might use the source code to try to find ways of cheating the gaming machine. In view of the above, it would be desirable to provide gaming software downloading methods for gaming machines that allow gaming software to be transferred electronically to the gaming machines from a remote location in a secure manner that satisfies regulatory requirements of the gaming jurisdiction where the gaming machine is located.

SUMMARY OF THE INVENTION

This invention addresses the needs indicated above by providing gaming machines that may securely communicate with devices over a public network such as the Internet. The invention provides a combination of symmetric and asymmetric encryption that allows a single gaming machine to securely communicate with a remote server using a public network. The secure communication methods may be used to transfer gaming software and gaming information between two gaming devices such as between a gaming machine and a game server. For regulatory and tracking purposes, the transfer of gaming software between the two gaming devices may be authorized and monitored by a software authorization agent One aspect of the invention provides a gaming machine including wagering on a game of chance. The gaming machine may be generally characterized as comprising: 1) a master gaming controller designed or configured i) to generate a game of chance played on the gaming machine by executing a plurality of game software modules including a first game software module and a second game software module where the first game software module may be executed according to rules specified in a first license; ii) to validate that the first game software module is being used according to the rules specified in the first license; iii) to request a first license token from a first remote gaming device for the first game software module; iv) to download from a second remote gaming device the second game software module; 2) a memory device for storing the plurality of game software modules; 3) a trusted memory device for storing authentication logic used to determine that the plurality of game software modules are authorized for use on the gaming machine; 4) a gaming operating system comprising logic to load and unload the plurality of game software modules into a RAM from the memory device and to control the play of the game of chance; 5) a non-volatile memory for storing state information where during play of the game of chance the gaming machine advances between a plurality of states and stores the state information for each of the plurality of states to the non-volatile memory and where when a malfunction occurs between a first state and a second state in the plurality of states the gaming machine is operable to restore itself to the first state using the state information for the first state stored in the non-volatile memory; 6) an input device for receiving cash or indicia of credit used for the wagering; 7) an output device for outputting cash or indicia of credit; 8) a display for displaying a presentation of the game of chance; and 9) a network interface for communicating with the first remote gaming device or the second remote gaming device.

In particular embodiments, the first remote gaming device or the second remote gaming device may be a first gaming machine operable to provide wagering on a first game of chance in a casino. The first gaming machine may include a housing, a first input device coupled to the housing for receiving the cash or the indicia of credit, a first output device coupled to the housing for outputting the cash or indicia and a first display for displaying the first game of chance. Further, the first remote gaming device or the second remote gaming device may be selected from a group consisting of a billing/accounting server, a player tracking server, a gaming machine, a wireless mobile gaming device, a game play hosting server and a game software hosting server. The first gaming device and the second gaming device may be the same gaming device.

In other embodiments, the memory device may store game software modules that require a license token. The first license token may be required to execute the game of chance. The master gaming controller may be further designed or configured to determine which of the game software modules requires the license token. The executable logic may be embedded in the first game software module or may be stored on the trusted memory device.

The gaming machine may further comprise executable logic for determining a response when the first license token is not available for the first game software module. The response may be one or more of 1) sending a message notifying an operator or user of the gaming machine that the license token is not available, 2) preventing execution of the second game software module, 3) disabling one or more features of the second game software module, 4) altering an output of data from the second game software module and 5) combinations thereof.

In yet other embodiments, the gaming machine may be operable to execute a plurality of instances of the game of chance. A first instance of the game of chance may require a license token for execution and a second instance of the game of chance may not require any license token. Further, a request may be made for the first instance of the game of chance and in response to the license token not being available for the first instance, the second instance of the game chance may be executed. A first instance of the game of chance may be executed according to rules specified in the first license and a second instance of the game of chance is executed according to rules specified in a second license different from the first license where the first instance of the game of chance is from a first game software content provider and where the second instance of the game of chance is from a second game software content provider.

A first instance of the game of chance and a second instance of the game of chance may share a common license. Further, the master gaming controller may be designed or configured to track usage information for each of the plurality of instances of the game of chance. In addition, the master gaming controller may be designed or configured to report the usage information to the first remote gaming device or the second remote gaming device.

In a particular embodiment, the master gaming controller, the first remote gaming device or the second remote gaming device may be further designed or configured to determine a licensing cost for playing the game of chance. The licensing cost is based upon one or more of 1) a popularity of the game of chance, 2) a time that the game of chance is played, 3) a wager amount that is made on the game of chance, 4) a type of gaming machine on which the game of chance is played, 5) a location in the casino of the gaming machine, 6) a fixed cost per game, 7) a fixed cost per game that varies as a function of time, 8) a fixed cost per game that varies according to a total number of times the game of chance has been played on the gaming machine, 9) a number of games of chance that are being played on the gaming machine simultaneously, 10) player information of a player playing the game of chance, 11) whether the gaming machine is linked to other gaming machines, 12) whether the gaming machine is linked to a progressive system, 13) whether the gaming machine is linked to a bonus system, 14) whether the gaming machine is linked to a central determination system, 15) a denomination of the game, 16) a fixed cost per game that varies according to a total number times the game of chance has been played on a group of gaming machines, 17) a discount provided to the gaming machine operator and 18) combinations thereof.

In other embodiments, the RAM may be loaded with two or more game software modules that are executed according to rules specified in two or more different licenses. Also, the RAM may be loaded with two or more game software that each use a different license token. The identity of the remote gaming device may be authenticated using a zero knowledge proof. The master gaming controller may be further designed or configured to request a product activation code from a remote gaming device for the first game software module. The master gaming controller may also be designed or configured to determine its game software configuration and send information describing its game software configuration to the remote gaming device.

The gaming machine may be part of a gaming system including a plurality of gaming machines where only a limited number of license tokens including the first license token are available to the gaming machines in the gaming system. The gaming machine may be part of a gaming system including a plurality of gaming machines where only a limited number of copies of the second game software module are allowed to exist in the gaming system. The master gaming controller may be further designed or configured to determine whether one or more of the plurality of game software modules is permitted in a gaming jurisdiction where the gaming machine is located. Also, the master gaming controller may be designed or configured to determine whether a software configuration comprising one or more software configuration parameters for the plurality of game software modules is permitted in a gaming machine jurisdiction where the gaming machine is located.

In additional embodiments, the gaming machine may be part of a gaming system comprising a plurality of gaming devices including the first remote gaming device and the second remote gaming device where a copy of the second game software module is stored on at least one of the plurality of gaming devices and where the master gaming controller is further designed or configured to find the copy of the second game software module in the gaming system. In addition, the gaming machine may be operable to find the copy of the second game software module by requesting device identification information for a first gaming device storing the copy of the second game software module from a second gaming device. Further, the gaming machine may be operable to contact the second gaming device using the device identification information received from the first gaming device and to request a download of the second game software module.

The gaming machine may be part of a gaming system comprising a plurality of gaming devices including the first remote gaming device and the second remote gaming device where a copy of the second game software module is stored on a portion of the plurality of gaming devices where the master gaming controller is designed or configured to select between two or more of the gaming devices storing the second game software module and to request a download of the second game software module from the selected gaming device. The selection between the two or more of the gaming devices storing the second game software module may be based upon one or more of a) a load status of each of the gaming devices, b) a traffic load on a network connecting the gaming machine to the two or more gaming devices, c) a distance over a network between the gaming machine and each of the gaming devices and d) combinations thereof.

In yet other embodiments, the master gaming controller may be operable to render on the display a list comprising one or more of 1) instances of the game of chance available for play on the gaming machine, 2) instances of bonus games available for play on the gaming machine and 3) instances of progressive games available for play on the gaming machine. The download of the second game software module may be initiated in response to the master gaming controller receiving a selection from the list. Further, the request for the first license token may be initiated in response to the master gaming controller receiving a selection from the list.

In particular embodiments, the first license may include one or more expiration limits after which the first license expires. The one or more expiration limits may be selected from the group consisting of a date, an interval of time and a number of uses. The master gaming controller may be designed or configured to determine whether the one or more of the expiration limits have been exceeded. Further, the master gaming controller may be designed or configured to request a new license when the first license is near expiration or has expired.

In an additional embodiment, the first game software module may include a software certificate that is attached to or integrated into the first game software module where the software certificate comprises one or more of 1) licensing rules specified in the first license, 2) jurisdictional rules specifying use limitations in different gaming jurisdictions for the first game software module, 3) duplication rules specifying copying restrictions for the first game software module, 4) movement rules for determining whether the first game software module can be moved to another gaming device, 5) location rules specifying types of gaming devices allowed to store and execute the first game software module, 6) a download history for the first game software module, 7) an usage history for the first game software module and 8) combinations thereof. The master gaming controller may be further designed or configured to perform one or more of 1) periodically update the software certificate with usage information describing usage of the first game software module on the gaming machine, 2) to send information stored on the software certificate to a remote gaming device, 3) to request a new software certificate for the first game software module, 4) to authenticate a validity of the software certificate and 5) to generate a unique digital signature for the software certificate using at least information from the usage history stored on the software certificate.

In other embodiments, the master gaming controller may be further designed to receive a request for a copy of the first game software module from a remote gaming device where the remote gaming device may be a first gaming machine providing the play of a wagering game of chance. In response to receiving the request, the first gaming machine may be operable to generate the copy of the first game software module and send the copy to the remote gaming device. Further, after the copy is sent to the remote gaming device, the gaming machine may be operable to delete the copy of the first game software module stored on the gaming machine.

In additional embodiments, the master gaming controller is further designed or configured, prior to the download of the second game software module, to notify of the second remote gaming device of its hardware and software capabilities. The master gaming controller may be further designed or configured, prior to the download of the second game software module, to request a specific version of the second game software module that it is compatible with the gaming machine. The master gaming controller may be further designed or configured, after the download of the second game software module, to determine whether the second game software module is compatible with the gaming machine.

Another aspect of the invention pertains to computer program products including a machine-readable medium on which are stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Gaming Machine

Figure 2:
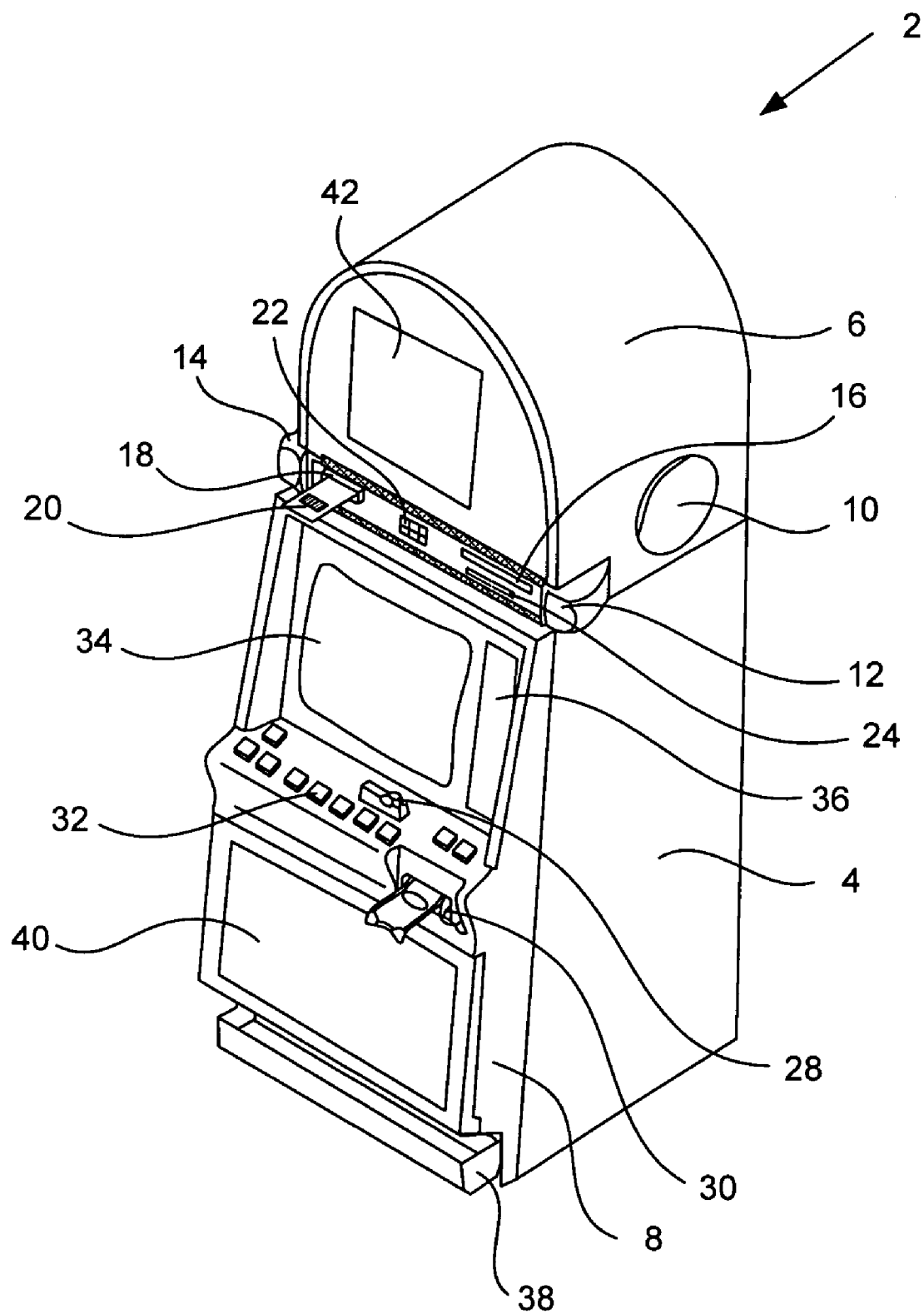
FIG. 2 is a perspective drawing of a gaming machine having a top box and other devices.

Turning first to FIG. 2, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video blackjack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIGS. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Figure 1:
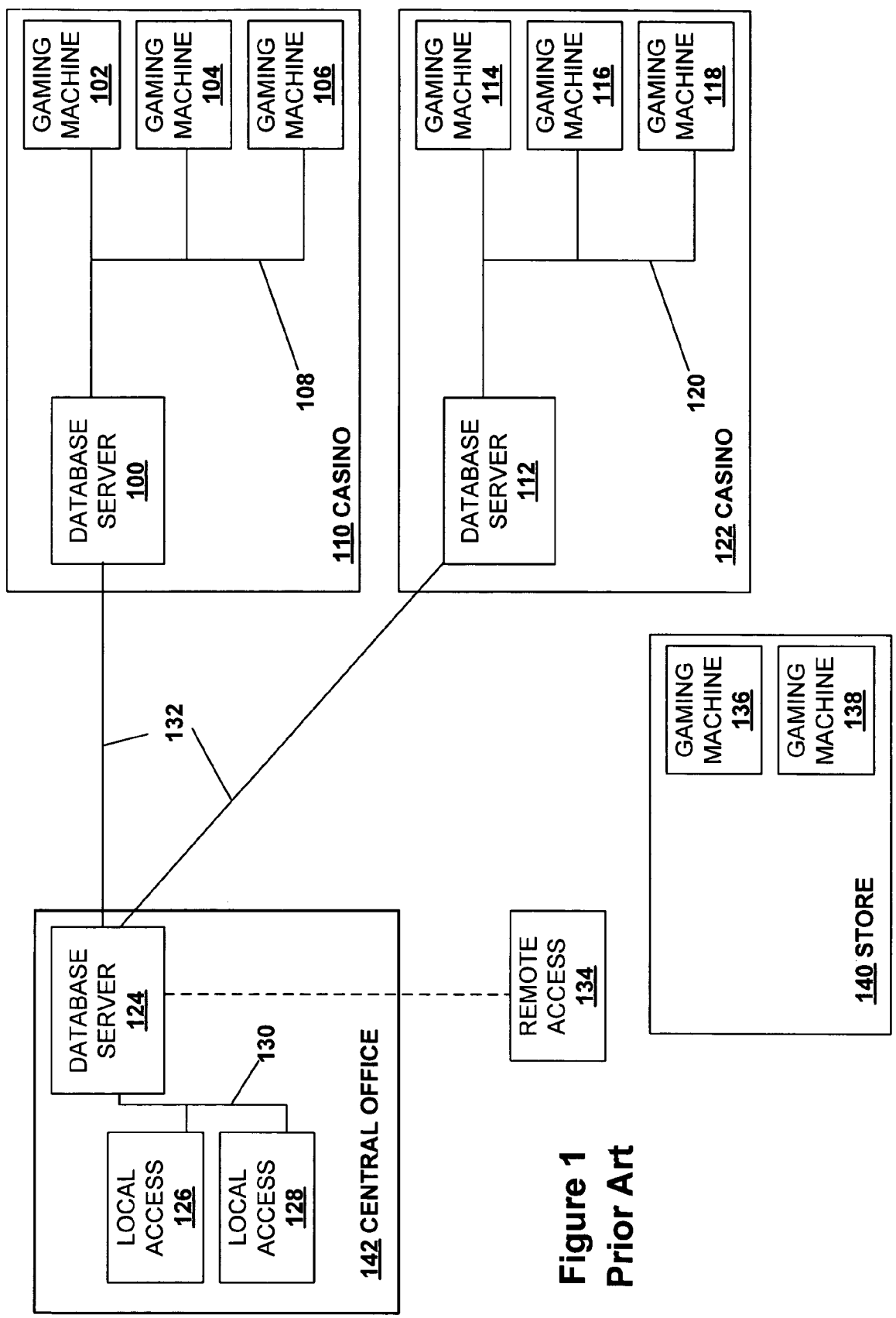
FIG. 1 is a block diagram depicting gaming machines distributed in different establishments partially connected by a dedicated communication network for a typical gaming entity currently operating in the gaming industry.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Virtual Public Private Networks (VPNs) and Remote Licensing Via VPNs

Figure 3:
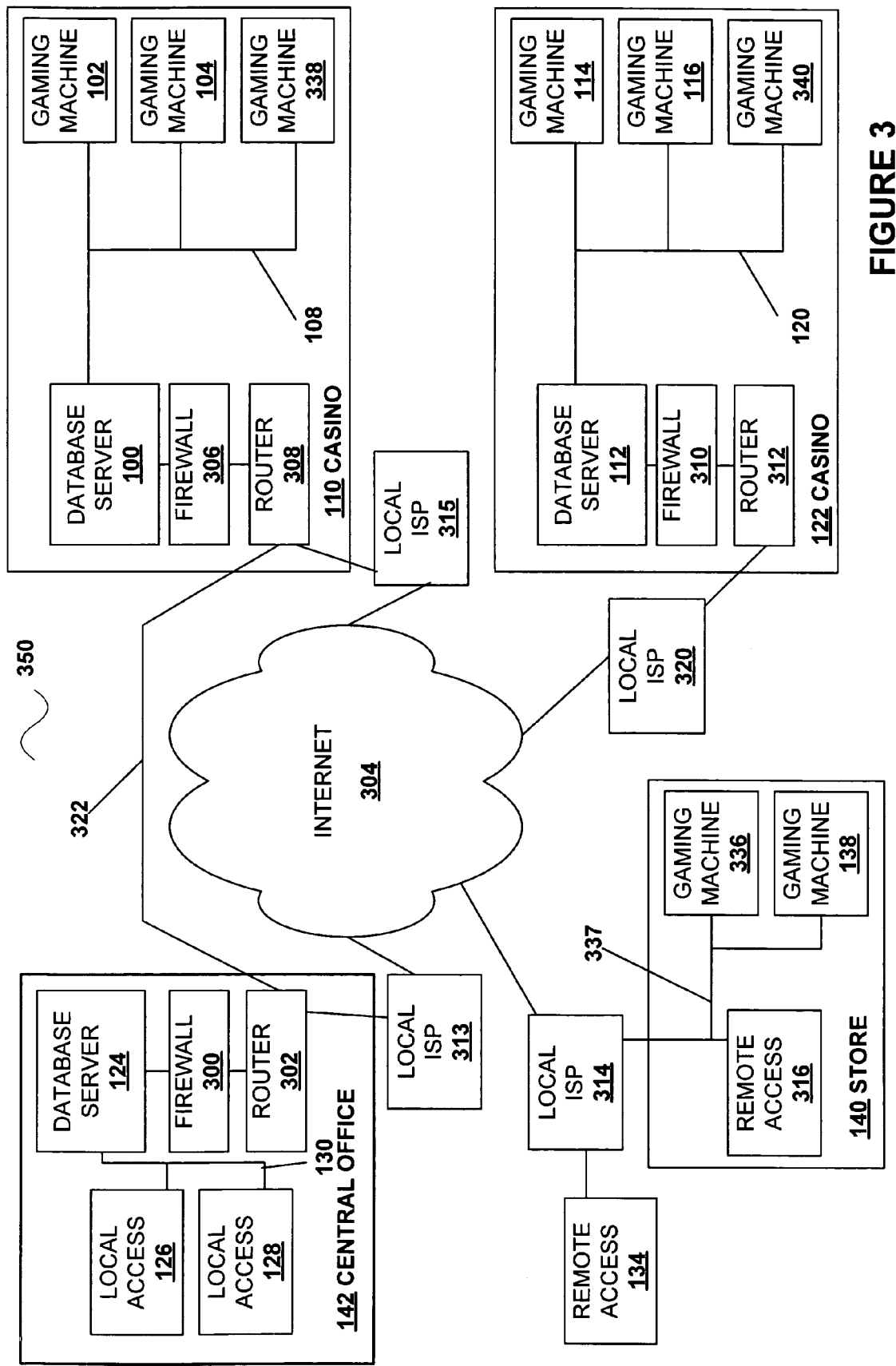
FIG. 3 is a block diagram depicting gaming machines distributed in different establishments connected using a secure virtual network.

FIG. 3 is a block diagram depicting gaming machines distributed in different establishments connected using a secure virtual network. Using the secure virtual network, network gaming services, data acquisition and data access may be provided to a large number of gaming machines distributed throughout a gaming entity 350 from a central location such as the central office 142. These services may be provided to gaming machines that have traditionally operated in a "stand alone" mode such as gaming machine 336 and 138 in the store 140. In FIG. 3, some of the communication infrastructure necessary to implement a secure virtual network for one embodiment of the present invention are described.

In one embodiment, the secured virtual network may be an IP based Virtual Private Networks (VPNs). An Internet-based virtual private network (VPN) uses the open, distributed infrastructure of the Internet to transmit data between corporate sites. A VPN may emulate a private IP network over public or shared infrastructures. A VPN that supports only IP traffic is called an IP-VPN. Virtual Private Networks provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols including RFC reports may be found from the VPN Consortium an industry trade group (http://www.vpnc.com, VPNC, Santa Cruz, Calif.).

In FIG. 3, a number of embodiments of IP VPN services are implemented to allow connectivity between the various gaming machines and database servers in the gaming entity. For instance, the gaming machine 336 in the store 140 may directly communicate with the database server 124 in the central office 142 via the Internet 304. The communication path between the gaming machine 336 and the database server 124 may be the local ISP 314, a number of routers on the Internet 304, a local ISP 313 accessed by the central office 142, the router 302 and the firewall 300. The firewall may be hardware, software or combinations of both that prevent illegal access of the gaming machine by an outside entity connected to the gaming machine. For instance, an illegal access may be an attempt to plant a program in the database server that alters the operation of the database server or allows someone to steal data. The internal firewall is designed to prevent someone such as a hacker from gaining illegal access to the gaming machine and tampering with it in some manner.

Firewalls and routers used in FIG. 3 may be provided by CISCO Systems (San Jose, Calif.).

The network interface between the gaming machine 336 and the local ISP may be a wireline interface, such as a wired Ethernet connection, a wired ATM connection, or a wired frame relay connection, or a wireless interface, such as a wireless cellular interface. For instance, the gaming machine 336 may include a wireless modem and an antenna that allows the gaming machine to connect with the local ISP 314. As another example, the gaming machine may contain a dial-in modem, a DSL modem or a cable modem that allows that gaming machine 336 to connect with the local ISP 314 via a coaxial cable or phone line 337. The gaming machine 336 may also contain an internal firewall to prevent illegal access to the gaming machine. Other gaming machines, such as 338 and 340, located at various locations throughout the gaming entity 350 may also include the hardware described above and transmit information via a local ISP, such as 315 and 320, and the Internet 304, to a remote server such as the database server 124 in the central office 142.

Using the network interface, the gaming machine 336 may send game performance data, game usage information and gaming machine status information or any other information of interest generated on the gaming machine from one or more gaming transactions to the database server 124 located in the central office or some other remote server. Using this method, the need to manually gather data from the gaming machine using a route operator may be eliminated, which may reduce gaming machine operating costs and may provide better tracking of the performance of gaming machines, such as 336, that have traditionally operated in a "stand alone" mode.

For security purposes, any information transmitted from the gaming machine 336 over a public network to a remote server may be encrypted. The encryption may be performed by the master gaming controller or by another logic device located on the gaming machine. In one embodiment, the information from the gaming machine may be symmetrically encrypted using a symmetric encryption key where the symmetric encryption key is asymmetrically encrypted using a private key. The public key may be obtained by the gaming machine 336 from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. In addition, a different symmetric encryption key is used for each transaction where the key is randomly generated. Symmetric encryption and decryption is applied to most of the information because symmetric encryption algorithms tend to be 100-10,000 faster than asymmetric encryption algorithms.

Information needed to apply the encryption algorithm such as private keys and public keys may be stored on a memory residing in the gaming machine 336 where the memory may be a flash memory, an EPROM, a non-volatile memory, a ROM, a RAM, a CD, a DVD, a tape drive, a hard drive or other memory storage device. Typically, the public keys are stored on a writeable media such as a hard drive while the private keys are stored on a read only memory such as an EPROM or a CD-ROM. The same or a different memory residing on the gaming machine 336 may also include information used to authenticate communications between the gaming machine 336 and a remote server, such as 124. For instance, a serial number or some other identification numbers may be used by the firewall 300 or the database server 124 to authenticate the sender of a message.

The encrypted communications from the gaming machine 336 to a remote server may be implemented using a TCP/IP communication protocol. Thus, the encrypted information from the gaming machine may be encapsulated in multiple information packets and sent to the IP address and/or an unique ID (UID) of a remote server. The gaming machine 336 may contain a memory storing a number of IP addresses and/or unique IDs (UIDs) of remote servers or other devices where the gaming machine may send information. Prior to sending a message, the gaming machine may look up the IP address and/or the UID of the remote server or destination device.

For each information packet, the gaming machine may generate one or more signatures and may append them to the information packet. The signature may allow the recipient of the packet to unambiguously identify the sender of the packet as well as to determine if the correct amount of data was received. For instance, the signature may include a checksum of the data that was sent. Further, the information packet may contain routing information allowing subsequent communication with the gaming machine, such as an IP address and/or an UID of the gaming machine. General details of these types of processes, such as TCP/IP implementation and data authentication, are described in the text "Mobile IP Unplugged" by J. Solomon, Prentice Hall and the text "Computer Networks", A. S. Tanenbaum, Prentice Hall. Both of these references are incorporated herein by reference in their entireties and for all purposes.

Using the communication infrastructure and methods described above a gaming machine or other device connected to a remote server may request one or more gaming services from a remote server. For instance, a gaming machine may send a game license request to the remote server 124. A gaming machine may store code to play one or more games controlled by the master gaming controller such as a video slot game, a mechanical slot game, a lottery game, a video poker game, a video black jack game, a video lottery game, and a video pachinko game. Traditionally, installing a new game has involved manually exchanging (e.g., by hand) an EPROM (e.g. a read-only memory) containing the game on the gaming machine. Using the communication infrastructure described above, the gaming machine 336 may request a game license for one or more games stored in the gaming machine from a remote server acting as a game license server such as 124. The game license server may send a game license reply message containing a game license which allows the gaming machine to present the one or more games stored on the gaming machine. These game license requests may be performed prior to each game or the license may allow game play for some finite time period. For instance, the game license may be an annual license, a monthly license, a daily license, a per-use license or a site license. Details of the game license request and reply process between a gaming machine and a remote server are described with reference to FIGS. 6 and 7.

In another example, the gaming machine 336 may send a maintenance request message to a remote server when the gaming machine malfunctions. After receiving the maintenance request message, the remote server may perform one or more remote diagnostics on the gaming machine 336 via one or more diagnostic request messages. The remote diagnostics may include both software and hardware diagnostics. In addition, the remote server may develop service priority list based upon a plurality of maintenance requests received from a group of gaming machines in communication with the remote server. In yet another example, a remote server may obtain software version information or gaming configuration information, from gaming machine 336, by sending a software version request message or a gaming configuration request message to the machine. Information contained in these messages may be used to provide software updates and gaming configuration updates to the gaming machine 336.

In a further example, the gaming machine 336 may generate a digital signature or some other type of unique identification information and may send a digital signature verification request or an identification verification request to a remote server. The verification request may be part of an electronic fund transfer. After receiving authorization from the remote server in an authorization reply, the gaming machine 336 may send a fund transfer request with fund transfer information to the remote server and may receive a fund transfer reply authorizing the gaming transaction.

A remote server may also provide performance reports or other services for the gaming machine 336. For instance, the gaming machine 336 may send a report request message to the remote server 124 requesting a performance report for the gaming machine over some prior time period. After remote server generates the report, it may be sent back to the gaming machine 336 or some other access point for display. For instance, the report may be displayed on a display screen of the gaming machine 336, a computer 316 located in the store 140 or on a portable network access point 134 located outside of the store.

An advantage of the virtual network described above is that it allows gaming services such as data acquisition, game licensing and report generation to be provided a single gaming machine without the use of a dedicated network which are typically expensive. This advantage may potentially increase the utility of a gaming machine while reducing the costs associated with operating and maintaining a machine. In particular, for gaming establishments with a small number of gaming machines operating in a "stand alone" mode, a virtual network may be the only viable way to provide cost effective gaming services via a network. The virtual network is enabled by an encryption scheme which utilizes multiple key encryption and symmetric encryption keys to provide secure communication of sensitive gaming data. For each session, the symmetric encryption keys may be randomly generated or may be rotated by selecting from a pool of keys.

The methods described above may be applied and may be advantageous to any gaming machine in the gaming entity 350. Also, many different embodiments of the methods are possible. For instance, using a wireless network interface, gaming machine 338 in Casino 110 may send game license requests or other requests to the database server via the router 308, the dedicated line 322, router 302 and the firewall 300. As another example, using a wireline network interface, such as a wired Ethernet connection, a wired ATM connection or a wired frame relay connection, gaming machine 340 in casino 122 may send may send a gaming report request to the database server 100 in casino 110 via the database server 112, the firewall 310, the router 312, the local ISP 320, the internet 304, the local ISP 315, the router 308 and the firewall 306. When a dedicated communication network is used, encryption may be optional over the dedicated network, e.g. if a dedicated network was used between the gaming machine 340 and the database server 112, the gaming machine 340 may not use encryption to send information to the database server 112. However, the database server would apply an encryption scheme such as the one described above before sending out information over a public network. Returning to the example, the database server 100 may serve as a regional report server. After generating a gaming report reply message to the gaming report request message from gaming machine 340, the database server 100 may send a message to the database server 124 in the central office 142 acknowledging that a report was generated.

The virtual network may also allow remote access to gaming information such as gaming performance information at various gaming establishments in the gaming entity from mobile access points. For example, the remote access point 134 may be a portable computer with a wireless modem. Typically, the remote access point 134 will have a high level of security such as special access software. Using the remote access point 134, a user such as a travelling employee of the game entity may access gaming information at casino 110 or casino 122 via the local ISP 314. The access may be routed through the central office 142 or may be routed directly to one of the casinos bypassing the central office. In addition, different access privileges may be accorded to different remote users. For instance, one remote user may be able to access information from any establishment in the gaming entity while another may only be able to access information from a particular establishment.

Figure 4:
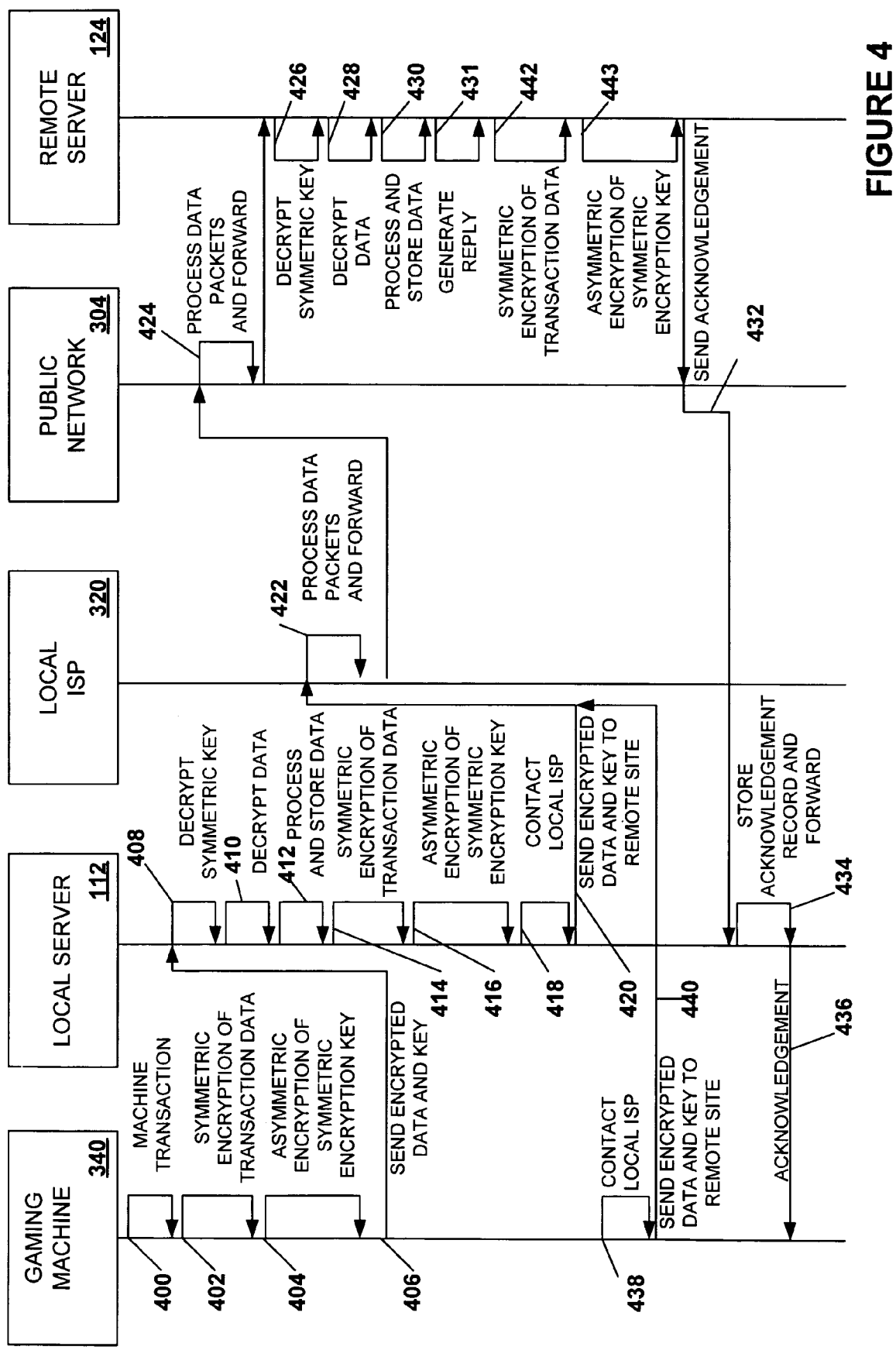
FIG. 4 is an interaction diagram showing communications between a gaming machine, local server, local ISP and remote server over a public network.

FIG. 4 is an interaction diagram showing communications between a gaming machine, local server, local ISP and remote server over a public network. The diagram provides some details of a communication process between a gaming machine 340 in casino 122 and the database server 122 in the central office 142 as described with reference to FIG. 3 for one embodiment of the present invention. In 400, the gaming machine 340 may perform a gaming transaction such as a coin-in, initiating a game play or a coin-out. In 402, the gaming machine 340 symmetrically encrypts gaming transaction data from one or more gaming transactions using a symmetric encryption key. In 404, the symmetric encryption key may be encrypted using an asymmetric encryption key such as public key in a public-private encryption scheme which may only be decrypted using a matching private key at the message destination. For each gaming transaction, a symmetric encryption key is selected from a pool of symmetric encryption keys or randomly generated. Thus, the symmetric encryption key varies from gaming transaction to gaming transaction. When a dedicated or private communication network is used and extra security is desired, the symmetric key may also be asymmetrically encrypted with an asymmetric encryption key which is non-public. In 406, a message may be generated and the encrypted data and key may be sent to a local server 112.

As previously described with reference to FIG. 3, the encrypted information may be encapsulated in multiple information packets using a TCP/IP communication protocol. In addition other communication protocols such as a frame relay communication protocol, an ATM communication protocol or combination of protocols may also be utilized. Prior to sending the data, the gaming machine may look up the IP address and/or the UID of the remote server which may be stored in a memory on the gaming machine. When a dedicated communication network is used between the gaming machine and the remote server, such as local server 112, the encryption process performed by the gaming machine may be optional. Prior to sending the message, the gaming machine 340 may generate one or more signatures that allow the receiver of the message to authenticate the sender of the message as well as the accuracy of the data contained in the message. These signatures may be appended to the message or incorporated in the message in some manner.

In one embodiment, the gaming machine 340 may by-pass the local server and may send a message to the remote server 124 via the local ISP 320. In some embodiments, a local server may not be available to the gaming machine, such as gaming machine 336 in the store 140 in FIG. 3. In 438, when communications are not established between the local ISP 320 and the gaming machine 340, the gaming machine may contact the local ISP 320 using a network interface and establish communications with the local ISP 320. In 440, the gaming machine 340 may send a message with the encrypted gaming transaction data and the encrypted symmetric key to the IP address and/or the UID of the remote server 124 via the local ISP 320.

In 408, the local server 112 receives a message from the gaming machine 340. The local server 112 may authenticate that the message was sent from the gaming machine 340 and determine that the data sent in the message is complete. Next, the local server 112 may decrypt the symmetric encryption key using a private asymmetric encryption key stored on the local server. In 410, the local server decrypts the transaction information included in the message using the symmetric encryption key. In 412, the local server 112 may process and store the data generated from the gaming machine.

In 414, gaming transaction data from the gaming machine 340 may again be symmetrically encrypted using a symmetric encryption key. The gaming transaction data may also include additional gaming transaction data from other gaming machines. In one embodiment, the gaming transaction data may include game usage data that allows a game played on a gaming machine to be billed on a per use basis. In 416, the symmetric encryption key may be asymmetrically encrypted using an asymmetric encryption key such as a public key exchanged between the local server and the remote server 124 and a message containing the encrypted data may be generated. Prior to sending the message, the local server 112 may generate one or more signatures that allow the receiver of the message to authenticate the sender of the message as well as the accuracy of the data contained in the message. These signatures may be appended to the message or incorporated in the message in some manner. In 418, when a communication has not been established between the local server 112 and a local ISP 320, the local server may contact the local ISP 320 and establish communications using an appropriate communication protocol such as TCP/IP. In 420, the local server 112 may send a message with the encrypted gaming transaction data and the encrypted symmetric key to the IP address and/or the UID of the remote server 124 via the local ISP 320.

In 422, the local ISP 320 processes and forwards the message from the local server 112 or the gaming machine 340 to the public network 304. In 424, the public network processes the message from the local ISP 320 and forwards it to the remote server 124. Processing of the message by the local ISP 320 and the public network 304 may involve routing multiple data packets comprising the message.

In 426, the remote server receives a message from the gaming machine 340 or the local server 112. The remote server 124 may authenticate the sender of the message using one or more signatures included in the message and determine the accuracy of the data of the message. For instance, the remote server may generate a check sum, CRC, or other verification of the data in the message and compare that with a check sum, CRC, or other verification of the data generated by the sender of the message. Next, the asymmetrically encrypted symmetric encryption key may be decrypted using a private key residing on the remote server 124. In 428, the symmetric key may be used to decrypt the symmetrically encrypted data. In 428, the remote server may process and store the data. The message from the gaming machine or local server 112 may include a request of some type for the remote server. In 430, the remote server may implement the request. For instance, the message may contain a request for a game license (See FIGS. 6 and 7), a request for a report or a request for some other game service.

In 431, the remote server may generate a reply message. The reply message may include an acknowledgement that the original message was received and may also include requested information. For instance, the remote server may request diagnostic data or a report of some type from the gaming machine. The data in the reply message may be encrypted. Thus, in 442, the transaction reply data may be symmetrically encrypted using a symmetric encryption key and in 443 the symmetric encryption key may be asymmetrically encrypted using the recipient's public key. When the reply message is received by a gaming device, such as the gaming machine 340 or the local server 112, the gaming device may decrypt (e.g., as in 426) the asymmetrically encrypted symmetric encryption key using a private key stored on the gaming device.

In 432, the remote server sends the reply message to the local server 112 and/or the gaming machine 340 via the public network 304. The remote server 124 may access the public network via an ISP local to the remote server 124. In 434, the local server may receive a reply message and store data included in the message. In some embodiments, the acknowledgement may be forwarded to the gaming machine 340. In other embodiments, the local server 112 may be by-passed or a local server 112 may not be available to the gaming machine 340 and the reply message may be received directly by the gaming machine 340 via the local ISP 320.

Figure 5A:
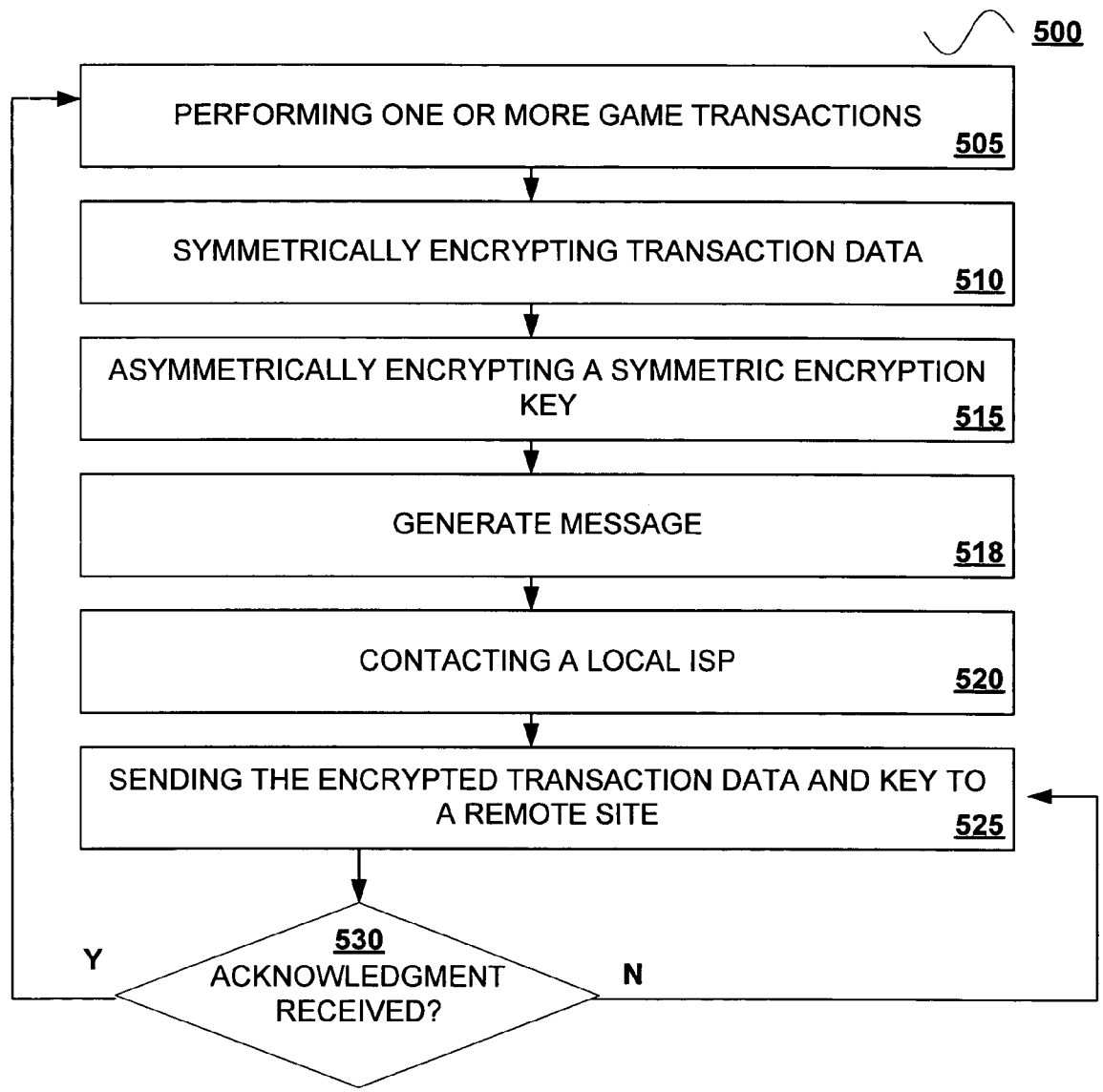
FIG. 5A is a flow chart depicting a method of sending transaction data between a gaming machine and one or more remote servers.

FIG. 5A is a flow chart depicting a method 500 of sending transaction data between a gaming machine and one or more remote servers. Although the method is described on a gaming machine for illustrative purposes, the method is not so limited and may be applied on other gaming devices such as the remote servers described above. Thus, as described with reference to FIG. 4, the gaming machines and remote servers may send messages with encrypted data to one another in a similar manner. In 505, the gaming machine performs one or more gaming transactions. For example, a gaming transaction may be a coin-in or a payout on the gaming machine. Information from one or more gaming transactions may be stored in a non-volatile memory located on the gaming machine. In 510, the gaming transaction data may be symmetrically encrypted using a symmetric encryption key. The encrypted gaming transaction data may include data generated from a single gaming transaction or multiple gaming transactions. The symmetric key may be selected from a pool of symmetric keys or may be randomly generated such that the symmetric key is varied each time gaming transaction data is encrypted. In 515, the symmetric encryption key may be asymmetrically encrypted using a public key that was previously exchanged between the gaming machine and the recipient of the message. In the case, where a dedicated network is used the asymmetric encryption key is non-public i.e. it is not readily available to the public.

In 518, the gaming machine generates a message containing the symmetrically encrypted gaming transaction data and the asymmetrically encrypted symmetric encryption key over a communication protocol such as but not limited to TCP/IP. The message may include additional information such as signatures to authenticate the sender of the message, signatures to validate the accuracy of the data included in the message and an IP address and/or an UID of the sender as well as other message routing information. The message may also include a request for the recipient to return information to the gaming machine. For instance, the gaming machine may request a remote server to provide a gaming license that allows a game to be played on the gaming machine.

In 520, when communications have not been established between the gaming machine and a local ISP, the gaming machine may contact a local ISP. The gaming machine may also send messages to a local ISP by sending the message first to a local server which may then forward the message to the local ISP. The gaming machine may contact the local ISP using a communication protocol such as TCP/IP and a network interface such as a wireless modem. In 525, the gaming machine sends the message generated in 518 to a remote site such a game license server, a report server or some other device via the local ISP. In 530, the gaming machine may determine when an acknowledgement message has been received from the remote site. When an acknowledgement message has not been received, the gaming machine may resend the message one or more times. When the acknowledgement message has been received, the gaming machine may repeat process 500.

Figure 5B:
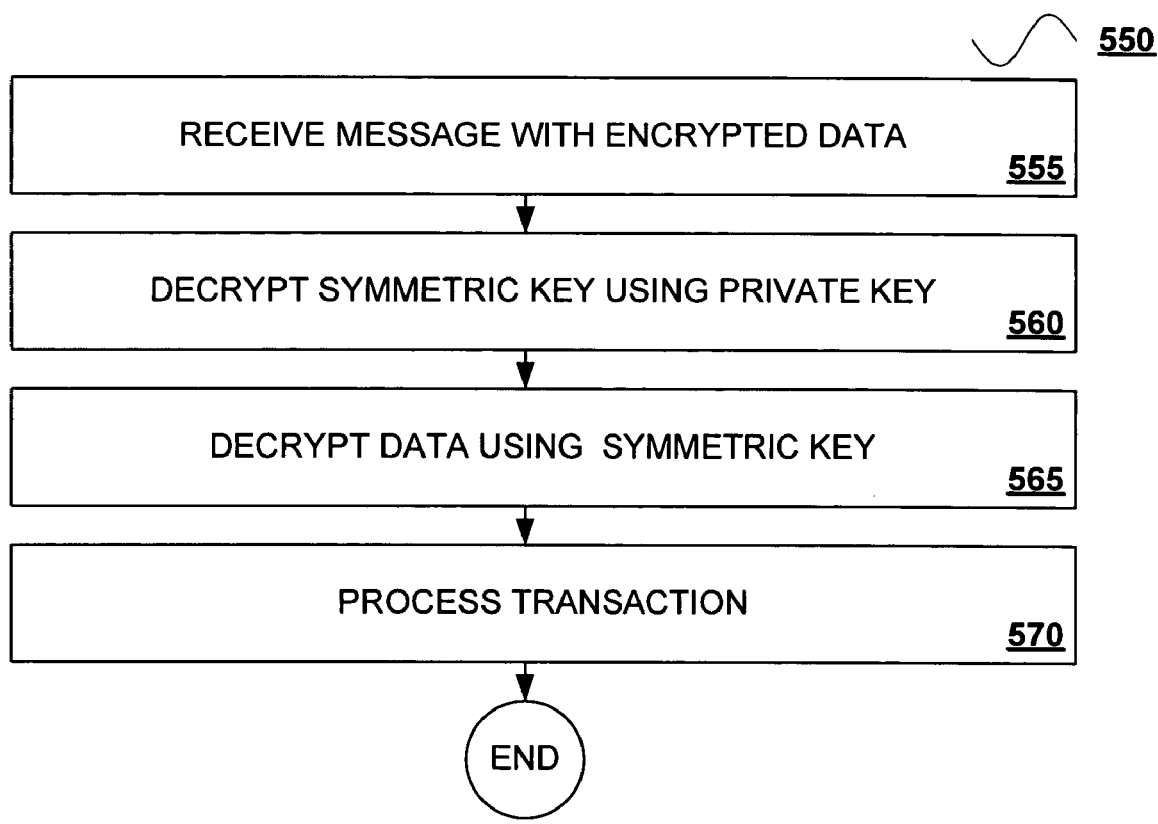
FIG. 5B is a flow chart depicting a method of receiving transaction data between a gaming machine and one or more remote servers.

FIG. 5B is a flow chart depicting a method 550 of receiving transaction data between a gaming machine and one or more remote. Although the method is described on a remote server for illustrative purposes, the method is not so limited and may be applied on other gaming devices such as the gaming machines described above. Thus, as described with reference to FIG. 4, the gaming machines and remote servers may receive and process messages with encrypted data from one another in a similar manner.

In 555, the remote server receives a message with encrypted gaming transaction data from a gaming machine, another remote server or some other gaming device. In 560, an asymmetrically encrypted symmetric encryption key included in the message in 555 is decrypted using a private key stored on the remote server. In 565, the decrypted symmetric encryption key may be used to decrypt symmetrically encrypted gaming transaction data included in the message. In 570, the decrypted gaming transaction data or any service requests contained in the message are processed. For instance, gaming transaction data in the message may be archived.

Figure 6:
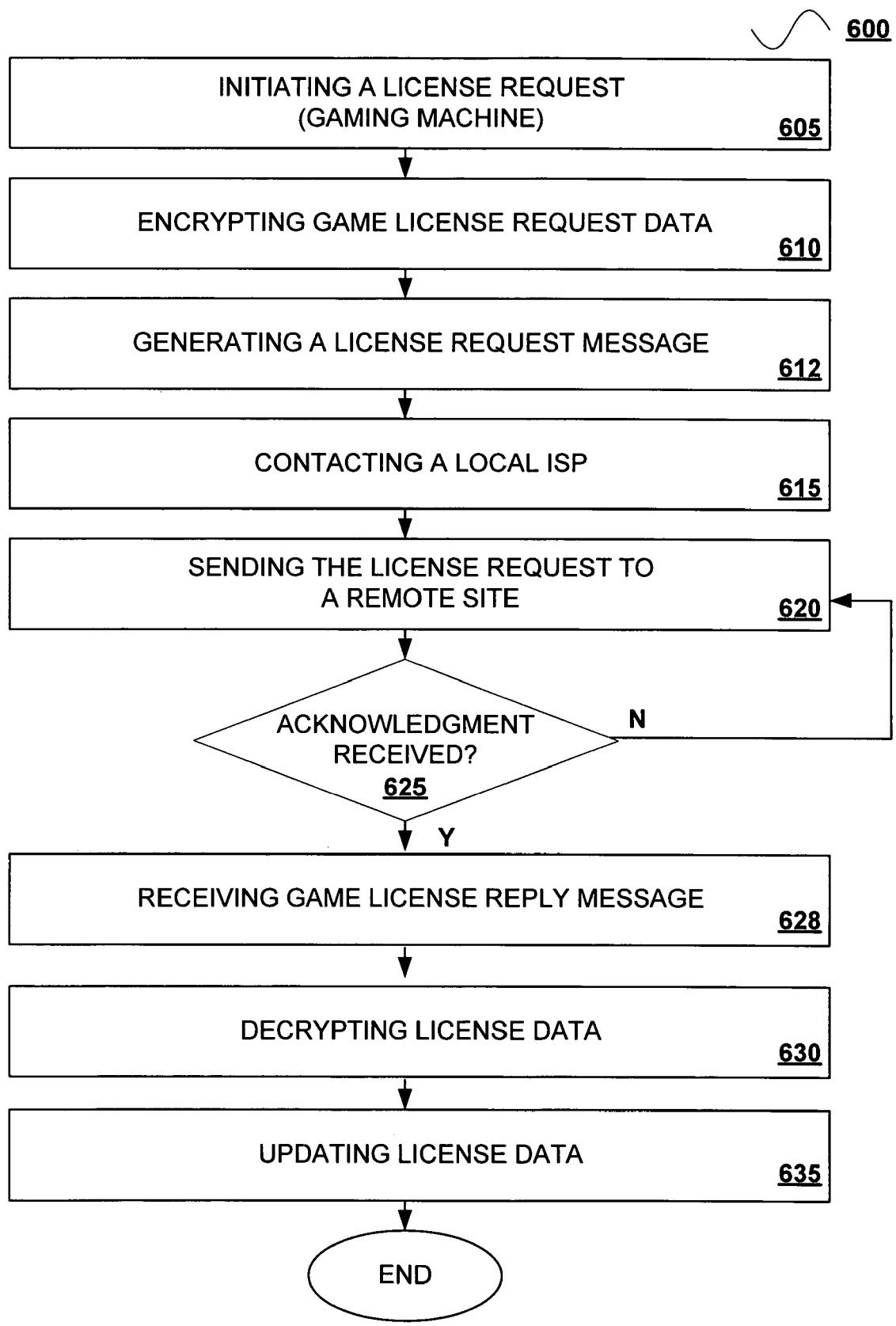
FIG. 6 is a flow chart depicting a method of obtaining a game license on a gaming machine.

FIG. 6 is a flow chart depicting a method 600 of obtaining a game license on a gaming machine providing game play of one or more games. In 605, a gaming machine initiates a gaming license request. In one embodiment, the gaming license request may be initiated when a current gaming license on the gaming machine is about to expire. In another embodiment, the gaming license request may be initiated in response to a player on a gaming machine requesting a game play of a particular game. In 610, game license request data used to provide and implement gaming licenses is encrypted. The game license data may be encrypted using a symmetric encryption key and the symmetric encryption key may be asymmetrically encrypted using a public key. The game license request data may include the symmetric encryption key, a serial number of the software corresponding to one or more games or some other software identification number, a serial number of the gaming machine as well as other machine identification information, game owner identification information, game usage data including the number of times a gaming license has been used and license expiration data. The game usage data may be used to bill the gaming entity owning the gaming license for use of the game license. The software identification number in the gaming license data may correspond to one or more games such as a video slot game, a mechanical slot game, a video poker game, video blackjack game and video pachinko game.

In 612, a game license request message is generated with the encrypted game license request data. The game license request message may be sent to a remote server using a TCP/IP protocol. Thus, the game license request message may include an IP address and/or an UID of the remote server as well as an IP address and/or an UID of the gaming machine. The gaming machine may store the IP addresses and/or the UIDS of one or more remote servers in a memory residing on the gaming machine. Prior to sending the gaming license request message, the gaming machine may look-up the IP address and/or the UID of the destination remote server. The gaming license request message may include one or more signatures used by the recipient of the message to unambiguously identify the sender of the message and to validate the accuracy of the data contained in the message. The signatures may be generated by the gaming machine and appended to the message.

In 615, when communications between the gaming machine and a local ISP have not been established, the gaming machine may contact a local ISP and establish communications. In one embodiment, the gaming machine may not directly contact a local ISP. Instead, the gaming machine may contact and may send the gaming license request message to a local server which contacts a local ISP and sends the gaming license request message. In another embodiment, the gaming machine may send unencrypted gaming license request data to the local server. The local server may encrypt the gaming license request data, generate a gaming license request message and send the message to a remote server such as a gaming license request server.

In 620, the gaming machine sends the gaming license request message to a remote site such as a game license server via the local ISP. When a communication protocol such as TCP/IP is used, the message may be encapsulated in multiple information packets. In 625, the gaming machine determines whether an acknowledgement from the remote site has been received. When the acknowledgement from the remote site has not been received, the gaming machine may resend the message according to 620.

In 628, the gaming machine receives a game license reply message. The game license reply message may include a number of signatures used by the gaming machine to authenticate the sender of the message and to validate the data contained in the message. In 630, the gaming machine may decrypt an asymmetrically encrypted symmetric encryption key using a private key stored in memory on the gaming machine and then decrypt the game license reply data with the symmetric encryption key. The game license reply data may include a game license for one or more games available on the gaming machine. The game license may be an identification number of some type that allows software on the gaming machine corresponding to the license to be executed. The game license reply data may also include an expiration date for the license. In 635, the gaming machine may update game license data stored on the gaming machine when a new game license was included in the game license reply data. In one embodiment, the game license request message may include game usage data without a request for a new license. In this case, the game license reply message may include an acknowledgement that the game license request message was received but may not contain a new game license.

An advantage of the game license request method is that a gaming machine owner may be able operate gaming machines including many different types of games but only pay for each game on a per use basis. In a "pay-as-you go"

billing scheme, an operator of the gaming machine is charged each time a game is played on the gaming machine. At regular intervals, a usage fee may be paid by the operator of the gaming machine to the owner's of the gaming software used on the gaming machine. The cost per use of each game may be varied from game to game and these costs may change with time. For example, the cost per use charged for newer gaming titles may be higher than the cost per use charged for older gaming titles. Thus, when a particular game is unpopular, the costs to the gaming machine operator are minimized as compared to when the gaming machine operator pays up front for a gaming machine with a game that receives little game play.

Another advantage of the game license request method is that it may also be used for other types of game service requests. For instance, a report request message with encrypted report request data may be generated in the manner described above and sent to a remote server via a local ISP. When a report reply message is received via the local ISP containing a report, the report may be displayed to the gaming machine. In another example, a gaming machine may send a maintenance request message via a local ISP in a manner described above.

Figure 7:
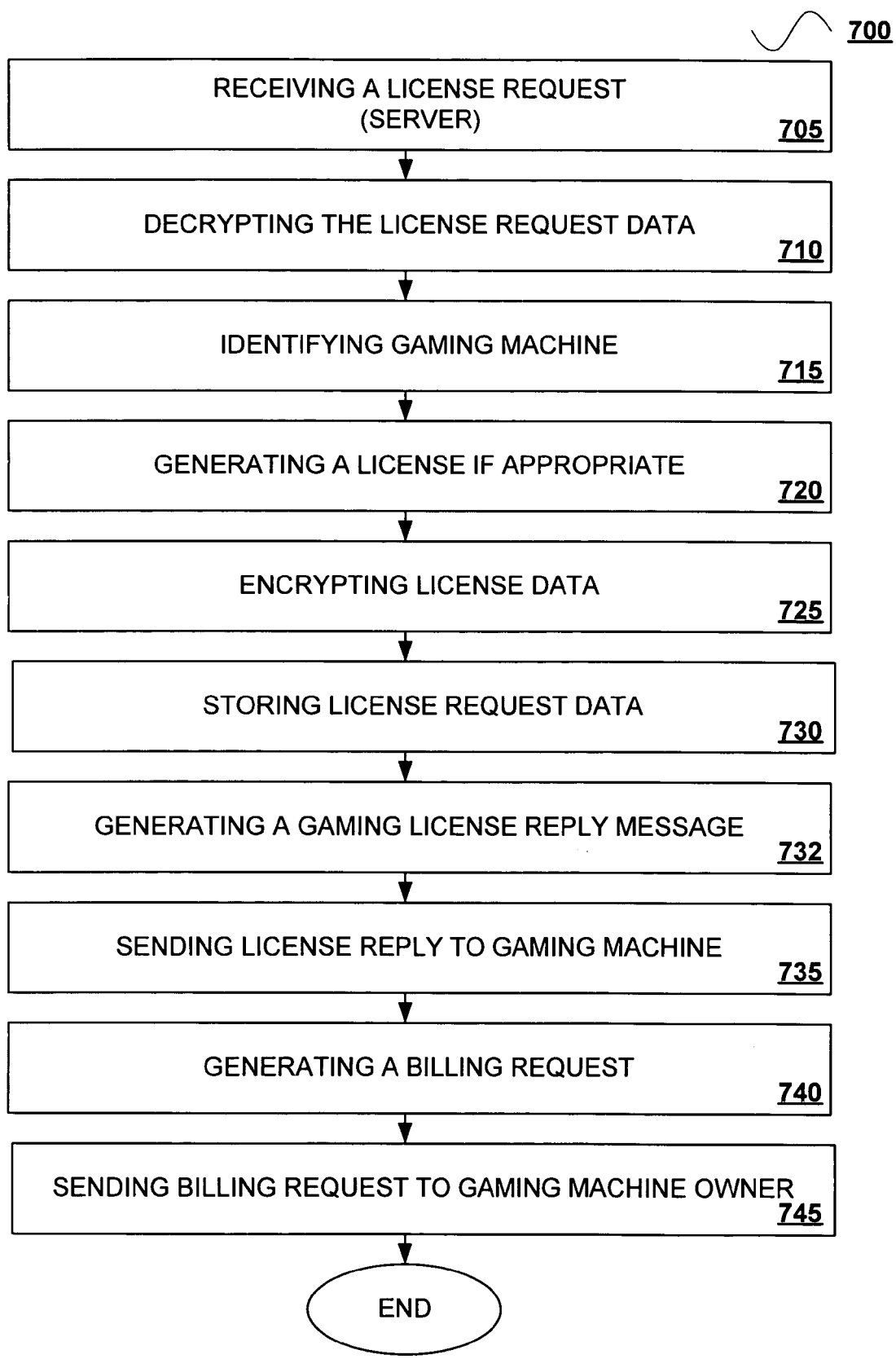
FIG. 7 is a flow chart depicting a method of providing a game license to one or more gaming machines using a remote server.

FIG. 7 is a flow chart depicting a method 700 of providing a game license to one or more gaming machines using a remote server. In 705, the remote server receives a game license request message from a gaming machine, local server or some other device. The message may have been received via a local ISP in communication with the remote server. As described above, although not shown in the flow chart, the remote server may also receive a report request, maintenance request or some other transaction request from the gaming machine, local server or remote device. After receiving the message, the remote server may authenticate the sender of the message using one or more signatures contained in the message and validate the accuracy of the data in the message using one or more signatures contained in the message. For instance, the remote server may generate a checksum on the data in the message and compare it with a checksum generated by the gaming machine on the data in the message which was appended to the message.

In 710, the remote server may decrypt a symmetric encryption key included in the game license request message using a private encryption key. With the symmetric encryption key, the remote server may decrypt the game license request data. The game license request data may include a serial number of the software corresponding to one or more games or some other software identification number, a serial number of the gaming machine as well as other machine identification information, game usage data including the number of times a gaming license has been used, license expiration data and game owner identification information.

In 715, using the serial number of the gaming machine and the other machine identification information the remote server may identify the gaming machine. The serial number of the gaming machine is one example of an UID that may be used with the present invention. A table of gaming machine identification information may be stored on the remote server. From the gaming machine identification information, the remote server may be able to determine the type of gaming machine and the games available on the gaming machine. In 720, when appropriate, the remote server may generate a new gaming license for the gaming machine. If the gaming license request message includes a request for a gaming license not available on the gaming machine or not enabled for some reason on the gaming machine, then the gaming license request may be denied. In another example, the game license request may include game usage information for billing purposes and a new game license may not be required.

In 725, when a new game license is generated, the game license reply data including the new game license may be encrypted with a symmetric encryption key and the symmetric encryption key may be asymmetrically encrypted with a public key. In other cases, the game license reply message may include an acknowledgement that the message was received but may not include a new game license. In 730, the information regarding the game license request such as the machine identification information, a type of game license request (e.g. type of game), a time of the request and whether the request was granted may be stored on the remote server.

In 732, a game license reply message with the game license reply data may be generated. In 735, via a local ISP and the Internet, the game license reply message may be sent to the local server and/or the gaming machine. In 740, a billing request message based upon the game usage data contained in the game license request or the type of license requested may generated. In 745, the billing request message may be sent to the gaming machine owner identified in the gaming license request message.

Software Distribution with Download Authorization Using a VPN

Figure 8:
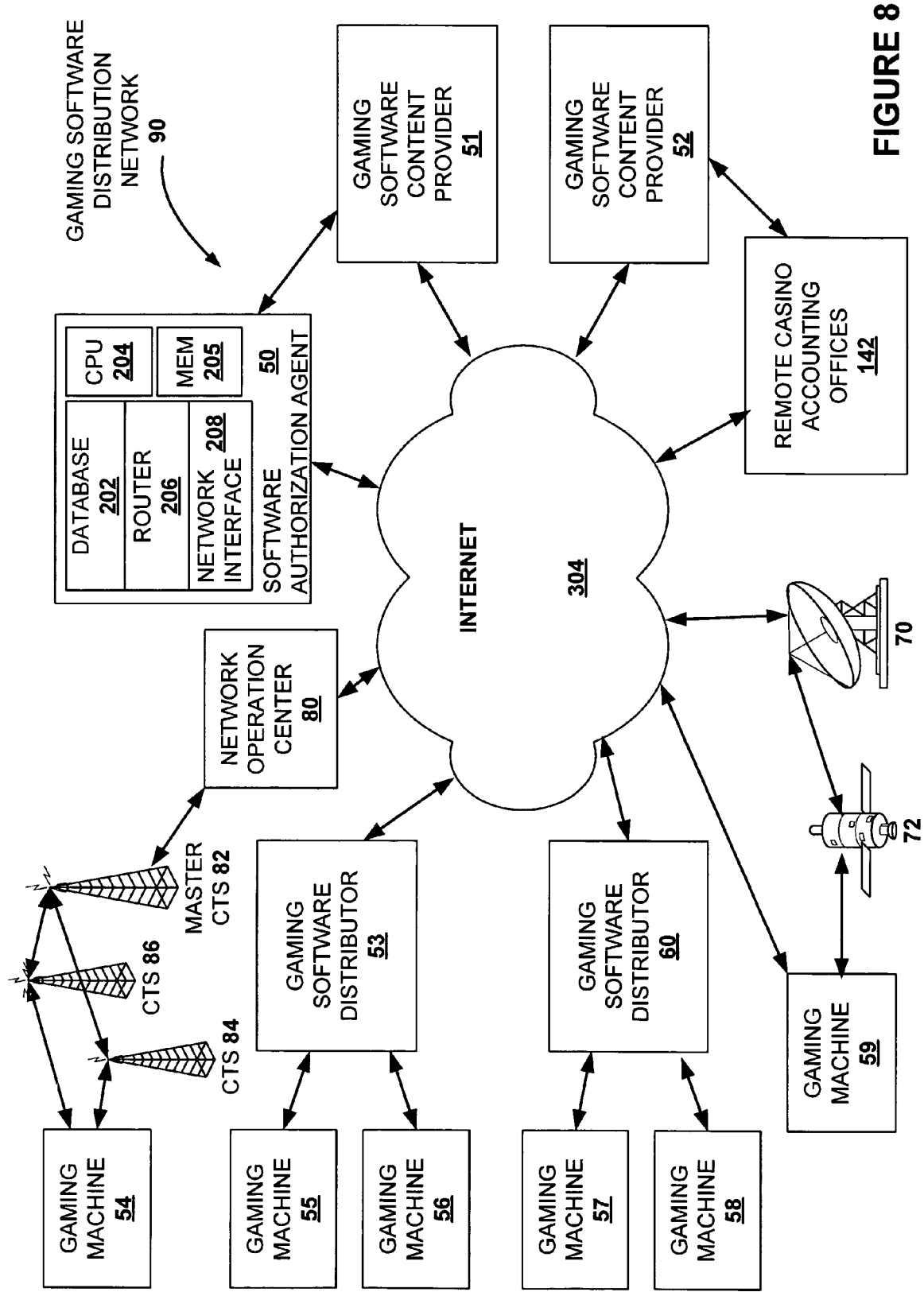
FIG. 8 is a block diagram of gaming software distribution network that uses a secure virtual network.

FIG. 8 is a block diagram of gaming software distribution network that uses a secure virtual network. In the present invention, gaming software may be transferred between various gaming devices, in a gaming software distribution network 90, after receiving authorization from a gaming software authorization agent 50. The gaming software authorization agent 50 may be a conventional data server including but not limited to a database 202, a router 206, a network interface 208, a CPU 204, a memory 205 and a firewall (not shown). The CPU 204 executes software to provide the functions of the authorization agent 50 as will be described below in more detail. In general, the gaming software authorization agent 50 approves all gaming software transactions between two gaming devices in the gaming software distribution network and stores a record of the gaming software transactions. Database 202 may be used to store gaming software transaction records. Details of the gaming devices and network connections used in the gaming distribution network 90 are described in FIG. 8. Details of the types of gaming software transaction that may be implemented in gaming software distribution network and the implementation of the transactions for some embodiments of the present invention are described with respect to FIGS. 9-14.

In the gaming industry, gaming software that is used to play a game of chance on a gaming machine is typically highly regulated to ensure fair play and prevent cheating. Thus, at any given time, it is important for a gaming regulatory entity to know what gaming software is installed on a gaming machine at any particular time. Currently, gaming software is often programmed into an EEPROM and installed on a gaming machine. When the EEPROM is installed in the gaming machine, it is manually checked by a representative of the gaming regulatory board prior to installation to ensure approved gaming software is being installed on the gaming machine. This process is time consuming and relatively inflexible. In the gaming industry, there is a desire to simplify the gaming software installation process so that gaming machine operators may more easily reconfigure gaming machines with different gaming software to respond to shifting customer tastes and demands. The gaming software authorization agent 50 meets this need by allowing gaming software to be electronically transferred between gaming devices, such as game servers and gaming machines, in a manner that may be easily monitored and regulated. For instance, the software authorization agent 50 may be maintained or supervised by a gaming regulatory agency. However, the software authorization agent 50 may also be maintained by a gaming entity that controls many gaming properties to track software distributions on various gaming machines. In addition, besides monitoring electronic transfers of gaming software, the software authorization agent 50 may also be used to store a record of any change of gaming software on a gaming machine such as changes resulting from a manual installation of gaming software. For instance, a technician may manually load gaming software on to a gaming machine using a portable memory device storing the gaming software.

Details of gaming devices and the network connections in the gaming software distribution network are now described. In the present invention, gaming software may be transferred between gaming software providers, such as 51 and 52, gaming software distributors, such as 53 and 60, and gaming machines, such as 54, 55, 56, 57, 58 and 59. A gaming software provider may be a gaming device, such as a game server, that is maintained by a gaming software developer, such as IGT (Reno, Nev.), that develops gaming software for various gaming platforms. A gaming software content provider, such as 51 and 52, may maintain a plurality of gaming software titles, versions of gaming software titles and gaming software components that may be requested by another gaming device for an electronic download. The gaming software content provider may download gaming software to various customers after the customer has entered a licensing agreement with the content provider. Some details of obtaining game licenses for operating gaming software on a gaming machine have been described above with respect to FIGS. 6 and 7.

A set of gaming software components may be executed on a gaming machine to play a gaming of chance. The game of chance may include gaming software components used to play a bonus game in conjunction with the game of chance. Thus, a complete set of gaming software components used to play a game of chance may be downloaded or a portion of the gaming software components needed to play a game the game of chance may be downloaded. For instance, a complete package of gaming software components may be downloaded to replace a game executed on a gaming machine with a new game. As another example, a single game software component may be downloaded to fix an error in a game of chance executed on the gaming machine. In yet another example, a set of gaming software components may be downloaded to install a new graphical "feel" for the game of chance while other gaming software components for the game are not changed. In the present invention, any gaming device that stores gaming software for downloads may download a complete set of the gaming software components used to play the game of chance or portions of a complete set of the gaming software components. Some examples of gaming software components may include but are not limited to: 1) a banking modules for coin-in, coin-out, credits cards, fund transfers, 2) security modules for tracking security events such as door open, lost power, lost communication, 3) bet modules for handling betting configurations such as a number of paylines, a number of coins per line and denominations, 4) communication modules allowing a gaming device to communicate with other gaming devices using different communication protocols and 5) an operating system modules used in an operating system installed on the gaming machine. Details of some of the gaming software components that may be downloaded in the present invention are described in co-pending U.S. application Ser. No. 10/040,239, by LeMay et al., filed on Jan. 3, 2002 and titled "Game Development Architecture That Decouples The Game Logic From The Graphics Logic," which is incorporated herein in its entirety and for all purposes.

Gaming software related to other aspects of game play and operation of a gaming machine may also be authorized and downloaded using the methods and hardware of the present invention. For instance, device drivers used to operate a particular gaming device may be downloaded from a content provider or another gaming device. As another example, gaming software used to provide player tracking services and accounting services may be downloaded from a content provider or another gaming device. Even when the gaming software is not regulated by a gaming entity, it may be useful to perform the authorization process because the transaction records may be used to track the distribution of the gaming software on various gaming devices. The transaction records may be helpful to both providers of gaming software and operators of gaming devices in determining necessary upgrades and maintenance of gaming software on a gaming device such as a gaming machine.

A gaming software distributor, such as 53 and 60, may maintain a plurality of gaming software titles, versions of gaming software titles and gaming software components that may be transferred to another gaming device, such as a gaming device, for an electronic download. The gaming software distributors, such as 53 and 60, may be gaming devices, such as game servers, that are maintained by a gaming entity such as a casino. For instance, game server 53 may be operated by a first casino and game server 60 may be operated by a second casino. The game servers may store gaming software that has been licensed to the gaming entity from one or more gaming software providers such as 51 and 52. In one embodiment, a game server may also be a gaming machine. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes.

The game servers operated by a gaming entity may be used to provide gaming software to a plurality of gaming machines. For instance, game server 53 may be used to provide gaming software to gaming machine 54, 55, 56 and game server 60 may be used to provide gaming software to gaming machines 57, 58 and 59. In one embodiment, the game servers may be programmed to download gaming software in response to a software request on a gaming machine. For instance, a game player playing a game on a gaming machine, such as 55, may request to play a particular game of chance on the gaming machine 55 which is downloaded to the gaming machine from the game server 53. In another embodiment, the game servers, such as 53 and 60, may be used to update and reconfigure the gaming software on one or more gaming machines. For instance, the game server 53, may be used to regularly change the games of chance or bonus games of chance available for play on gaming machines 54, 55 and 56.

In the present invention, gaming software transferred between two gaming devices and communications between two gaming devices may use a variety of network architectures including but not limited to local area networks, wide area networks, private networks, a virtual private network, the Internet 304 and combinations thereof. Details of methods of using the Internet 304 in a secure manner have been described with respect with 3, 4, 5A and 5B.

In one embodiment, gaming software and other gaming information may be transferred between two gaming devices using a satellite connection. For instance, the gaming information transferred via satellite may include but is not limited to metering information generated on the gaming machine. In a gaming device using a satellite communication system, the gaming device is connected to a satellite dish. For instance, a gaming machine located in a store, as described with respect to FIG. 3, or a cruise ship may use a satellite connection. Two standard coaxial cables may connect the gaming device to the satellite dish. The gaming device, such as a gaming machine, may include a satellite modem to enable the satellite connection.

The satellite dish may send requests to the Internet 304 and receive Internet content via the satellite 72. The satellite 72, in turn, may communicate with a hub facility 70, which has a direct connection with the Internet 304. Typically, the transfer rate of information from the gaming device, such as gaming machine 59, to the satellite 72 (uplink rate) is less than the transfer of rate of information from the satellite 72 to the gaming device (downlink rate). For example, the uplink rate may be 28 Kilobytes per second while the downlink rate may be 500 kilobytes per second or higher. However, for software downloads, a high downlink rate may only be required for efficient gaming software downloads. Satellite Internet services may be provided by a company such as Starband Corporation (Mclean, Va.).

In another embodiment, gaming software and other gaming information may be transferred between two gaming devices using an RF connection. The gaming information transferred via the RF connection may include but is not limited metering information generated on the gaming machine. As one example, US Telemetry corporation (UTSC, Dallas, Tex.), uses radio frequency transmissions in the 218-222 MHz band to provide communications services to fixed end point devices as well as mobile devices. The fixed end point device may be a gaming machine located in a store or located in a casino, such as gaming machine 54 ,as well as a mobile gaming device such as a gaming machine located in a riverboat or portable gaming device that may be carried by a player and used to play a game of chance.

The RF network in a metropolitan service area may include cell transceiver sites or towers, such as 84 and 86, a system hub or master cell transceiver site, such as 82. The MCTS 82 is connected to a Network Operations Center (NOC) 80, which is essentially a data clearinghouse. Data is transferred from a CTS, such as 84 and 86, to a Master CTS (MCTS) 82 through a Publicly Switched Telephone Network. Data is transferred from the MCTS 82 to the NOC 80 database via an ATM or a Frame Relay. Data transfer protocol and user access to various end-point devices may be provided through web interfaces. Thus, using an RF network and the secured virtual network methods as described with respect to FIGS. 3, 4, 5A and 5B, gaming information as well as gaming software may be transferred between various gaming devices. For instance, a remote casino accounting office 142 may obtain information from gaming devices connected to the RF network via the Internet 304.

In the present invention, records of authorizations for the transfer of gaming software between gaming devices may be stored in the database 202. Thus, given an initial distribution of gaming software in the gaming software distribution network 90 for each gaming device, the gaming software authorization records may be used to track the gaming software distribution for gaming devices in the gaming distribution network as a function time. This tracking capability may be useful for various gaming entities such as a gaming regulatory board, a gaming software content provider and gaming operators. For instance, a gaming regulatory board may be able to see the gaming software installed on all gaming devices it regulates at any given time using the database 202. As another example, a gaming software content provider, such as 51 and 52, may be able to view gaming software requests for their gaming software products as a function of time. In yet another example, a remote casino accounting office 142 may be view the distribution of their gaming software on the gaming machine under their control.

The database 202 may be partitioned and include various security protocols to limit access of the data in transaction database according to various criteria. For instance, a gaming software provider 51 may be able to view records only of gaming software transactions involving their products but not of a competitors products. As another example, a gaming entity may be able to view records of gaming software transactions involving gaming machine that they operate but not view gaming software transactions for gaming machines that another competitor controls. Further details of an interface for providing gaming software distributions is described with respect to FIG. 15.

Figure 9:
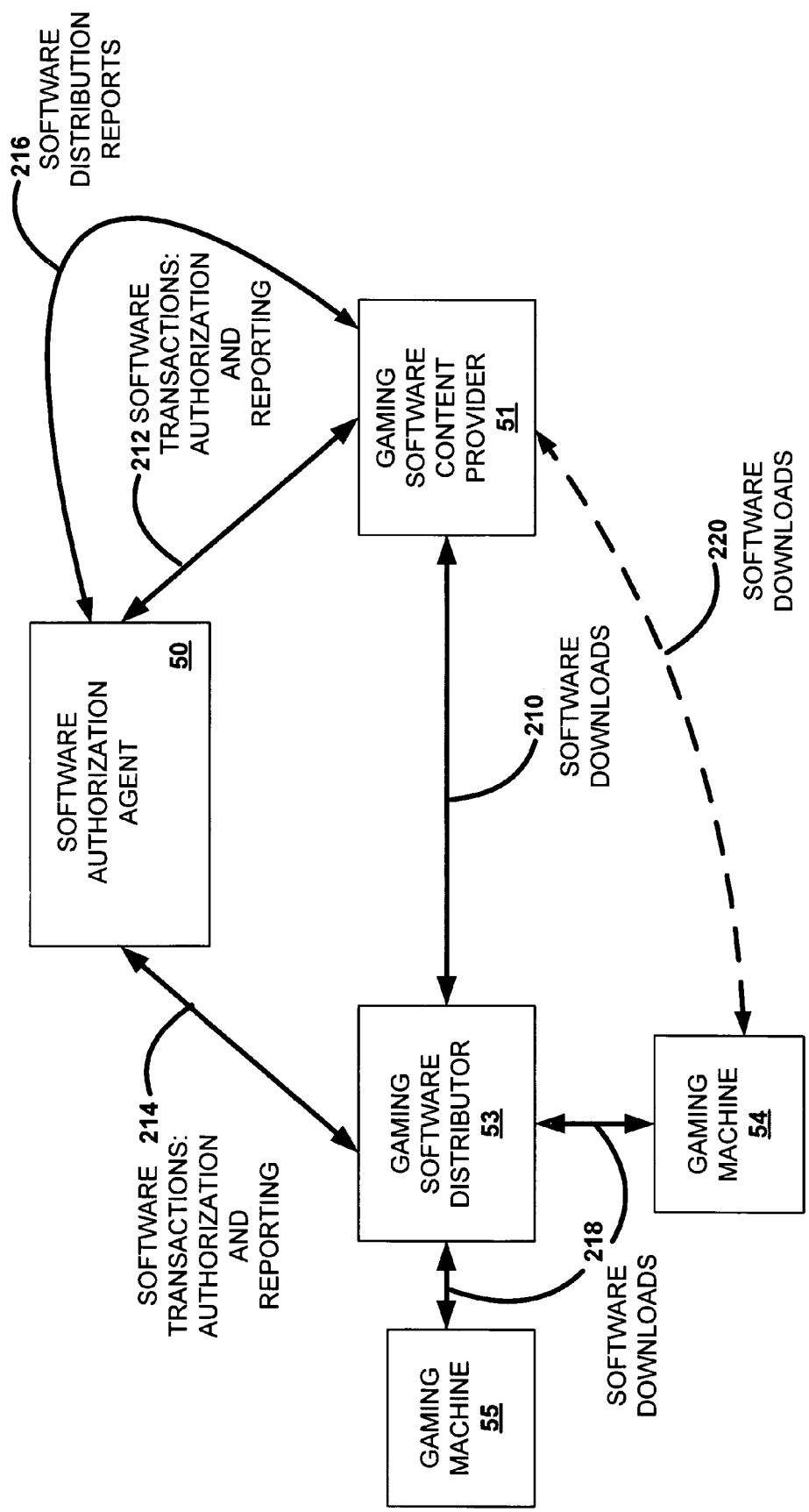
FIG. 9 is a block diagram depicting software transactions in a gaming software distribution network controlled by a software authorization agent.

FIG. 9 is a block diagram depicting software transactions in a gaming software distribution network controlled by a software authorization agent. Gaming software transactions between a software authorization agent 50, a gaming software distributor 53, a gaming software content provider 51 and two gaming machines, 54 and 55 in a gaming software distribution network are described. In FIG. 9, the number and types of gaming devices are provided for illustrative purposes only and the present invention is not limited to the gaming devices shown in the Figure.

As described with respect to FIG. 8, the software authorization agent 50 is used to authorize gaming software transfer between two gaming devices. For instance, in 214, the gaming software distributor 53, which may be a game server maintained by a casino, may contact the software authorization agent 50 to request a transfer of gaming software from the gaming software provider 51 to the gaming distributor 53. The gaming distributor may also contact the software authorization agent to request a transfer of gaming software from the gaming software provider 51 to another gaming device such as gaming machine. The software authorization agent 50 may approve or deny the request depending on the gaming software transaction information contained in the request. For instance, if a gaming device, such as the gaming software distributor 53, cannot be identified and authenticated by the software authorization agent 50, then the software authorization agent 50 will deny the request for the transfer of gaming software. As another example, if the gaming device, has requested a software title that is unknown to the software authorization agent 50, then the software authorization agent will deny the request for the transfer of gaming software. Some details of this gaming software transaction are described with respect to FIGS. 11, 13 and 14.

After receiving authorization from the software agent, the gaming software distributor 53 may contact the gaming software content provider 51 and receive an electronically download of gaming software from the content provider via an electronic transfer in 210. The electronic transfer may use the network infrastructure and communication methods including encryption described with respect to FIGS. 3, 4, 5A, 5B and 8. Details of this gaming software transaction are described with respect to FIG. 11. The gaming software may also be manually shipped to the gaming software content distributor 53, such as through the mail or by a courier, and then locally loaded onto a gaming device.

In one embodiment of the present invention, gaming software transfers involving the actual transfer of gaming software occur directly between two gaming devices as shown in 210. In another embodiment of the present invention, gaming software transfers may be routed through the software authorization agent 50. For instance, to transfer gaming software to the gaming software distributor 53, the gaming software content provider 51 sends the gaming software to the software authorization agent 50 which then forwards the software to the gaming software distributor. When the software authorization agent 50 receives the gaming software it may perform one or more checks on the gaming software to insure it has been approved for use or just simply forward to the destination gaming device without additional checks. All or a portion of the gaming software transfers may be routed through the software authorization agent 50.

In 212, prior to downloading gaming software to the gaming distributor or any other gaming device, the gaming software content provider 51, which may be a game server maintained by a company that develops gaming software or owns the rights to gaming software, may validate the gaming software transaction with the software authorization agent 50. The gaming software content provider 51 may send gaming software transaction information received in a request for a transfer of gaming software received from a gaming device, such as the gaming software distributor 53, to the gaming software authorization agent 50. The software authorization agent 50 may use the gaming software transaction information to approve or reject the transfer of the gaming software. The details of this gaming software transaction are described with respect to FIG. 11.

After sending the gaming software to the gaming software distributor 53, the gaming software content provider 51 may report details of this transaction to the software authorization agent 50 in 212. For instance, the gaming software provider may generate a gaming software transaction receipt that includes a unique digital signature for the gaming software that was sent. Similarly, after receiving the gaming software from the gaming software content provider 51, the gaming software distributor 53 may report details of this transaction to the software authorization agent 50 in 214. For instance, the gaming software distributor 53 may generate a gaming software transaction receipt that includes a unique digital signature for the gaming software that was received. The software authorization agent 50 may compare receipts from the sender and the receiver of the gaming software to insure the correct gaming software has been transferred between the sender and the receiver.

The gaming software distributor 53 may be connected to a plurality of gaming machines and other gaming devices that use gaming software such as gaming machine 54 and 55. The connection between the gaming distributor 53 and the gaming machines, 54 and 55 may be a local area network within a casino but is not limited to local area network within a casino. In one embodiment, gaming software transferred from the gaming software provider may be targeted to a particular gaming machine, such as 55, and the gaming software distributor 55 may forward the gaming software to the gaming machine 55 after receiving it from the gaming software content provider 51. The gaming machine 55 may unpack the gaming software and calculate a digital signature. The digital signature may be sent to the gaming distributor 53 through the local area network and forwarded to the software authorization agent 50 to complete the transaction.

In another embodiment, after a request from a gaming software distributor 53, in 220, a gaming software content provider 51 may download gaming software directly to a gaming machine 54 bypassing the gaming software distributor 53. For example, a gaming software provider 51 may download software to a gaming machine located in a store as described with respect to FIG. 3 via a satellite connection described with respect to FIG. 8. The gaming machine may unpack the software, which may have been compressed, and send acknowledgements of the transfer directly to the gaming software content provider 51, the gaming software distributor and the software authorization agent.

In yet other embodiments, a game server, such as the gaming software distributor 53, may be used to reconfigure the gaming software on a group of gaming machines, such as 54 and 55 via software downloads 218. The game server 53 may transfer a plurality of gaming software titles from one or more gaming software content providers, such as 51 and store these titles on the game server. When the gaming software is transferred from the gaming software content provider, the gaming software content provider and the gaming software distributor may agree to a license (see FIGS. 6 and 7) that allows for a certain number of gaming software downloads over a specific period of time. A gaming machine operator controlling a number of gaming machine may use a game server storing the plurality of gaming software titles to regularly re-distribute gaming software on gaming machines. The redistribution of gaming software via electronic downloads may be performed automatically, i.e., a distribution pattern may be programmed into the game server. Also, gaming software programs may be distributed to a gaming machine via a request from the gaming machine. For instance, a player may request to play a certain game on the gaming machine and the game server may transfer the requested gaming software to the gaming machine.

The transfer of gaming software from the game server to the gaming machine may require an approval from the software authorization agent 50. Further, even if the an approval is not required, gaming software transaction information may be sent to the software authorization agent so that the gaming software residing on any gaming machine at a particular time may be known. Details of a gaming software transaction between a gaming machine 54, a game server 53 and software authorization agent 50 are described with respect to FIG. 12.

The present invention is not limited to only electronic transfers of gaming software between gaming devices. The authorization methods may be also be applied to the manual installation of gaming software. For example, prior to manually installing gaming software on a gaming machine, an installation technician may request approval of the gaming software transaction from a software authorization agent 50 using a hand-held wireless device. The gaming software, which may be stored on a memory device such as CD-ROM may been shipped to gaming machine operator. Gaming software information regarding the gaming software to be manually installed on a gaming machine and information regarding the gaming machine may be entered into the hand-held wireless device and then sent to the software authorization agent. The software authorization agent may use this information to approve the gaming software transaction and to track the gaming software installed on gaming machines.

In another example, a technician may use the software authorization agent to manually check gaming software installed on a gaming machine. The technician may read gaming software information from a particular gaming machine and then using a hand-held wireless device relay the gaming machine software information and gaming machine information to the software authorization agent 50. The software authorization agent 50 may compare the information received from the hand-held wireless device with gaming software information stored in a gaming software registration database to determine whether the gaming machine has the correct software installed on it. The software authorization agent may send a message to the hand-held wireless gaming device indicating whether or not the correct gaming software is installed on a gaming machine. Further, the gaming software registration database may contain information regarding what software is installed on a particular gaming machine and what gaming software upgrades are available. When performing gaming machine maintenance, a gaming machine operator may request this information from the software authorization agent 50 to aid in the maintenance process.

Gaming software may be transferred between two gaming devices using a wireless communication connection. For example, within a casino, a game server may download gaming software to a plurality of gaming machines using a wireless network located within the casino. In another example, gaming software may be downloaded from a hand-held device to a gaming machine using an infrared communication interface. Examples of wireless communication standards that may be supported by a wireless communication connection and associated hardware/software include but are not limited to Bluetooth, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, HomeRF and IrDA. Wireless communications may also be performed using cellular communication technologies with cellular communication standards used in the cellular communication industry.

As described with respect to FIG. 8, the software authorization agent 50 may include a gaming software transaction database. The gaming software transaction database may be used to track the distribution of gaming software on various gaming machines. For instance, in 216, a gaming software content provider may request a report regarding downloads of their gaming software from game servers to gaming machines. The software authorization agent 50 may receive the request, query the gaming software transaction database and generate a report for the gaming software content provider. This type of report may also be generated for a casino operator with many game servers distributed over gaming properties. Advantages of the gaming software transaction database is that it may provide an electronic data trail for billing, security, auditing, dispute resolution, game usage and market trending involving the transfer and the use of gaming software.

Figure 10:
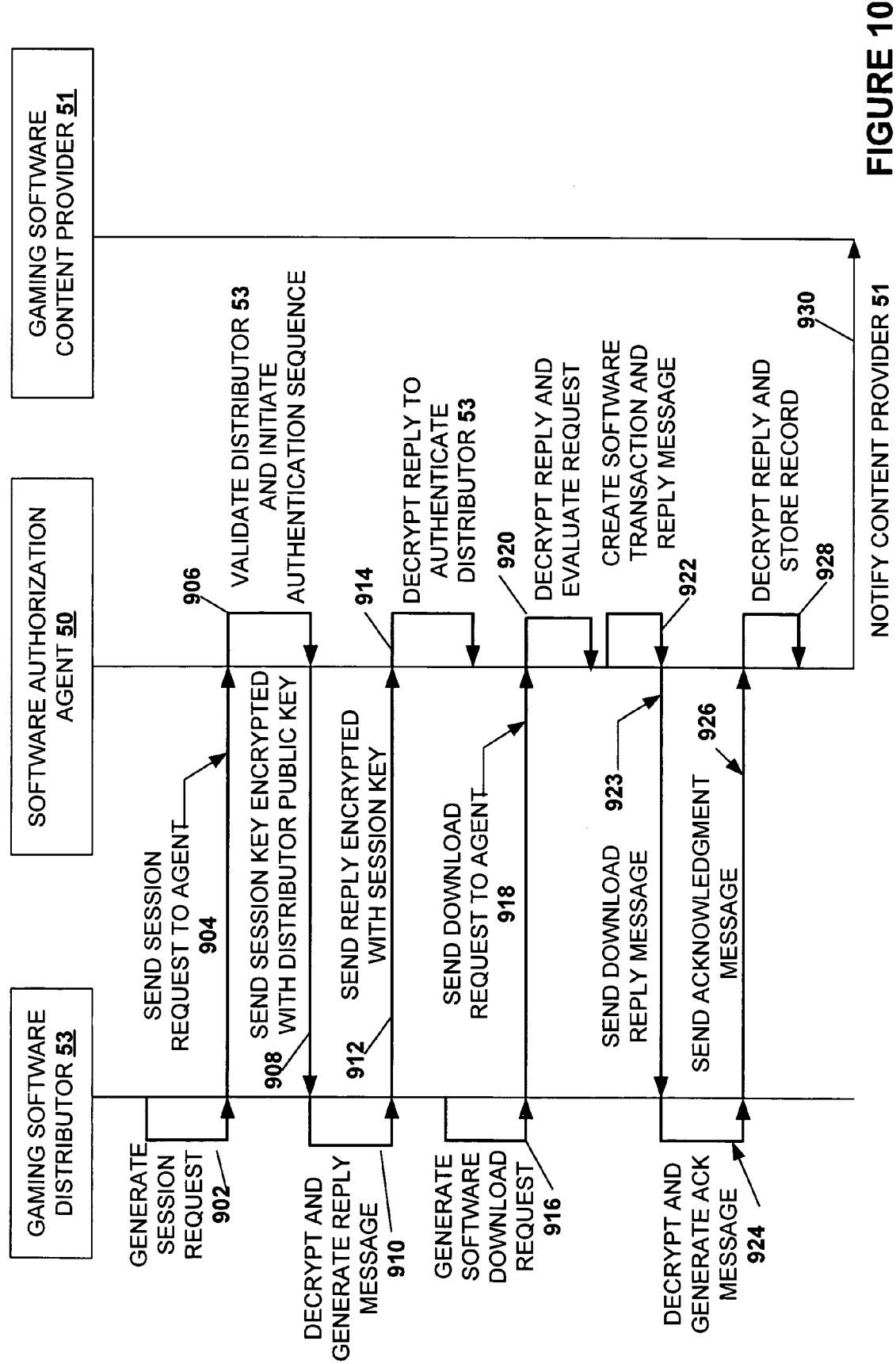
FIG. 10 is an interaction diagram between a gaming software distributor, gaming software provider and a software authorization agent depicting an initialization of a gaming software transaction.

FIG. 10 is an interaction diagram between a gaming software distributor 53, gaming software provider 51 and a software authorization agent 50 depicting an initialization of a gaming software transaction for one embodiment of the present invention. The example is provided for illustrative purposes only. A number of operations used to perform a given function in the gaming software transaction process, an order of the operations and information used in each operation may be varied and is not limited to the examples described with respect to FIGS. 10-15.

In 902, the distributor 53 generates a session request message for the transfer of gaming software and sends the session request message to the agent 50. The initial session request message may comprise gaming software information that is used by the agent 50 to authenticate the identity of the gaming device requesting the session. For instance, prior to beginning the session request, the distributor 53 and the agent 50 may have exchanged public encryption keys and other security information that may be used to establish the identity of the sender of a message to the agent 50 and to identify messages sent from the agent 50. Details of exchanging encryption keys in a secure manner which may be applied to the present invention are described in co-pending U.S. application Ser. No. 09/993,163, by Rowe et al., filed Nov. 16, 2001 and entitled "A Cashless Transaction Clearinghouse," which are incorporated herein by reference in its entirety and for all purposes. The message request may also include additional information that is used in a later software transfer request such as a software title, information regarding the sender of the gaming software and information regarding the receiver of the gaming software. The additional information may be used by the agent 50 after the identity of the session requester has been authenticated.

In 906, the agent 50 receives the session request message from the distributor 53. The agent 50 may attempt to validate the distributor 53 by checking information about the distributor 53, such as its licensing status and access status to the agent 50. Transfers s of gaming software may be a revocable privilege that is granted to a gaming operator. Thus, status checks of session requestor may be necessary. When the session requestor, e.g., the distributor has been validated, the agent may initialize an authentication sequence.

In 908, the agent 50 may send an authentication message containing a symmetric encryption key, K(M). K(M) is stored by the agent 50. A symmetric encryption key is used to decrypt information encrypted with the symmetric encryption key. The authentication message including K(M) and any other additional information is encrypted with a public encryption key, M(P), used by the distributor 53. M(P) was previously received, authenticated and stored by the agent 50. The public encryption key M(P) is part of a public-private asymmetric encryption key pair comprising M(P) and M(PP), where only the distributor 53 should have knowledge of the private key. In an asymmetric encryption key pair, only the private key of the encryption public-private key pair may be used to decrypt information encrypted with the public key.

In 910, when the distributor 53 receives the authentication message, it decrypts the message with its private key, M(PP) which corresponds to the public encryption key M(P). In 912, the distributor 53 generates and sends an acknowledgement message encrypted with K(M). In 914, when the agent 50 receives the acknowledgement message, it decrypts it with the session key K(M) stored in 906. Since only the distributor has the private key M(PP) needed to decrypt K(M), when a correct acknowledgement message is received, the distributor 53 is authenticated. The agent 50 may generate and send an additional message acknowledging the distributor has been authenticated and may now proceed with a gaming software download request.

In 916 and 918, the distributor 53 may generate a software download request message and send it to the agent. The download request message may include combinations of gaming software transaction information selected from but not limited to: a) operator identification information for the gaming device to receive the gaming software, b) machine identification information for the gaming device to receive the gaming software (e.g., an identification number for a gaming machine or a game server), c) operator identification information for the gaming device that is to send the gaming software, d) machine identification information for the second gaming device, e) a gaming software title or gaming software titles to be transferred, f) a gaming software provider identifier such as a name of a company (e.g., IGT), g) a gaming software version number, h) a gaming software identification number and i) information on gaming software currently installed on the gaming device to receive the gaming software. The download request message may be encrypted with symmetric encryption key, K(M). In addition, the download request message may be encrypted with the public encryption key of the agent 50. In one embodiment, the agent 50 may send a request to a gaming device requesting the software currently installed on the gaming device for tracking and regulatory purposes. Further, once it is determined what gaming software is installed on a plurality of gaming machine, the process of upgrading and fixing errors in gaming software may be simplified.

In 920, the agent 50 receives the download request message, decrypts the message and evaluates the request. In one embodiment, the download request information may be included in the session request message sent in 904. Thus, after authenticating and identity of the distributor 53, the agent 50 may begin processing the request in 920 without receiving additional information from the distributor 53. To evaluate the download request, the agent 50 may compare gaming software transaction information in the request message with information stored in a database. For instance, the request message may include a location, address and identification number for a gaming device that is to receive the gaming software. The agent 50 may compare this information with information from a database containing information for gaming devices that are allowed to receive gaming software downloads. The agent 50 may only authorize the download request when the gaming device identification information in the request message matches the gaming device identification information stored in the database. In another example, the request message may include gaming software identification information such as a title, version number and manufacturer. The agent 50 may only authorize the download request when the gaming software identification information in the request message matches gaming software identification information contained in a database used by the agent 50.

In 922, when the download request is approved, the software authorization agent creates a gaming software transaction record and stores the record to a gaming software transaction database. The gaming software transaction record may include but is not limited to gaming software transaction information such as: a) a symmetric encryption key, K(S), that will be used to transfer the gaming software from a first gaming device to a second gaming device, b) a time that the transaction was initiated, c) transaction expiration time, d) a destination ID number (e.g., a number identifying a casino), e) an identification number of the gaming device on which the software is to be installed, f) a gaming software identification number, g) a software title, h) a game signature for the gaming software such as from a CRC or a hash, i) a manufacturer's identification number, j) a public encryption key used by the manufacturer and k) a transaction number for the record. In some embodiments, the gaming software transaction record may include a number of permitted downloads of the gaming software. For instance, a gaming software program may be loaded to a game server. Each time the game server downloads the gaming software to a gaming machine, it may request permission from the software authorization agent 50 using the transaction number in the original record. The software authorization agent may authorize the game server to download the software to a gaming machine as long as the number of permitted downloads has not been exceeded.

In 922 and 923, the software authorization agent may send an approval message with all or a portion of the gaming software transaction information stored in the gaming software transaction record to the gaming software distributor. The message may be encrypted with the session key, K(M), generated in 906. In 924, the distributor 53 may receive the message, decrypt it using the session key, K(M), and generate an acknowledgement message. In 926, the software distributor 53 may send the acknowledgement message to the authorization agent 50. In 928, the authorization agent 50 may receive the acknowledgement and store the record for the gaming software transaction. In 930, the gaming software agent may send a notification message to the gaming software provider 51. The message may notify the gaming software content provider 51 that a gaming software transaction has been authorized that allows some of the provider's 51 to be transferred to another gaming device.

Figure 11:
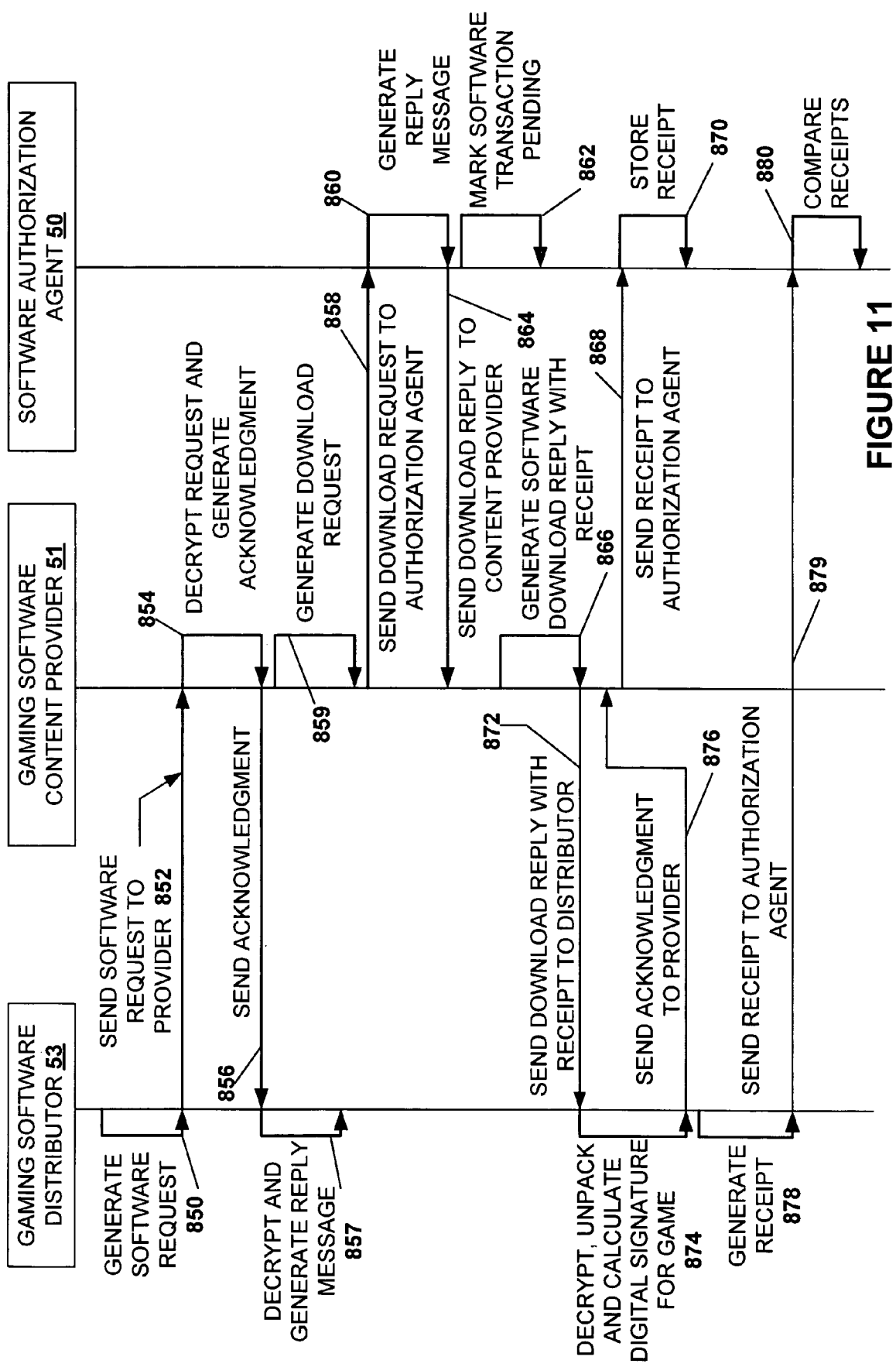
FIG. 11 is an interaction diagram between a gaming software distributor, a gaming software provider and a software authorization agent depicting a gaming software transaction.

FIG. 11 is an interaction diagram between a gaming software distributor, a gaming software provider and a software authorization agent depicting a gaming software transaction. In 850, the distributor may generate a software download request message. The download request message may include gaming software transaction information generated in the gaming software transaction request described with respect to FIG. 10. The download request message may also include a session key, K(S), encrypted with the provider's public encryption key. In 852, the distributor 53 sends the request to the provider 51. In 854, the provider 51 receives the message and decrypts the session key, K(S), with the provider's private encryption key. In 854, the provider generates an acknowledgement message encrypted with the session key K(S). In 856, the provider 51 sends the message to the distributor 53. In 857, the distributor receives the message and decrypts it with the K(S) received from the software authorization agent 50 in the authorization message.

In 859, the software provider 51 may optionally generate a download request message to validate the gaming software transaction requested by the distributor. The download request message may include gaming software transaction information, such as a transaction number, received from the distributor 53. In 858, the provider 51 may optionally send the download request message to the authorization agent 50. The message may be encrypted with the agent's public encryption key. In 860, the agent 50 may receive the download request message from the provider, decrypt it and compare the gaming software transaction information in the message with a gaming software transaction information stored in a gaming software transaction record corresponding to the request. When the request is valid, the agent 50 may generate a download reply message authorizing the provider 51 to transfer the gaming software. When the request is invalid, the agent 50 may generate a download reply message requesting the provider 51 not to send the gaming software to the distributor 53. In 864, the agent sends the download request message to the provider 51. In 862, the agent may store a record of the download request and whether it was authorized or not authorized.

In 866, the provider 51 may generate a download reply with a receipt. In one embodiment, the download reply may require the authorization of the agent 50. In another embodiment, the download reply may be sent without approval from the agent 50. The download reply may include but is not limited to a game package with the following information: 1) the requested game software, 2) the expiration date of the game or a number of plays until expiration which may be built into the gaming software, 3) a destination machine number (in some embodiments, the gaming software may be designed to operate only on a particular machine), 4) a destination address (e.g., a casino name), 5) a time stamp for the transaction, 6) a digital signature generated for the game (e.g., a CRC or a Hash of the game software), 7) the transaction number received from the distributor. The download reply may also include a separate receipt including but not limited to the following information: a) game title or identification number, b) original game transfer request data received in the request from the distributor 53, c) destination machine's identification number, d) destination address and e) a transaction number.

The download reply may be compressed to reduce the information transferred. The download reply may also include information regarding the compression algorithm used so that the destination device may properly uncompress the download reply. The download package and the download receipt may be encrypted with combinations of a public encryption key used by the destination gaming device and the session encryption key, K(S). In one embodiment, the download package and reply may be routed through the software authorization agent 50 which may perform checks on the gaming software before forwarding it to the destination gaming machine. Thus, the download package and receipt may be encrypted with the public encryption key used by the software authorization agent 50.

The download package and the download receipt may go to separate gaming devices. In one embodiment, the download package may be forwarded by the distributor 53 to a destination gaming device such as a gaming machine and the receipt may be forwarded to another gaming device for accounting purposes. In another embodiment, the receipt and download package may go to the same gaming device such as a game server operated by the gaming software distributor 53. In 868, the content provider 51 may send a receipt encrypted with the session key, K(S) to the agent 50. Since only the provider 51 and the distributor have the session key, K(S), the identity of the provider 51 may be authenticated. In 870, the agent 50 may receive the receipt, decrypt it and store gaming software transaction information contained in the receipt.

In 872, the provider sends the download reply with the gaming software and receipt to the distributor 53. In 874, the distributor 53 receives the download message, the message may be forwarded to a destination gaming device or may be stored on a game server. The destination gaming device may decrypt the download message, unpack the gaming software, which may include uncompressing the gaming software, and generate a digital signature for the gaming software. The digital signature may be generated using an algorithm such as a CRC or a Hash. In 876, the destination gaming device may send an acknowledgement message to provider indicating it has received the download message with the gaming software.

In 878, the gaming software distributor 53 generates a receipt. The receipt may include but is not limited to the following information: a) game title or identification number, b) original game transfer request data received in the request from the agent, c) destination machine's identification number, d) destination address and e) a transaction number. The receipt may be encrypted with the session encryption key, K(M), exchanged between the agent 50 in the distributor as described with respect to FIG. 10. Thus, when the agent 50 receives the receipt and decrypts it with K(M), the identity of the distributor may be authenticated.

In 879, the distributor 53 sends the receipt to the agent 50, the agent decrypts the receipt. In 880, the agent 50 may compare gaming software transaction information in the receipt received from the provider 51 in 868 with gaming software transaction information from the receipt received from the distributor 53 in 879. For example, to validate the gaming software transaction, the agent 50 may compare the digital signature for the gaming software received from the provider 51 in the receipt with the digital signature for the gaming software received from the distributor 53. When the digital signatures match, the gaming software transaction is completed and communications are terminated. As an additional check, the agent may compare the digital signatures for the gaming software with a digital signature for an approved copy of the gaming software stored in a database maintained by the agent 50. When the transaction is complete, the agent 50 may store a record of the transaction in a database. As described with respect to FIG. 9, the database may be used to track the distribution of gaming software on various gaming devices that use the authorization agent 50. Also, the records may be used for billing and auditing purposes.

In 880, when gaming software transaction information in the receipts does not match, the agent 50 may send messages to the provider 51 and the distributor 53 revoking the transaction. The message to the provider 51 may be encrypted with the session key, K(S) and the message to the distributor 53 may be encrypted with the session key, K(M). The messages may also be encrypted with public keys of public-private key pairs used by the distributor 53 and the provider 51. In response to receiving the revocation message, the content provider 51 and the distributor 53 may repeat the transaction. For example, the digital signatures for the gaming software may not match because of a transmission error. In another embodiment, the entire gaming software transaction may be revoked and the distributor 53 may have to initiate an entirely new transaction as was described with respect to FIG. 9.

Figure 12:
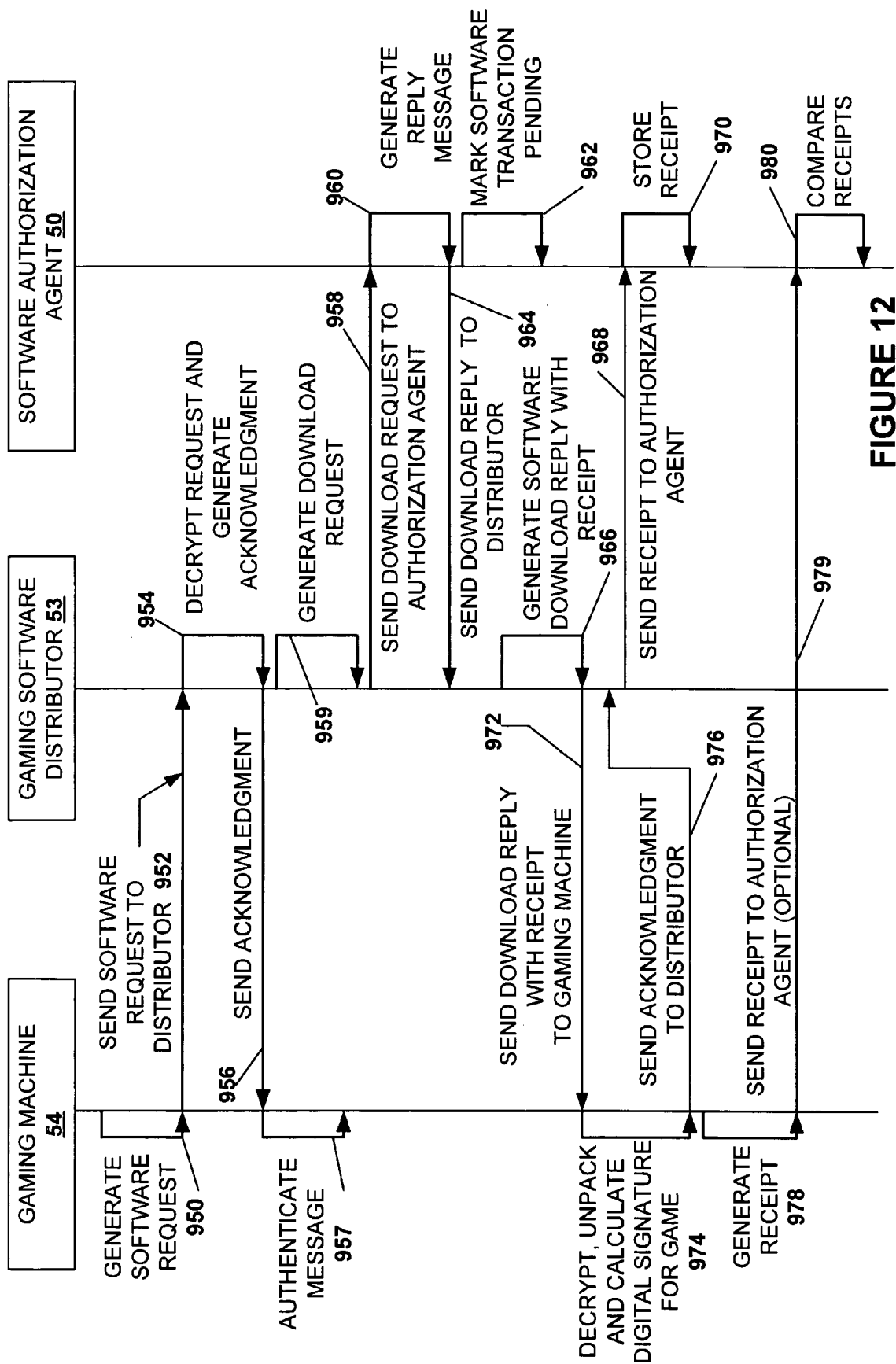
FIG. 12 is an interaction diagram between a gaming software distributor, a gaming machine and a software authorization agent depicting a gaming software transaction.

FIG. 12 is an interaction diagram between a gaming software distributor 53, a gaming machine 54 and a software authorization agent 50 depicting a gaming software transaction. In this example, the distributor 53 may be a game server operated by a casino and the gaming machine 54 may be one of a plurality of gaming machine in communication with the gaming server. The game server may have been loaded with gaming software provided by various content providers using gaming software transactions as described with respect to FIG. 11. In general, the operations shown in FIG. 12 are similar to those described with respect to FIG. 11.

In 950, the gaming machine 54 may generate a gaming software request. The gaming software request may be in response to different gaming events that occur on the gaming machine. For example, a request may be initiated when a game player using the gaming machine requests to play a game of chance currently not installed on a gaming machine. As another example, the gaming machines may include software programs that request gaming software at particular times of the day or the week. For instance, particular bonus games may only be provided on the gaming machines at certain times of the day to increase player interest. In yet another example, a software request may be generated when a game license (see FIGS. 6 and 7) installed on a gaming machine has expired.

In 952, the gaming machine 54 sends the software transfer request to the distributor 53 which in this case is a game server. In 954, the distributor 53 receives the gaming software request message and generates an acknowledgement message. The message may or may not be decrypted. When the gaming machine and the game server communicate via a private local area network, such as within a casino, encryption procedures may not be necessary. However, the game server may communicate with a gaming machine located at different gaming properties, such as stores, via a virtual private network, as was described with respect to FIG. 3. In this case, encryption procedures such as the use of public-private key pairs and symmetric encryption keys may be used. In 956, the distributor 53 sends the acknowledgement message to the gaming machine 54. In 957, the gaming machine 54 receives the acknowledgement message and may authenticate the sender of the message.

In another embodiment of the present invention, the gaming software download request may be initiated by the game server. For example, the game server may be used to regularly redistribute gaming software on gaming machine distributed on a gaming floor according to perceived customer desires and market trends. A market trend may be a "hot" game that is desired by a lot of customers. Further, the gaming server may be also used to provide regularly software upgrades and error fixes to gaming software executed on various gaming machines. The software upgrades and error fixes may be prompted by notices of upgrades and fixes received from a content provider. When the distributor 53 initiates the gaming software transaction, the gaming machine 54 may be simply sent the gaming software. An authentication process may or may not proceed the game server sending the gaming software to the gaming machine.

In 959, the distributor 53 may generate a download request message for the requested gaming software. The request message may have been initiated by the gaming machine 54 or the distributor 53. In 958, the distributor sends the download request to the agent 50. In 960, the agent 50 may generate a reply message that authorizes or denies the transaction and store a record of the gaming software transaction 962. In some embodiments, the distributor 53 may simply send a record of the gaming software transaction to the agent but not ask for or expect an approval message from the agent 50. The agent 50 may store this record. In another embodiment, the agent 50 may have previously approved a certain number of gaming software transfers and may determine if additional downloads are available.

In 964, the distributor receives the download reply from the agent 50. When an authorization has been requested and it has been approved, the gaming distributor 53 may generate a download reply message containing the gaming software. In this embodiment, a receipt may not be required since the gaming software downloaded to the gaming distributor may have already been approved by the agent 50 in a previous gaming software transaction. In 972, the download reply with the gaming software is sent to the gaming machine 54. In 974, the gaming machine receives the download reply and may decrypt and unpack the gaming software. The gaming machine may also calculate one or more digital signatures for the gaming software which may be used to validate that the software has been successfully transferred. In 976, the gaming machine 54 may send an acknowledgement message to the game server of the distributor 53 that it has received the requested gaming software. The gaming machine 54 may also store a gaming software transaction record of the gaming software download in a non-volatile memory device. The gaming software transaction record may be used for used for auditing and security purposes.

Optionally, in 978, the gaming machine 54 may generate a receipt or some other type of acknowledgement message that it has received the gaming software and send it to the authorization agent 50. In 968, the game server of the distributor 53 may also send a receipt or acknowledgement message to the agent 50. In 970 and 980, the agent 50 may receive the acknowledgement messages from the gaming machine 50 and the distributor 53 and store a record of the gaming software transaction. The agent may also use gaming software transaction information included with the acknowledgement messages to determine if the gaming software transaction has been correctly carried out.

Figure 13:
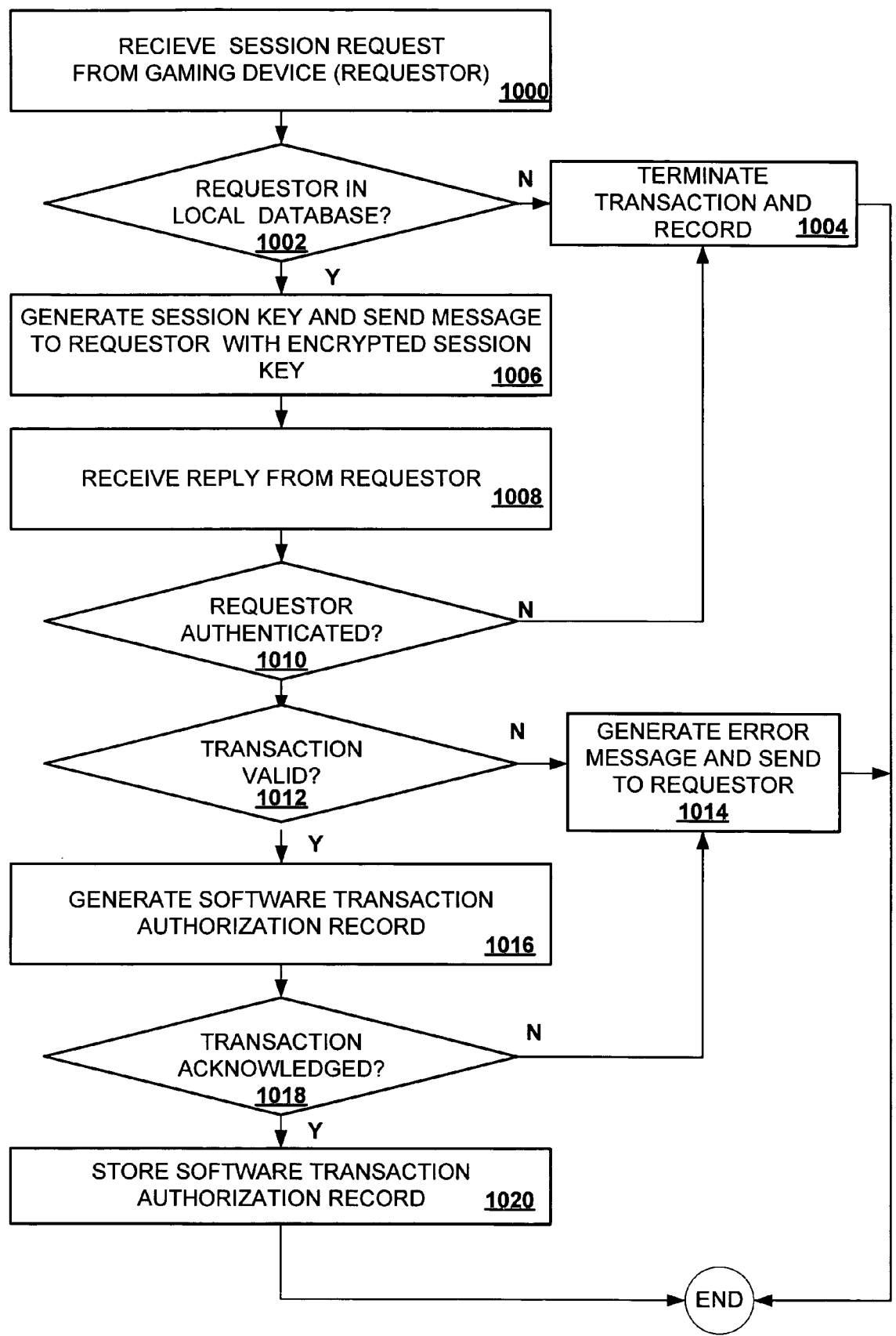
FIG. 13 is flow chart depicting a method in a software authorization agent initializing a gaming software transaction.

FIG. 13 is flow chart depicting a method in a software authorization agent initializing a gaming software transaction. In 1000, the agent receives a gaming software transaction session request message from a gaming software distributor or another gaming entity desiring a transfer of gaming software. The transfer of gaming software may be implemented electronically or manually. In a manual transmission, the gaming software may be shipped to the distributor and loaded locally onto a gaming device, such as a gaming machine. In 1002, the authorization may check to determine if the requestor identified in the message is in a local of database of gaming entities that are authorized to request transfers of gaming software. When the requester is not in the database, in 1004, the agent may terminate the transaction and generate a record of the attempted transaction and store the record. Records of failed transactions may be analyzed for security purposes.

When the requestor is in a local database, the agent may generate a symmetric encryption key that may be used to encrypt messages sent between the agent and the requestor and store the symmetric encryption key. Further, for authentication purposes, the agent may encrypt the symmetric encryption key with a public encryption key used by the requestor and send a message with the encrypted symmetric encryption key to the requestor. In one embodiment, prior to the session request, the requestor and the agent may have exchanged public encryption keys of public-private encryption key pairs. In 1008, the agent receives a reply message from the requestor. The message may contain a symmetric encryption key encrypted with the agent's public key. The agent decrypts the symmetric encryption key with the agent's private key.

In 1010, the agent compares the symmetric encryption key to the symmetric encryption key sent to the requestor in 1006. When the encryption keys agree, the identity of the requestor is assumed to be authenticated. In addition to a symmetric encryption key, other types of information, such as passwords or random bits, may be encrypted and exchanged between the requestor and agent. The other types of exchanged information may be compared as part of the authentication process. When the requestor is not authenticated, in 1004, the transaction is terminated and a record of the failed transaction may be generated.

When the identity of the requestor is authenticated, in 1012, the agent may evaluate and validate one or more parts of a download request for gaming software from the requestor. For instance, the agent may determine if a requested gaming software title has been approved for downloads or transfers. As another example, the download request may include identification information for a gaming device that will receive the requested gaming software. The agent may compare identification information for the destination gaming device with identification information from a database of gaming devices approved for receiving gaming software. In 1014, when the information in the download request is not valid, the agent may generate an error message and it to the requestor. The error message may indicate detected errors in the request such as missing information or a request for a gaming software title unknown to the agent.

In 1016, when information in the download request has been validated, the agent may generate an authorization record for the gaming software transaction as previously described with respect to FIG. 9. The agent may also generate an acknowledgement message and send it to the requestor. In 1018, the agent may check to determine whether a reply has been received for the acknowledgement message. In 1014, when an acknowledgement reply message has not been received, the agent may generate an error message and send it to the requestor. In 1020, when the acknowledgement reply message has been received, the agent may store a record of the authorized transaction to a database. In one embodiment, the agent may also notify a software content provider that has been authorized to transfer the gaming software of the pending gaming software transaction that has been authorized.

Figure 14:
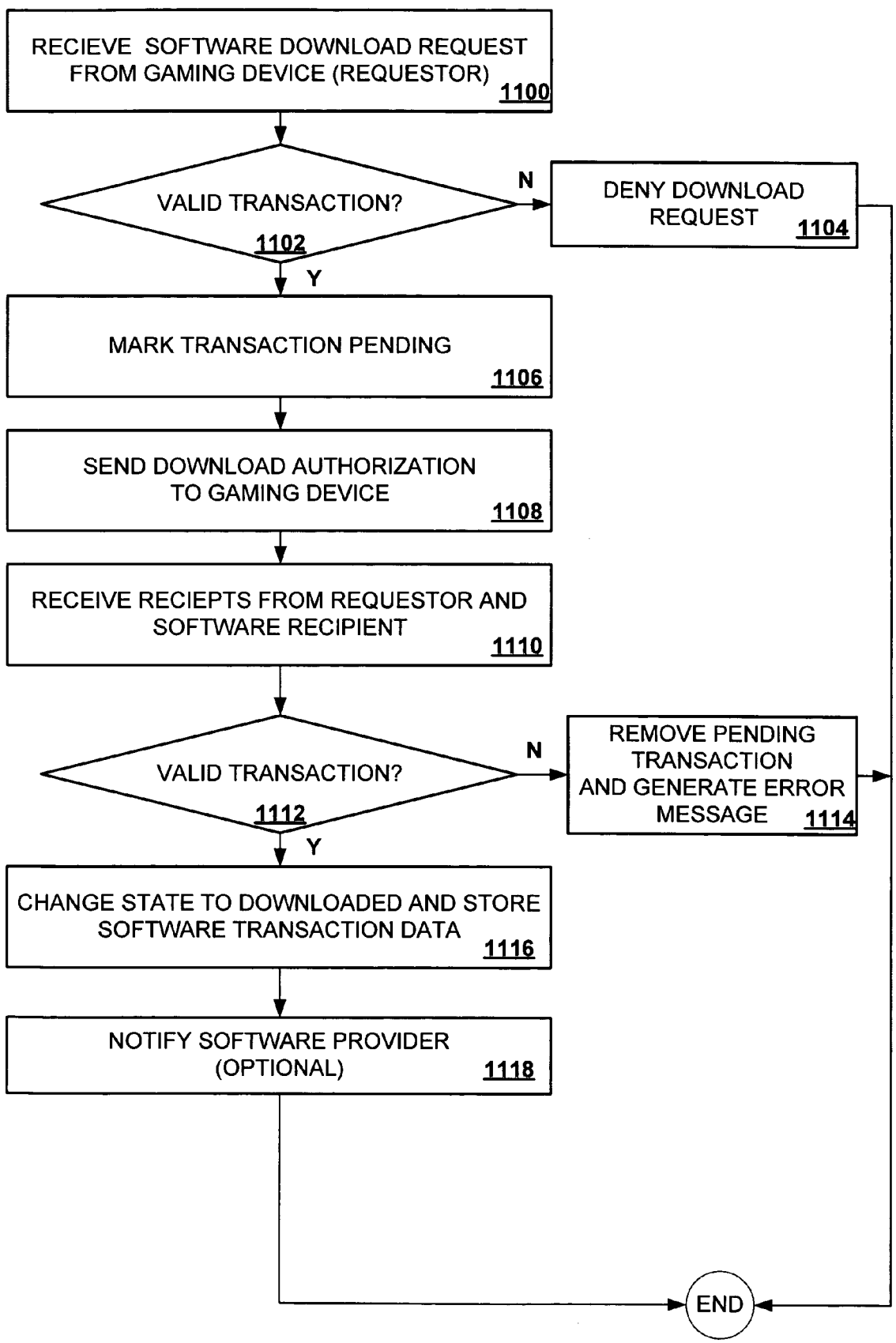
FIG. 14 is flow chart depicting a method in a software authorization agent of authorizing a gaming software transaction.

FIG. 14 is flow chart depicting a method in a software authorization agent of authorizing a gaming software transaction. In 1100, the agent receives a gaming software transfer request form a gaming device. The transfer request may describe a gaming software transaction previously generated and authorized by the agent. The gaming device may be a game server, a gaming machine or any other gaming device that is allowed to receive gaming software. Further, the gaming device may request a transfer of the gaming software to another gaming device different from itself. For instance, a game server may request a transfer of gaming software to a gaming machine. In 1102, the agent may determine whether the transfer request is a valid gaming software transaction. For example, the transfer request may contain a transaction number and the agent may use this transaction number to locate a gaming software transaction record including gaming software transaction information describing the transaction. The agent may compare the information from the gaming software transaction record with gaming software transaction information contained in the transfer request. The transaction record may also include status information such as whether the transaction has been completed or is pending and an expiration date for the transaction, which may be checked by the agent.

In 1104, when the gaming software transaction is invalid the agent denies the transfer request, may send an error message and may also store a record of the denied transfer request. In 1106, when the gaming software transaction has been validated, the agent may change the status of the transaction to pending and store the status. In 1108, the agent may send a transfer reply to the gaming device requesting the gaming device to proceed with the transaction. In 1110, the agent may receive acknowledgement messages from the gaming device that has sent the gaming software (e.g., a content provider) and from the gaming device that has received the gaming software (e.g., a gaming machine or a game server). The acknowledgement messages may include information about the transferred gaming software. For example, the acknowledgement message may include a digital game signature for the gaming software generated by the both the sender and the receiver of the gaming software.

In 1112, the agent may validate the transaction by comparing gaming software transaction information received from both the receiver and the sender of the gaming software. For instance, the agent may compare digital signatures for the gaming software generated by the sender and the receiver. In 1114, when the transaction is invalid, the agent may change the status of the transaction from pending and generate an error message. The error message may be sent to the requestor of the gaming software and the sender of the gaming software and identify any deficiencies detected by the agent. In 1116, when the transaction is valid, the agent may change the status of the transaction to downloaded and store additional information in the transaction record such as the time that the transaction was completed. In 1118, the agent may optionally notify the requester of the gaming software and the provider of the gaming software that the transaction has been successfully completed. In some embodiments, the agent may even bill the requestor of the gaming software and arrange for an electronic fund transfer or other payment method.

Figure 15:
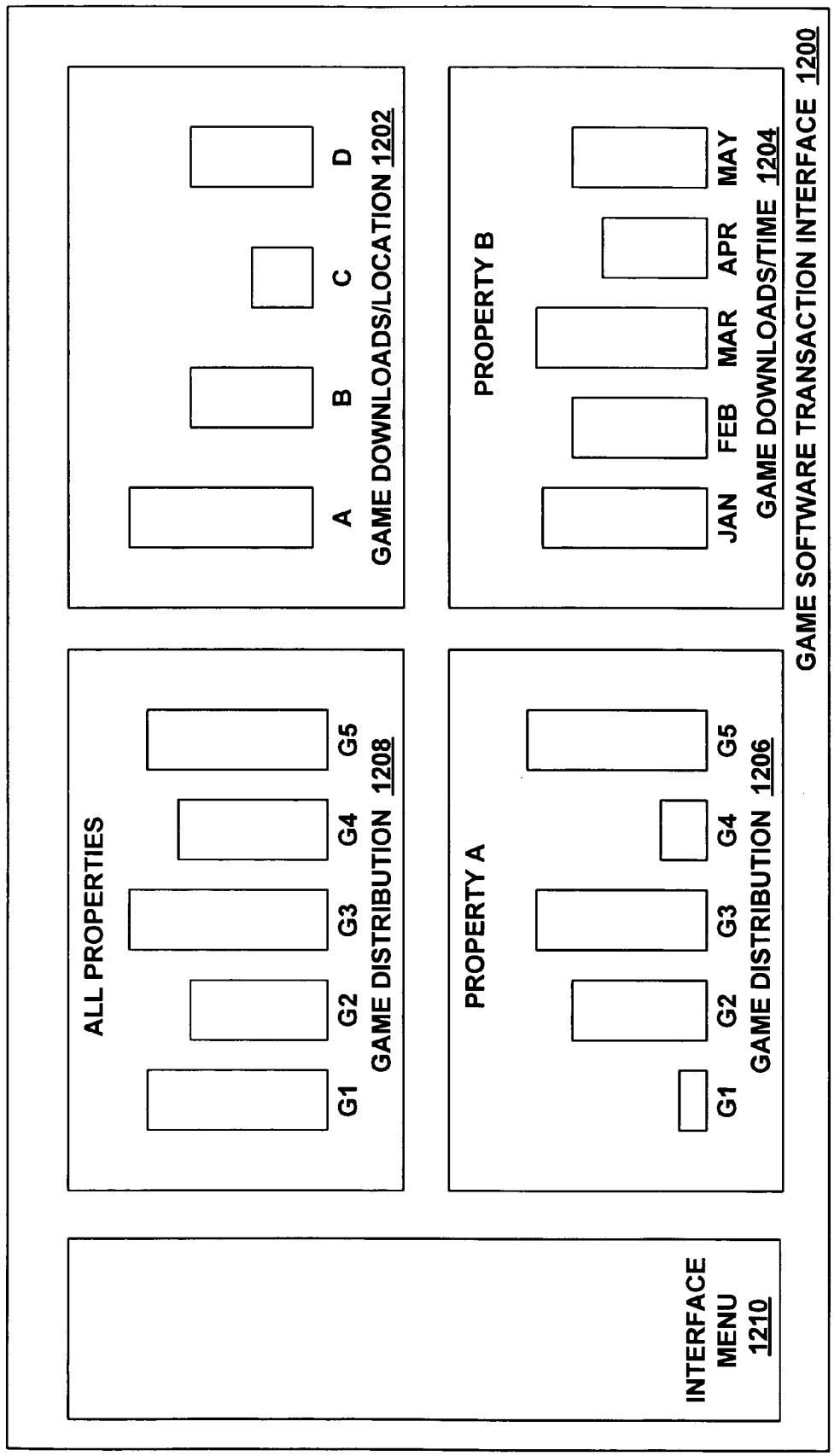
FIG. 15 is a block diagram of an interface used to provide information about gaming software transactions generated by a software authorization agent.

FIG. 15 is a block diagram of an interface 1200 used to provide information about gaming software transactions generated by a software authorization agent. The interface menu 1210 may allow a user to view information in different formats, perform queries of a gaming software transaction and perform other operations on gaming software transaction data such as analyzing market trends. The interface may be used from a remote site to access gaming software transaction stored in a database. The access to the gaming software transaction database may be limited according to the identity of a particular user. For example, a gaming regulatory agency maintaining the transaction database may be able to look at all of the gaming software transactions stored in a database. A gaming software content provider may be able to access transactions involving the transfer of their gaming software. A gaming entity such as a casino operator may be able to access transactions involving gaming devices operated by the casino.

In 1202, 1204, 1206 and 1208, a few examples of plots that may be derived form a gaming software transaction database are shown. The plots are shown for illustrative purposes only and are not limited to the examples shown in the figure. In 1202, a total number of game downloads as a function of location are shown. This type of plot may be generated for a gaming entity with gaming devices at locations A, B, C and D or even a content provider that provides gaming software to each of these locations via gaming software transactions. In 1204, a number of game downloads as a function of time are plotted for property A. The plot shows the variation in game downloads from month to month. In 1206, a gaming software distribution for five different types of games at property A are shown. As described with respect to FIG. 9, if an initial distribution of gaming software on different gaming devices are known, then the gaming software transaction records may be used to track the distribution of games on the gaming devices. In 1208, a game distribution for the five different types of games is shown across multiple gaming properties.

Game Software Management: Licensing Models Downloads and Auditing

FIGS. 16-20 describe embodiments of a system for providing game-on-demand downloads of game software, game licensing services and game software tracking/auditing software. The figures include a number of system diagrams, a block diagram of software on a gaming machine that may be used in the system and a flow chart of a download/licensing method that may be employed in the system. The gaming system components and gaming machines, described with respect FIGS. 16, 17A-D, 18-20, may employ the gaming machine hardware described with respect to FIG. 1, the VPN communication methods described with respect to 2-5B, the software licensing methods described with respect to FIGS. 6 and 7 and the software download architecture, methods and tracking features described with respect to FIGS. 8-15.

A number of embodiments of the present invention are described with respect to FIGS. 16-20. These particular embodiments include but are not limited to 1) uniquely identifying and dynamically certifying each copy of game software executed in the gaming system, 2) game licensing and usage tracking using license tokens, 3) decreasing download times using peer-to-peer transfers between gaming machines and network load balancing, 4) copy protection using code embedded in game software and product activation methods, 5) game-on-demand services in a mixed client/host and a distributed game processing environment and 6) redundant network mediation and service mediation to ensure uninterrupted gaming services. The disclosed methods also address the software management functions such as licensing validation, licensing monitoring, licensing update, billing, accounting, and game performance records. Prior to describing the gaming system in FIG. 16-20, a context for the gaming system in regards to game downloading and game licensing is provided.

An important aspect of the present invention is game software licensing and game license management. When a gaming platform is capable of providing multiple games to a game player based upon a game selection made by the player or an operator, it may be desirable from both an operator perspective and a content provider perspective to provide capabilities for allowing more complex game licensing methods. The operator and content provider may use the licensing capabilities to enter into licensing agreements that better reflect the value of the content (e.g., game software) to each party. For instance, the licensing parties may agree to utility model based licensing schemes, such as pay-per-use scheme. In a pay-per-use scheme, operators only pay for game software that is utilized by their patrons protecting them for software titles that are "duds."

Game platforms exist that provide access to multiple electronic games. On these devices, a game selection menu may be provided on a video display, which offers the patron the choice of at least two electronic games and a game player may select a game of their choice from the games available on the gaming machine. Typically, the choices of games available to the player are only those licensed for play on the gaming platform. The gaming platform may provide a manual mechanism, such as a display interface on the gaming machine, for updating and renewing licensing on the gaming machine.

In some game platforms offering multiple games, the games are stored on read-only memory device, such as an EPROM chip sets or a CD-ROM. To provide new or a different game on a gaming platform of this type, a technician, usually accompanied by a gaming regulator, must manually install a new memory device (e.g. EPROM) and then manually update the licensing configuration on the gaming machine. The gaming regulator then places evidence tape is then placed across the EPROM. The evidence tape is used to detect tampering between visits by the gaming regulator. Since operations performed by entities other than a "trusted" $3^{rd}$ party, such as a gaming regulator, have been deemed untrustworthy, automatic game downloads and automatic licensing management is not available on these platforms.

The licensing of multiple games on a gaming machine is described in U.S. Pat. No. 6,264,561 (Electronic Gaming Licensing Apparatus and Method, assigned to IGT (Reno, Nev.)), which is incorporated herein in its entirety and for all purposes. In 6,264,561, multiple games may be stored on an EPROM. Typically, the EPROM may store up to 10 games. The method for getting a license to turn on 3 of 10 games consists of having an operator log onto the gaming machine, select the games to activate and obtain a request code for the selected games that allows them to be activated. Typically, the games are licensed for a limited time period. One disadvantage to this technique lies in the finite capacity of the storage device (EPROM in this case). While 5 or even 10 games can be stored on an EPROM, IGT's library of thousands of games cannot fit. Switching to higher capacity devices such as DVD will postpone the problem somewhat, but this device will be eventually saturated as well.

Other disadvantages are that the games are manually installed and activated. Thus, any changes or upgrades to the software on the gaming machine, such as adding a new game or fixing software on any of the games on the storage device involves replacing the entire storage device. As the number of games on the storage devices is increased and more games are made available on gaming platforms, it is likely that more frequent configuration changes on the gaming platform will be desired. As the number of configuration changes increases, it becomes more desirable to automate the configuration and licensing process.

One method to avoid swapping of the physical DVD, EPROM, etc., devices that store the game programs is to electronically download the necessary software into the gaming machine as was described with respect to FIGS. 8-15. Software download also allows a gaming machine to access scalable server farms and databases to select a set of games it needs from the game library. A desire of casino operators after games are safely downloaded is the ability to electronically move the games around on the casino floor. Casino managers routinely move slot machines (entire slot machine) around the floor in search of the optimum layout. A popular new game might be located near the door, but an older game might be better suited in the back. A Harley-Davidson™ game might be moved to the front during a Biker's convention, etc. Casinos often protect the arrangement of slot games as trade secrets. The laborious and costly casino floor rearrangement process needs to be expedited. When games can be electronically downloaded, they may also be electronically moved around the casino floor.

When a choice of games is offered, it complicates their distribution in part because every customer (purchaser of game software) may choose to license a unique combination of games. For example, one may choose Blackjack, Poker, and Keno while another chooses Poker, Twenty One, and Wheel of Fortune. One means to provide this would be to create a custom configuration of game software as requested by each customer. But, this "binary packaging" can be difficult and time consuming to manage especially in an envisioned environment where hundreds of new games may be introduced each year and distributed to thousands of slot machines on a typical casino floor. Another method of game licensing is to distribute all games to every customer and use an encryption technique that allows customers to 'unlock' only the games they are willing to buy, and install them only on the number of machines for which they have licenses. As described above, the activation is performed manually at the gaming machine. It is anticipated that it will be difficult to manage manually a game inventory mix in an environment where hundreds of new game titles may surface each year.

Manual activation schemes enforced with encryption present problems. Managers often change the selection and mix of games found in a given area of the casino because it can dramatically affect the amount of play and revenue. From the viewpoint of gaming operators, the overhead associated with manually activating encrypted games each time a game is added, deleted or transferred is a deterrent to providing gaming platform with multiple games. In addition, once the 'key' has been given to 'unlock' a particular game on one machine, it may be difficult to then revoke a key residing on a stand-alone machine. In a stand-alone machine, an operator must manually access the interior of the gaming machine and install software that revokes the key. Without the ability to 'lock' games once they have been 'unlocked,' multiple, unauthorized copies could operate simultaneously.

It is unacceptable to game content providers and gaming regulators to allow the use of unauthorized and untracked software on gaming platforms. To be properly compensated, game content providers want to know where and how much their software is being used. To ensure fairness, gaming regulators need to be able show that game software residing on a gaming machine is authentic and approved game software from an authorized content provider. In light of the above, methods that automate the game changeover process on gaming machine while providing an accurate record of the software transactions for auditing purposes and for use in utility licensing models are desirable.

In the past, a game license has been associated with the game software and the physical gaming machine that runs it. For example, the license may have been tied to a particular CPU or microprocessor on the gaming machine. In future gaming systems with gaming machines that are download enabled and contain multiple cells or cores that are capable of running multiple "virtual machines," it is anticipated that the game software and its license may no longer be associated with the gaming machine on which it is executed. In this environment, the game software may be allowed to "float" between various gaming devices and the physical device where the game software is executed becomes less relevant. For example, a casino floor could have 3000 gaming machines/game servers with the capability of generating 10,000 games of chance simultaneously where each gaming machine has the ability to remotely generate a game outcome on the other gaming machines or download game software to the other gaming machines. For the purposes of licensing, each instantiation of a game of chance may be viewed as a "virtual" gaming machine where each "virtual" gaming machine may be licensed individually. Thus, a license management system and methods are needed to manage game licenses for the 10,000 virtual gaming machines in a manner that meets the requirements of game regulators, casino operators, gaming machine manufacturers and game software content providers.

To implement gaming downloads for operator configuration purposes as well as game-on-demand for game players, the concerns and issues of many gaming interests, such as game players, casino operators, gaming regulators and game software providers, must be considered. The concerns and issues may include but are not limited to licensing requirements, regulatory requirements, network reliability and download time. Details of apparatus and methods designed to address these concerns are described with respect to the following figures.

Figure 16:
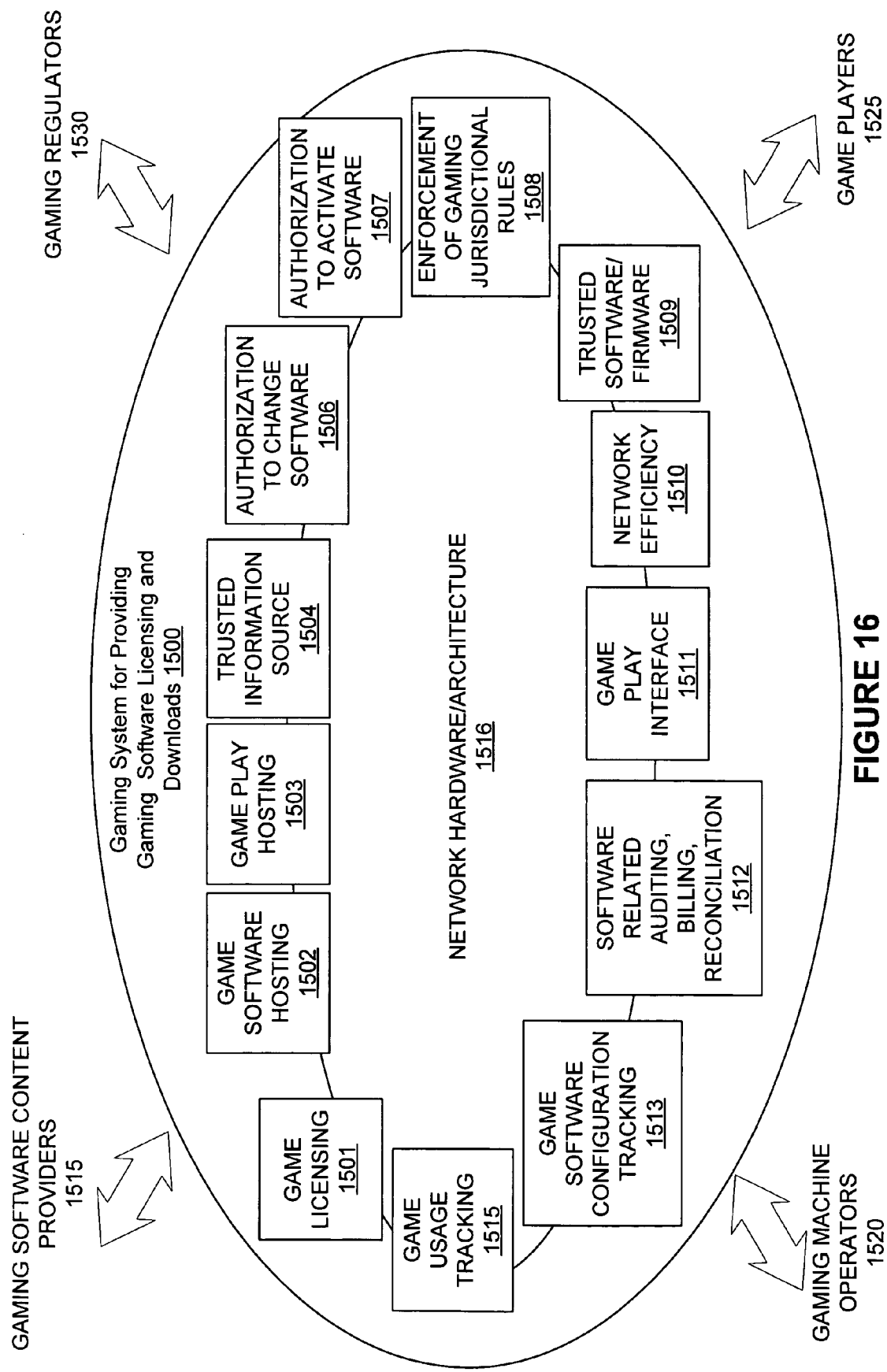
FIG. 16 is a block diagram of a gaming system of the present invention.

In FIG. 16, the components of a gaming system 1500 for providing game software licensing and downloads are described functionally. The described functions may be instantiated in hardware, firmware and/or software and executed on a suitable device. In the system 1500, there may be many instances of the same function, such as multiple game play interfaces 1511. Nevertheless, in FIG. 16, only one instance of each function is shown. The functions of the components may be combined. For example, a single device may comprise the game play interface 1511 and include trusted software and firmware 1509.

The gaming system 1500 may receive inputs from different groups/entities and output various services and or information to these groups/entities. For example, game players 1525 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 1500, receive revenue for the use of their software and compensate the gaming machine operators. The gaming regulators 1530 may provide rules and regulations that must be applied to the gaming system and may receive reports and other information confirming that rules are being obeyed.

Figure 18:
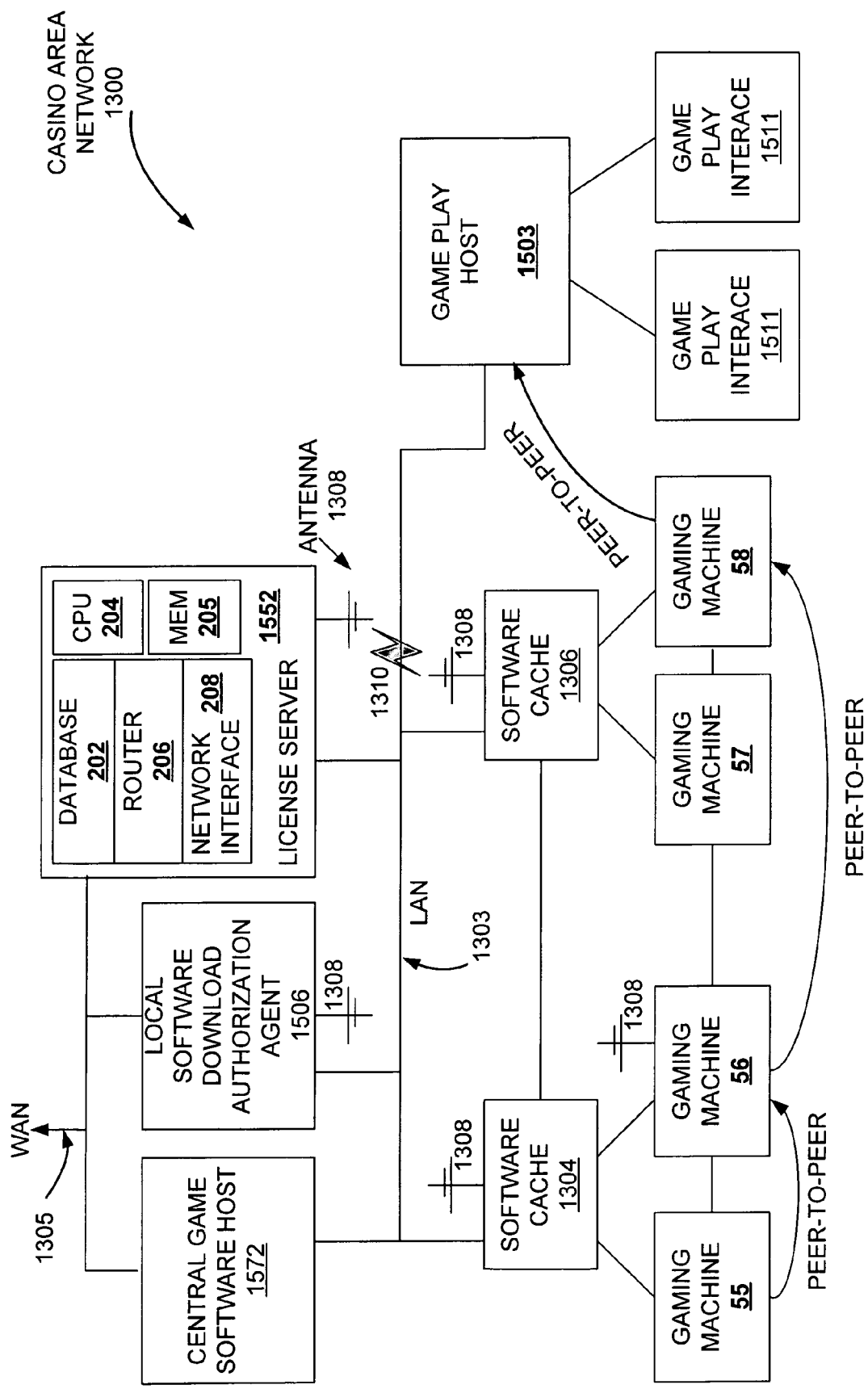
FIG. 18 is block diagram of a gaming system of the present invention with redundant network mediation and peer-to-peer game downloads.
Figure 19:
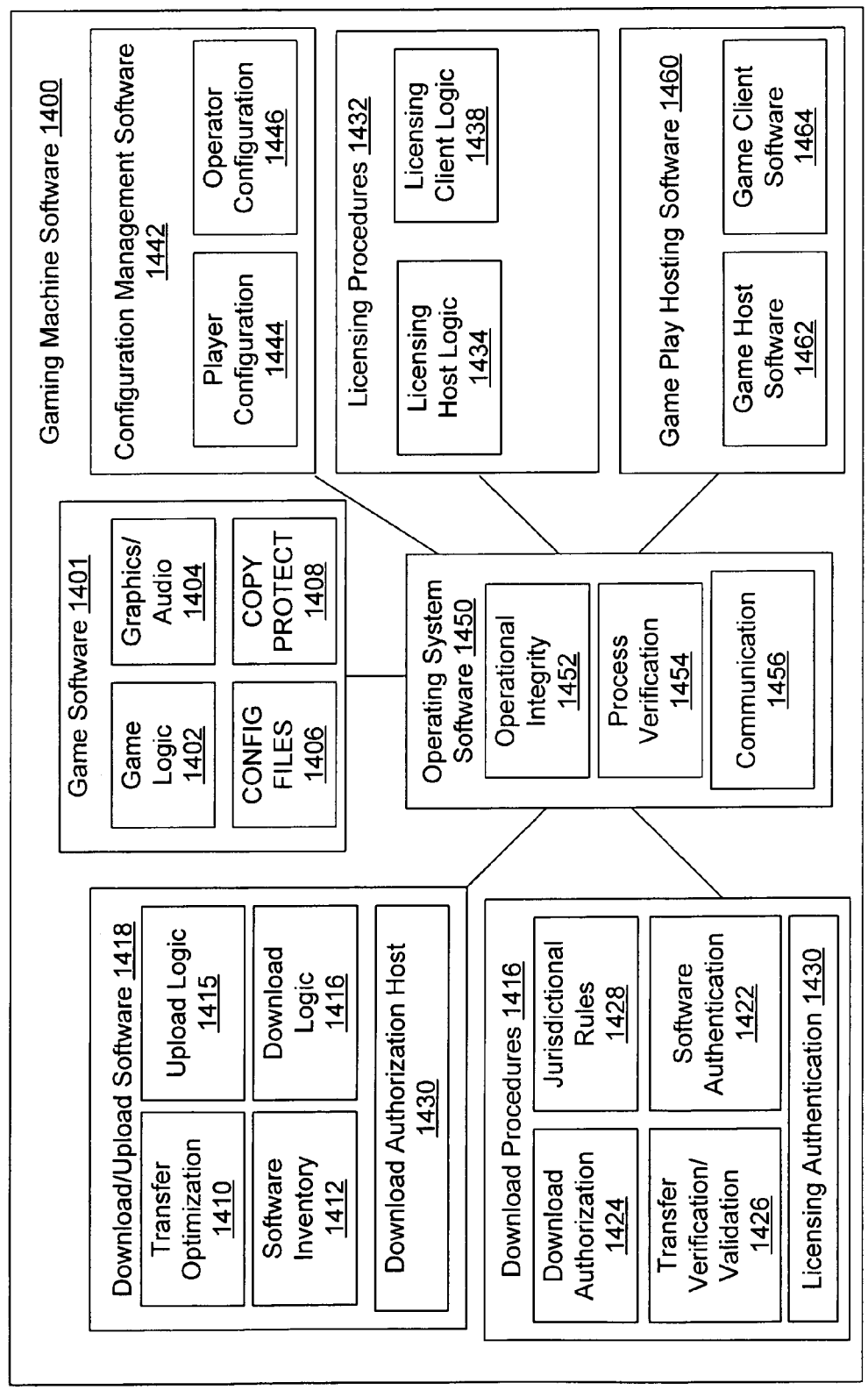
FIG. 19 is block diagram of software on a gaming machine of the present invention.
Figure 20:
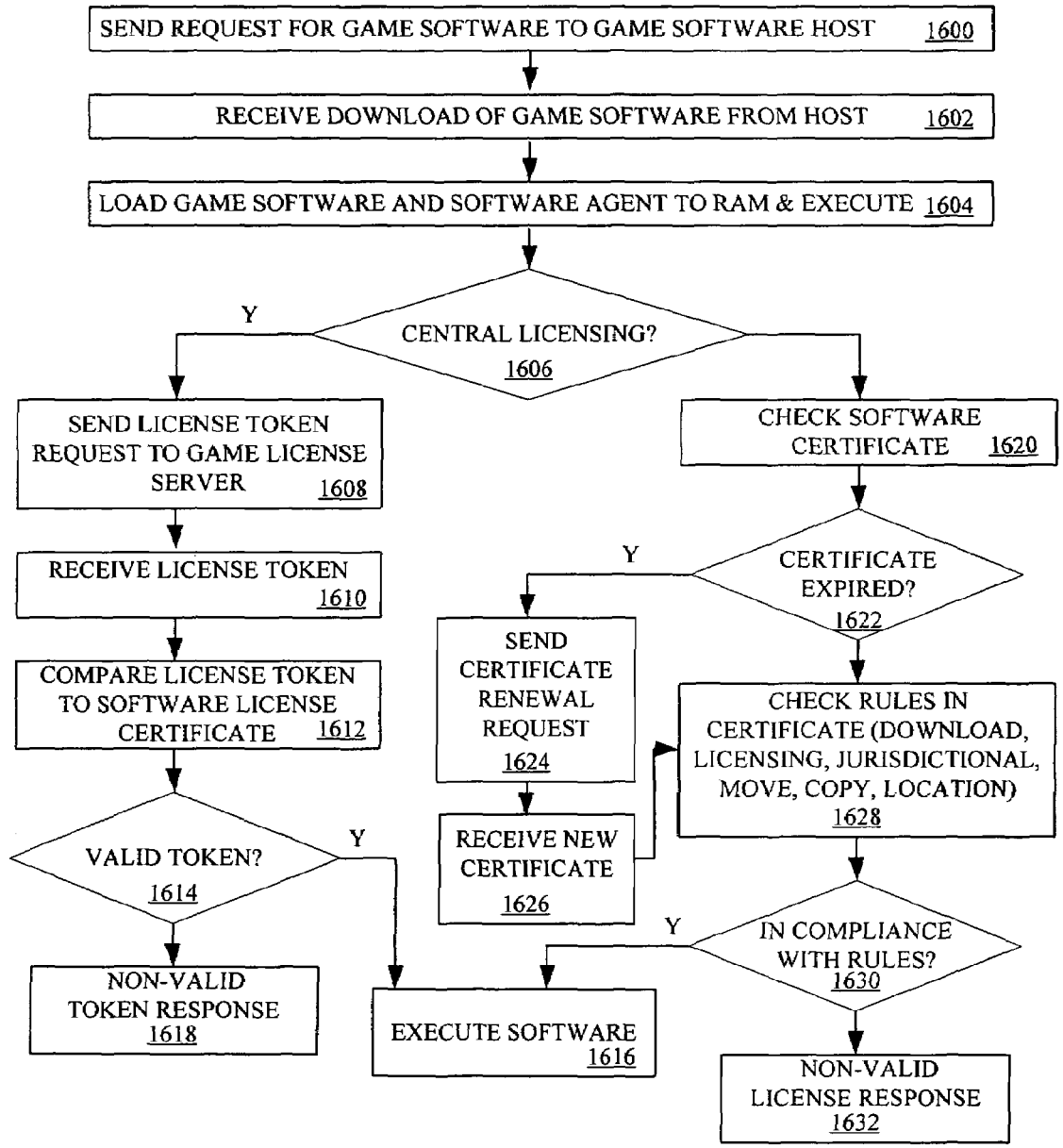
FIG. 20 is a flow chart illustrating a method of providing game downloading and game licensing on a gaming machine of the present invention.

In the following paragraphs, details of each component and some of the interactions between the components are described with respect to FIG. 16. In FIGS. 17A-D, details of a few interactions between the components of the system 1500 relating to software licensing and software downloads are described in light of four different configuration scenarios. The described interactions relate to a limited portion of the system 1500. In FIG. 18, one embodiment of system 1500 is described. In particular, aspects of network efficiency are discussed. In FIG. 19, details of a gaming machine that may be used in system 1500 are described. In FIG. 20, a flow chart describing downloading and licensing methods implemented on gaming machines that may be used with system 1500 is described.

The game software license host 1501 may be a server connected to a number of remote gaming devices that provides licensing services to the remote gaming devices. For example, in embodiments that are described in further detail with respect to FIGS. 17A-D, the license host 1501 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1515 may track the usage of game software on a plurality of devices in communication with the host. The game usage-tracking host 1515 may be in communication with a plurality of game play hosts and gaming machines. From the game play hosts and gaming machines, the game usage tracking host 1515 may receive updates of an amount that each game available for play on the devices has been played and on amount that has been wagered per game. This information may be stored in a database and used for billing according to methods described in a utility based licensing agreement.

The game software host 1502 may provide game software downloads, such as downloads of game software or game firmware, to various devious in the game system 1500. For example, when the software to generate the game is not available on the game play interface 1511, the game software host 1502 may download software to generate a selected game of chance played on the game play interface. Further, the game software host 1502 may download new game content to a plurality of gaming machines via a request from a gaming machine operator.

In one embodiment, the game software host 1502 may also be a game software configuration-tracking host 1513. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1503 may be a host server connected to a plurality of remote clients that generates games of chance that are displayed on a plurality of remote game play interfaces 1511. For example, the game play host device 1503 may be a server that provides central determination for a bingo game play played on a plurality of connected game play interfaces 1511. As another example, the game play host device 1503 may generate games of chance, such as slot games or video card games, for display on a remote client. A game player using the remote client may be able to select from a number of games that are provided on the client by the host device 1503. The game play host device 1503 may receive game software management services, such as receiving downloads of new game software, from the game software host 1502 and may receive game software licensing services, such as the granting or renewing of software licenses for software executed on the device 1503, from the game license host 1501.

In particular embodiments, the game play interfaces or other gaming devices in the gaming system 1500 may be portable devices, such as electronic tokens, cell phones, smart cards, tablet PC's and PDA's. The portable devices may support wireless communications and thus, may be referred to as wireless mobile devices. The network hardware architecture 1516 may be enabled to support communications between wireless mobile devices and other gaming devices in gaming system. In one embodiment, the wireless mobile devices may be used to play games of chance.

The gaming system 1500 may use a number of trusted information sources. Trusted information sources 1504 may be devices, such as servers, that provide information used to authenticate/activate other pieces of information. CRC values used to authenticate software, license tokens used to allow the use of software or product activation codes used to activate to software are examples of trusted information that might be provided from a trusted information source 1504. Trusted information sources may be a memory device, such as an EPROM, that includes trusted information used to authenticate other information. For example, a game play interface 1511 may store a private encryption key in a trusted memory device that is used in a private key-public key encryption scheme to authenticate information from another gaming device.

When a trusted information source 1504 is in communication with a remote device via a network, the remote device will employ a verification scheme to verify the identity of the trusted information source. For example, the trusted information source and the remote device may exchange information using public and private encryption keys as describe with respect to FIGS. 4 and 5 to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1500 of the present invention may include devices 1506 that provide authorization to download software from a first device to a second device and devices 1507 that provide activation codes or information that allow downloaded software to be activated. The devices, 1506 and 1507, may be remote servers and may also be trusted information sources. Details of a software authorization agent 50 used to authorize the downloading of game software are described with respect to FIGS. 9-11. One example of a method of providing product activation codes that may be used with the present invention is describes in previously incorporated U.S. Pat. No. 6,264,561.

A device 1506 that monitors a plurality of gaming devices to determine adherence of the devices to gaming jurisdictional rules 1508 may be included in the system 1500. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1500 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 1516 with different types of hardware using different hardware architectures. A few examples of network architectures that may be used with the present invention are described with respect to FIGS. 3, 8 and 18. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 1510 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 1512. For example, a software licensing billing server may generate a bill for a gaming device operator based upon a usage of games over a time period on the gaming devices owned by the operator. In another example, a software auditing server may provide reports on game software downloads to various gaming devices in the gaming system 1500 and current configurations of the game software on these gaming devices.

At particular time intervals, the software auditing server 1512 may also request software configurations from a number of gaming devices in the gaming system. The server may then reconcile the software configuration on each gaming device. In one embodiment, the software auditing server 1512 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 16. Many of the interactions are coupled. For example, methods used for game licensing may affect methods used for game downloading and vice versa. For the purposes of explanation, in FIGS. 17A-D, details of a few possible interactions between the components of the system 1500 relating to software licensing and software downloads are described in light of four different configuration scenarios. The scenarios are selected to illustrate particular interactions in the game system 1500. These scenarios are provided for the purposes of explanation only and are not intended to limit the scope of the present invention.

Figure 17A:
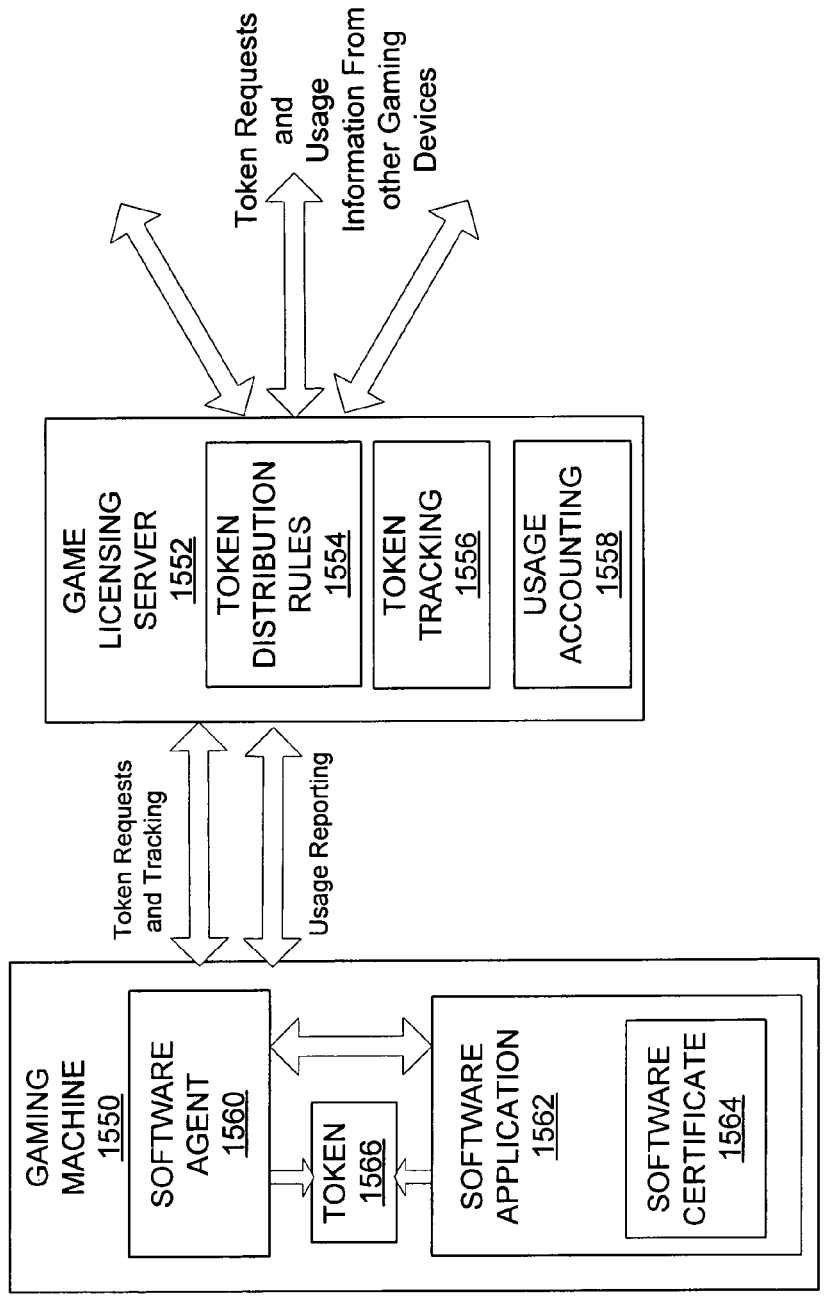
FIGS. 17A-D are block diagrams showing interactions between different gaming devices in a gaming system of the present invention for a number of different licensing and downloading scenarios.

In FIG. 17A, the interactions between the components are described for a one configuration of game software on a group of devices to illustrate aspects of the present invention related to central control of software licensing. The present invention is not limited to centrally controlled licensing of software. Thus, in FIG. 17B, an example of distributed licensing control is described. In FIGS. 17C and 17D, scenarios are described involving concurrent licensing and game downloads.

In FIG. 17A, a scenario is described where a game licensing server 1552 controls licensing for a group of gaming devices, such as 1550, in communication with the game licensing server 1552. The licensing server 1552 centrally controls the licensing of game software for the group of gaming devices and as described with respect to FIG. 16 may be a "trusted" information source (Licensing Centrally Controlled). In the scenario of FIG. 17A, the game licensing server 1552 also centrally monitors usage of software for the group of gaming devices (Central Usage Monitoring). For example, the game licensing server 1552 may compile reports of how many times a particular game has been played on each the gaming devices it monitors and what was the take for the game. Downloading of game software is not described with respect to this figure and the licensing is discussed with respect to software currently residing on the gaming devices (Software on Device).

The game licensing server may centrally control licensing for the group of gaming devices and it may be configured to apply group-licensing rules (Group Licensing Rules). Further, the game licensing server may be operable to divide the group of devices it monitors into a number of sub-groups for the purposes of software licensing on these devices. In the present invention, the game licensing server may be able to apply group licensing rules that are dependent on a status of licenses granted to a group of gaming devices, are dependent on properties of the gaming devices in the group or combinations thereof.

When the group licensing rules are dependent on the status of the licenses granted to a group of gaming devices, an individual license for game software on a particular gaming device may be granted based upon how related licenses are being utilized in the group of gaming devices. For example, the number of licenses available for a particular game may be limited to a certain number. Thus, when all of the licenses for the particular game are being used, no more licenses for this game may be granted until one of the licenses being used is freed up. The relationship between licenses is not limited to a particular game. For example, the number of licenses for a group of different games may be limited but the licenses may be distributed between the games in the group in any combination as long as the number is less than the limit.

When the group licensing rules are dependent on properties of the gaming devices in the group, the requesting gaming device may have to meet certain qualifications to receive a license. Thus, even when a license is available, a license may not be granted to the requesting gaming device if it is not qualified. As an example, the requesting gaming device may have to meet qualifications, such as a denomination of game play, a location on the casino floor, a manufacturer of the gaming machine, a software version, operating system, memory capacity, CPU speed, etc, to receive a license for selected game software.

As described above, game software licenses may be granted to a requesting gaming devices independent of how licenses have been distributed to other gaming devices in communication with the game licensing server. As an example, for a particular game, the game-licensing server 1552 may have an unlimited number of licenses. When a license is requested for the game with unlimited licenses, depending on the properties of the gaming device requesting the license, the game licensing server 1552 may or may not be grant the license. As an example, the game licensing server 1552 may have an unlimited licenses but may only grant the licenses to certain models of gaming machines with a denomination of game play that is higher than some limit and that meet the hardware/software requirements for the game.

A particular example where group licensing may be important is in an environment, such as an Indian casino, where the total number of slot games that may be used is limited. For example, in California, Indian casinos are usually only allowed to have a fixed number of wagering type gaming machines, such as video slot machines, that are referred to as class 3 gaming machines. However, the casinos may be allowed an unlimited number of class 2 gaming machines that provide central determination games, such as bingo.

In the present invention, a single gaming machine may be configured to act as a class 3 or class 2 gaming machine. In this mixed class 3/class 2 gaming environment, the gaming machine may be configured to request a license from the game licensing server 1552 each time a player wishes to initiate a class 3 game on the gaming device. When a license is available, i.e. all of the licenses are not in use, then the game licensing server 1552 grants the class 3 license to the requesting gaming device and the player may engage in a class 3 game play on the gaming machine. When the license is not available, the requesting gaming device may be notified that no class 3 licenses are available and the player may only engage in class 2 games on the gaming machine.

In one embodiment of the present invention, the game-licensing server 1552 may maintain a waiting list of the gaming machines that have requested a class 3 license when a class 3 license was not available. When a class 3 license becomes available, the gaming machine may be notified that a class 3 license is available and the player may be provided a limited time period to begin playing class 3 games before the license is offered to another gaming machine on the waiting list.

Gaming devices on the waiting list may be given a higher or lower priority on the list based on different attributes. For example, when a high roller is playing a particular gaming machine and requests class 3 gaming but is denied, their gaming machine may be moved to the top of the list. As another example, higher denominational gaming machines may be given priority over lower denominational gaming machines. Details of class II/III gaming hardware and methods that may be used in the present invention are described in co-pending U.S. application Ser. No. 10/955,636, by Nguyen, et al., filed Nov. 22, 2004 and titled, "Class II/Class III Hybrid Gaming Machine, Systems and Methods," which is incorporated herein in its entirety and for all purposes.

In general, various accounting and prioritization schemes can be applied to the group licensing of game software. The accounting and prioritization of licenses can become quite complex, because licenses may be reserved for or limited to certain groups of users and/or gaming devices and the users playing and the gaming machines that are active may vary with time. In addition, the licensing rules may vary with time. Thus, certain game software may be only available during the weekends or evenings or certain game software may be available on a larger group of gaming machines at one time and limited to a smaller group at other times. For example, certain progressive games and bonus games that are most profitable when participation exceeds some level may only be made available during busy periods, such as on the weekend. Further, the game licensing server may monitor participation and release licenses when participation has exceeded a certain level.

Adding further complexity to the licensing accounting, some game devices, such as the game play host 1503 in FIG. 16, may execute a number of gaming applications simultaneously. These gaming devices may provide game play to a single player or to multiple players simultaneously. Further, each player may play multiple games simultaneously. The licensing server 1552 may consider many invocations of an application by the same player on the same gaming device as one license or several licenses. For example, a poker game and a slot game could be played concurrently and each may require a separate license.

In addition, the accounting rules may vary from game to game or depending on other game or gaming machine characteristics, such as a denomination of the game. For example, playing a bingo game with multiple cards may count as a single license while a game of hundred hand poker may count as more than one license and each instantiation of a particular slot game played simultaneously by a single player on a gaming device may count as one license. As another example, a game with a higher or lower denomination may count as a fraction of a license or more than one license (e.g., 1.2 licenses) depending on a licensing agreement negotiated between a software provider and a gaming machine operator.

The accounting rules for licensing may be negotiated between a software content provider and a gaming operator and may vary from game software package to game software package and from vendor to vendor. Further, some licensing rules may be imposed by a jurisdiction. Thus, the game-licensing server 1552 may be designed to configure itself for operation in different jurisdictions and to apply licensing rules compatible with many different jurisdictions.

In a particular embodiment of the present invention, a token licensing architecture may be employed. The architecture may utilize three components: a) a "license manager" (not shown) that runs on the server 1552 and uses token distribution rules 1554; b) a "software agent" 1560 that resides in a gaming device, such as a gaming machine 1550, a game play host or a gaming device; and c) a "software certificate" that is attached or integrated into a software application 1562.

During boot up of a gaming device (e.g., 1550), the software agent 1560 may be downloaded from the license server 1552 (or invoked from mass storage in the gaming device) and may run in the background. The software agent may determine which game software modules require license tokens. The software agent may scan each of the software modules to determine which of the software modules stored on the gaming machine require license tokens.

During run-time, the software agent 1560 may provide the license server 1552 with information about the software application 1562, such as product name, vendor name, version, etc., and information about the user of the gaming machine, such as name, account number, biometric information, etc., and information about the gaming device where the software is executed, such as a location, operator, model numbers, hardware serial numbers and time of request. This information may be sent to the game-licensing server 1552 in a token request message.

When the server 1552 grants the software agent 1560 a license "token," the software agent 1560 informs the application 1562 that is has a valid token 1566. The application 1562 may include logic for responses when a token is not available, such as notifying the user that the token is not available. In one embodiment, when a token is not available the software application may be partially activated with limited set of features. The logic for responding to the absence of a token may be included in the software certificate 1564.

In general, in a casino gaming environment, it is undesirable to a gaming operator to deny a player access to game play. Thus, a gaming machine 1550 will typically provide some default mode that will allow game play that is independent of whether a token is available or not. For example, the gaming operator may purchase a perpetual license for some game software so that it is always available for play on the gaming device. As another example, a gaming content provider may offer a package of bundled game software with many different games where some require tokens and others do not require tokens for activation. Thus, the gaming machine may include a mixture of software that requires and does not require tokens. In another example, the gaming machine operator and game software content provider may agree to an overdraft protection scheme where the gaming machine is temporarily provided extra licenses in the event of requests for licenses exceeding demand or when licenses expire. This overdraft service may be provided for a fee.

While the software application 1562 is being run, the software agent 1560 and the server 1552 periodically send messages to each other. These messages might occur during a game play session where a game player is playing a series of games of chance on the gaming machine. During the game play session, the game player may play only one "game" multiple times or play one game multiple times in combination with other games that are played simultaneously (i.e., parallel play) or one after the other (i.e., serial play). The player may also pause between games to collect winnings or add credits to the gaming machine. Further, the player may quit playing and the gaming machine may be idled.

Between the play of each game there may be a varying time period and the gaming machine 1550 may include logic to decide whether a software application has been terminated. The gaming machine may determine an application has been terminated based upon many factors, including but not limited to, 1) a length of the time period that has occurred since the last play of a game, 2) an amount of credits reaching zero on the gaming machine, 3) data received from a sensor, such as a proximity sensor or a camera, 4) combinations thereof. The software agent 1560 or other logic on a gaming device may monitor the gaming device to determine when the use of a particular application has ceased.

When the gaming machine decides that a software application, such as 1562, has terminated, the software agent 1560 may return the token for the application. The license server 1552 may store a record of each token that is granted and returned in a token tracking database 1556. Similarly, each gaming device, such as 1550, may store a record each time it receives a token and returns a token.

The licensing server 1552 may be operable to reconcile token usage in its tracking database 1556 with token usage stored on each gaming machine. The reconciliation process may comprise querying each gaming device for records of token it has received and tokens it has returned over a specific time period and then finding a corresponding record in its database. When the records do not agree, the license server may generate an error report.

The software agent 1560 and the server 1552 may also exchange messages to determine whether the software agent 1560, or the server 1552 has terminated abnormally. If the application 1562 has terminated, such as due to a server or a network error, the license server 1552 may record that the license token 1566 has been returned. If the server 1552 has terminated, the software agent 1560 may try to reacquire a license token from a back-up license server. If this fails, the software agent 1560 may notify the application that it no longer has a license token. In response, the application may 1) terminate, 2) continue running as normal, 3) provide a warning that the application will terminate after a time period and then terminate or 4) alter its functionality, such as running more slowly or degrading the graphics quality.

The software agent 1560 may also send messages to the licensing server including information about the usage of a software application. This information may be stored in a usage accounting database 1558. The information may include but is not limited to a number of games played using the application 1562 and an amount wagered on these games. The information that is collected by the server 1552 may be collected because it is specified in a licensing agreement and used in a billing formula defined in the agreement.

The license server 1552 may include a license database (not shown) or a license files that includes information about the license tokens on the server. This information may use a message authentication code (MAC) to protect the licensing data from being changed by anyone other than the software content provider. In one embodiment, the MAC may be a checksum, a hash function or a digital signature of some type. The MAC may be applied to a file of token distribution rules 1554. The token distribution rules may describe how to prioritize token requests from the gaming devices monitored by the license server 1552.

Figure 17B:
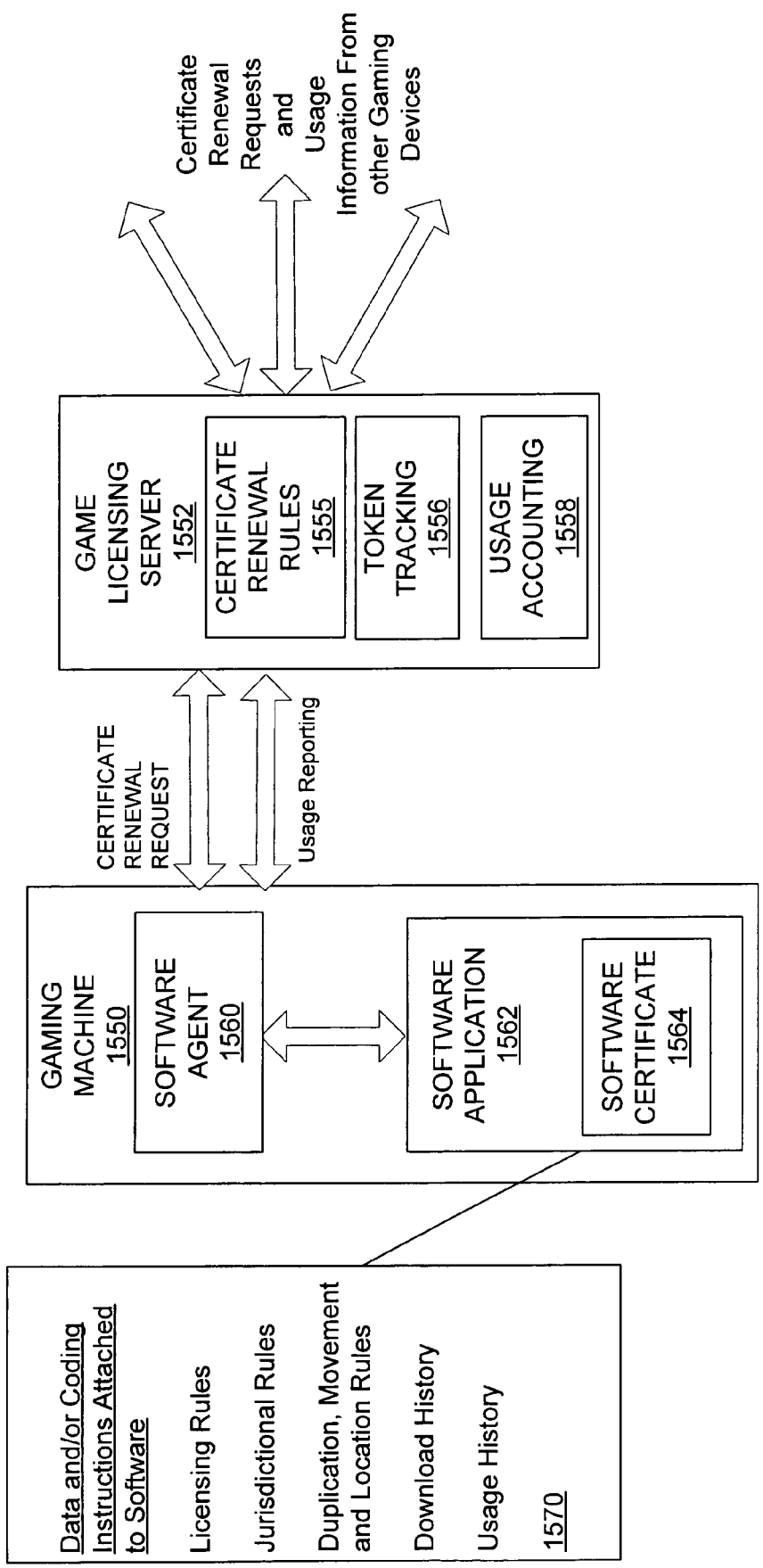
Figure 17C:
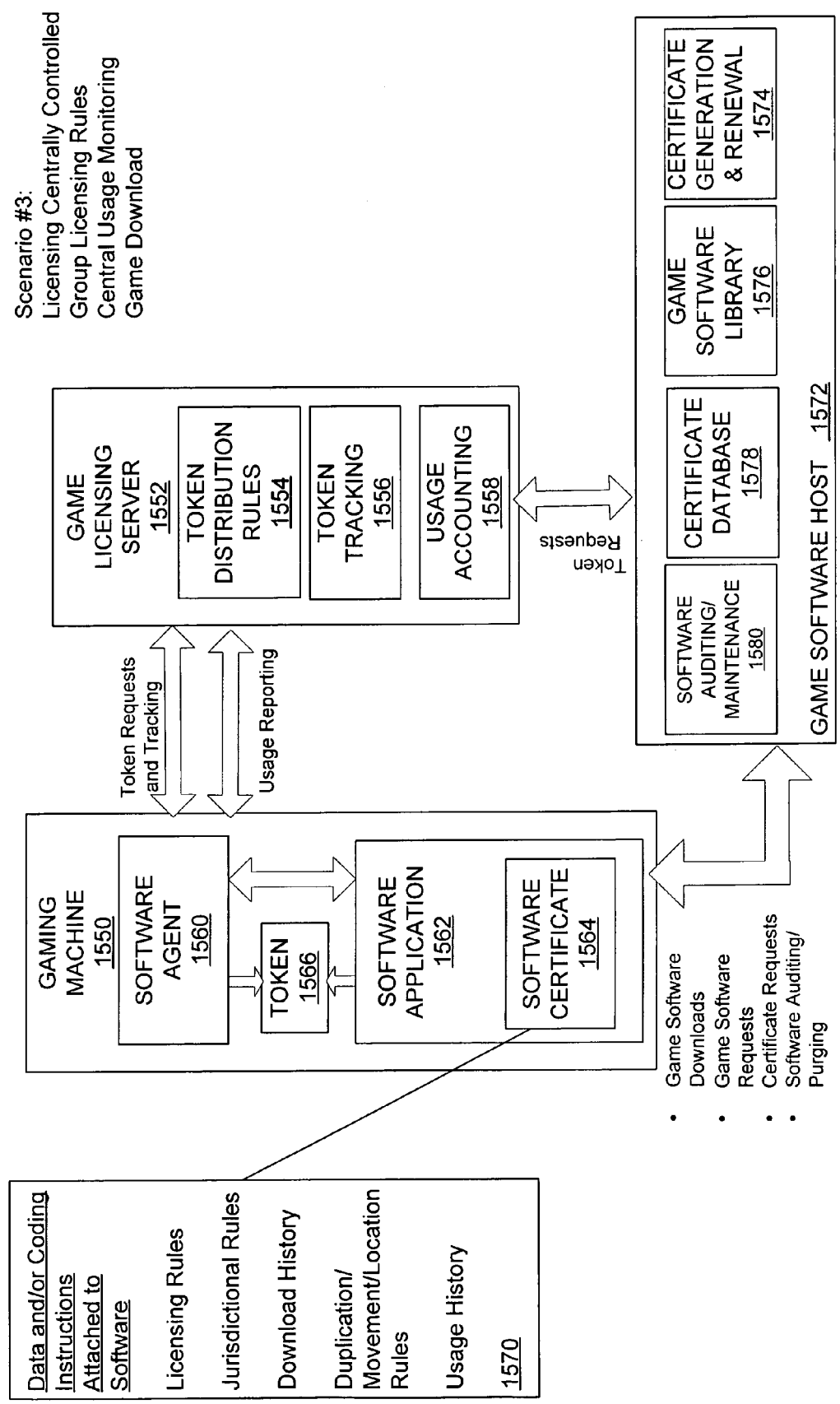
Figure 17D:
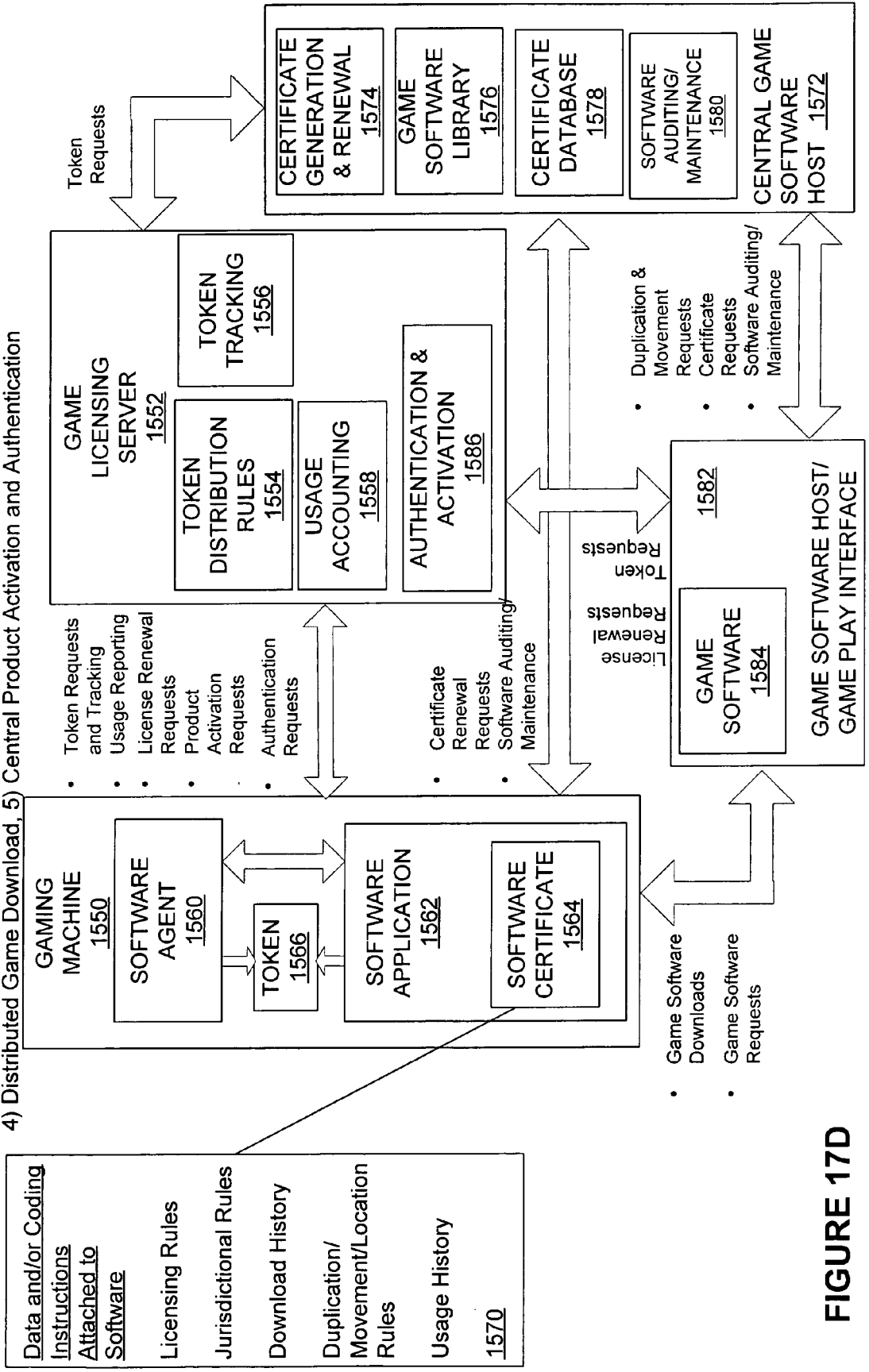

In FIG. 17B, a second licensing scenario is described. In this example, a game licensing server 1552 and a number of gaming devices, such as gaming machine 1550, are provided with the game software, such as application 1562, residing on the gaming device, as in the example described with respect to FIG. 17A (Software on Device). Further, as described in FIG. 17A, the gaming devices, such as 1550, report game usage to the game-licensing server 1552 and the game-licensing server may collate and generate reports on overall game usage for devices communicating with the server 1552 (Central Usage Monitoring).

One difference between the scenarios in FIG. 17B as compared to FIG. 17A is that some of the licensing functions are handled by a software application, such as 1562, on the gaming device (Distributed Licensing). In one embodiment of the present invention, the licensing functions are integrated into the software certificate 1564. Thus, the software certificate 1562 may comprise data and coding instructions 1570 including but not limited to 1) licensing rules, 2) jurisdictional rules, 3) a download history for the application 1562, 4) duplication, movement and location rules for the application and 5) usage history for the application.

The licensing rules may determine how the software application 1562 may be utilized. These rules may be specific only to software application 1562 and other copies of software application 1562 on other gaming devices may use different software certificates that specify different licensing rules than software application 1562. In most central licensing schemes, the licensing rules are usually the same for each copy of the same application. In the present invention, they may be all different.

As an example of individual licensing, a total number of copies of the same application may be made available in a gaming system. A first portion of the copies may be licensed by time, a second portion may be licensed for a number of uses, a third portion may be perpetually licensed, a fourth portion may be licensed to a specific gaming device, a fifth portion may be licensed for use on multiple machines, a sixth portion may be licensed for multiple instantiations of itself on the single gaming device, seventh portion may be licensed for only a single instantiation. Many such examples are possible and these rules may also be combined, such as a timed license that allows multiple instantiations. A benefit of individually licensing each copy of the software it that it may allow for more flexible cost structures that are advantageous to both the gaming operator and gaming content provider.

The game software application 1562 may comprise a plurality of software components where the plurality of components are compiled to execute the application 1562. The certificate 1564 maybe built into one or more of the software components. In particular, the certificate may be built into one or more software components that are critical to the generation of game on the gaming machine. For instance, the license certificate may be built into game flow logic that controls the flow of the game on the gaming machine. The multiple copies may be used to prevent someone from removing the certificate 1564 from the software application 1562 or modifying the certificate in an authorized manner by making it difficult to locate and modify all of the certificates. Details of game software components that may be used with the present invention and include license certificates are described in co-pending U.S. application Ser. No. 10/040,239 previously incorporated herein and in co-pending U.S. application Ser. No. 10/041,212, filed Jan. 7, 2002 by Breckner, et al. and entitled, "Decoupling of the Graphical Presentation Logic of a Game From The Presentation Logic," which is incorporated herein in its entirety and for all purposes.

In a particular embodiment, the game software components comprising a software application, such as 1564, may be licensed differently. For example, a game may include a game software component for the game flow logic and a separate component for the presentation logic. The game flow logic may be used interchangeable with different presentation logic components to generate games that are different graphically but use the same game flow logic. In this embodiment, the license certificate terms may be different for the game flow logic as compared for presentation logic components. For example, cost per usage may vary among the different presentation logic components depending on the popularity of each game corresponding to each presentation logic component while the core game flow logic may be licensed for a fixed price.

In a similar embodiment, different modules of game software may be licensed differently. For example, a game of chance may comprise a base module for generating a game of chance and one or more add-on modules for providing additional features to the game of chance. The add-ons may include but are not limited to one or more stand-alone bonus game modules, a progressive game module, a group bonus game module (e.g., where a group of gaming machines are linked together), etc. The base game module may be licensed perpetually for fixed price while the add-on modules may be licensed using a utility model, such as per-use. Thus, the base game module and each add-on modules may include different license certificates. In this example, a base game module may be always available on the gaming device but the add-on modules and their associated features may not be available when their license is not properly maintained.

The gaming machine 1550 or a device in communication with the gaming machine may be operable to calculate a licensing cost associated with playing a game of chance. The licensing cost may be an agreed upon charge that is provided to one or more game software content provider(s) each time a game of chance is played on the gaming machine. Multiple vendors may provide software used to generate a game of chance. For example, one vendor may provide software for a game engine that specifies a logical flow of the game, another vendor may provide software that generates the graphical presentation in conjunction with the game engine and another vendor may provide software for a bonus game. Thus, when a game of chance is played using the game engine, the graphical presentation and the bonus game, the gaming machine or another gaming device may calculate a licensing cost for each of the game engine, the graphical presentation and the bonus engine so that the three vendors can be compensated.

The licensing cost for a game of chance that is calculated may depend on one or more of 1) a popularity of the game of chance that is played, 2) a time that the game of chance is played, 3) a wager amount that is made on the game of chance, 4) a type of gaming machine on which the game of chance is played, 5) a location in the casino of the gaming machine when the game of chance is played, 6) a fixed cost per game, 7) a fixed cost per game that varies as a function of time (e.g., the cost may be higher during certain times of the day, days of the week or time of the year), 8) a fixed cost per game that varies according to a total number of times the game of chance has been played on the gaming machine (i.e., the cost per use may be one value for the first hundred times a game is played and then may increase or decrease for the next 100 times the game is played), 9) a number of games of chance that are being played on the gaming machine simultaneously (the gaming machine may be operable to allow a player to play two or more games of chance simultaneously), 10) player information of a player playing the game of chance (e.g., a cost per game may be varied from player to player), 11) whether the gaming machine is linked to other gaming machines (e.g., a game of chance or bonus game may be linked game involving multiple gaming machines), 12) whether the gaming machine is linked to a progressive system, 13) whether the gaming machine is linked to a bonus system, 14) whether the gaming machine is linked to a central determination system (e.g., a bingo game) and 15) combinations thereof.

The licensing cost may also depend a fixed or variable rate specified in a site license. In one example, any time and instance of a game is played at a particular site the licensing cost may be a fixed cost that is specified in a site license. In another example, the cost per game may depend on a rate that varies over a total number of games played on a group of gaming machines, such as 10,000 games at 25 cents per games and 0.23 cents per game after 10,000 games. The licensing cost may also vary according to a type of game that is played. For example, keno games may be cheaper than slot games or card games.

In another embodiment, a gaming device may be operable to provide a discount to a licensing cost. Licensing discounts for games played may be provided by game software content providers for gaming devices in certain locations or groups of gaming machines at certain sites that are different from a licensing agreement that is generally employed. Further, an initial licensing agreement could change over time. To account for this, in one embodiment, a gaming device or game accounting server may be operable to discount licensing costs in certain situations. The discount like the basic licensing cost may be based upon a fixed rate or a variable formula.

The weighting for each variable may be specified in a formula used by the gaming machine or another gaming device to calculate the licensing cost. For auditing purposes, a record of the variables, such as the time when a game was played, that are used to determine the licensing cost may be stored on the gaming machine or another gaming device.

In general, the certificates, such as 1564, may be included in any type of software executed on a gaming device, such as 1550, or devices associated with the gaming device. For instance, license certificates may be included in player tracking software in a player tracking unit coupled to a gaming machine, in bonus game software for a gaming machine, in communication software used by a gaming device or in player tracking software used by a player tracking server. In another example, versions of a certificate may be included in firmware executed by gaming devices, such as bill validators, coin acceptors, light panels and coin hoppers.

At boot-up, the software application 1562 and the software agent 1560 are executed on the gaming machine and communication between the game software and the software application 1562 is established. In FIG. 17A, the game licensing server provided centrally controlled licensing services, such as determining whether the software application 1562 has a valid license and granting tokens that indicate the licensing status of the software application 1562 on the gaming machine 1550. In this example, the gaming devices may be provided with the capability to determine licensing status of resident software. For example, the software agent 1560 or the software application 1562 may be operable to determine licensing status. Nevertheless, although licensing control may be distributed to the gaming devices, the game-licensing server 1552 may still be used to provide to provide tokens.

In one embodiment, the game-licensing server 1552 may be used to provide tokens of authenticity. The game licensing server may be configured as a "trusted" information source and store information that uniquely identifies the software certificate 1564. As will be described as follows, the information contained in the software certificate may change over time. Thus, the information stored on the game licensing server may be used to uniquely identify software certificate 1564 may change with time so that software certificate may be still be uniquely identified. For instance, new CRC or hash values may be generated for the software certificate 1564 when it is modified and these values may be sent to the server 1552 for use in authenticating the software certificate 1564.

In one embodiment, the software certificate may be continually updated and new CRC or hash values may be periodically generated, i.e., a new hash value may not be generated each time the software certificate is update. A record of data included in the hash may be tracked or stored. Thus, when the software certificate has been updated since that the last hash/CRC, a portion of data in the software certificate can be CRC/hashed to match the last stored CRC or hash and then a new CRC or Hash value can be generated for the added data or for the combination of old data and new data.

As described with respect to FIG. 16, the authenticity of the information known to both the software application 1562 and the game-licensing server may be verified by a method such as a zero knowledge proof or using a public-private encryption schemes. When the software certificate 1564 is deemed to be authentic, the game-licensing server may issue a token of authenticity. In a manner as was described in regards to the licensing tokens, the software application 1562 or the software agent 1560 may be programmed to take various actions when a token of authenticity is missing. For example, the gaming machine may be programmed to terminate execution of the software application 1562 in the absence of a token of authenticity. In general, the game licensing server 1552 or other devices in communication with the gaming machine 1550 may be configured to generate multiple tokens, such as but not limited to licensing tokens, authentication tokens, a token of jurisdictional compliance or approval, tokens permitting copying or transfer of software, etc. The gaming machine 1550 may include logic for operating on information contained in these tokens or the absence of a valid token.

The jurisdictional rules may specify allowable configurations of the software application for a single jurisdiction or multiple jurisdictions. Coding instructions included with the certificate 1564 may be designed to check the configuration of the software application 1562. In one embodiment, after an operator sets the configuration of the application 1562, the certificate may compare the settings with jurisdictional rules to confirm that the software application 1562 is in compliance with the jurisdictional rules in which it is located. For example, the certificate may compare a max bet or max jackpot setting configured by the operator with local jurisdiction rules.

Since the software certificate 1564 may be used to enforce licensing and jurisdiction rule compliance, it may be designed to be inaccessible and unconfigurable to a gaming machine operator. For example, the software certificate may be encrypted. Further, the software application may be designed to detect and record any attempts to modify the certificate. In addition, a trusted information source may store a record of a CRC or a hash value for the certificate 1564. The CRC or hash value may be used to authenticate the certificate. As described above, for additional security, the license certificate may be inserted randomly into different game software components to make modification or removal of the certificates more difficult and to insure that licensing integrity is maintained when software is copied.

The duplication, movement and locations rules may be set to limit movement and propagation of the software application 1562. In the duplication rules, copies of an application may not be permitted or a limited number of copies of an application may be permitted. For instance, a duplication rule may allow 5 copies of the software application to be made or may bar duplication. In an environment allowing peer-to-peer transfer of game software between gaming machines, the duplication rules may be used to limit the maximum number of copies of particular software in a gaming system.

In another embodiment, the duplication rules may be applied to individual components of the software application. For example, the duplication rules may permit some non-critical components of the software application 1562, common software components or data from the software application to be copied an unlimited number times while other copying of critical components may be limited in some manner. An advantage of this approach may be to allow common software components to be distributed throughout a system to lessen download times.

The movement rules may be used to specify whether a software application may be moved or not. In one embodiment of the present invention, a gaming system, such as described with respect to FIGS. 16 and 18 may include a limited number of copies of an application that may be moved from gaming device to gaming device. After the application is transferred from a first gaming device to a second gaming device, it is deleted on the first gaming device. The movement rules may specify how many times an application can be moved or whether it can be moved at all.

The location rules may specify the types of gaming devices on which the software application 1562 may be located and/or executed. As an example, the game system 1500 of FIG. 16, may allow for mobile gaming devices but only certain games may be downloaded to the gaming devices as described in the location rules. Thus, when the software application is copied to a gaming device, such as a mobile gaming device, the software certificate 1564 may determine what type of device it is located on. If it is not on authorized device, the software certificate 1564 may prevent the software application 1562 from executing.

The download history and the usage history may provide records of the origins of the software and how it has been used. For example, the software application 1562 may have been downloaded from a content provider as described with respect to FIG. 9, to a local game software host at a casino as described with respect to FIG. 16, then copied from the local server to a first gaming machine and then moved from the first gaming machine to a second gaming machine, such as 1550. Each time the software application 1562 is moved the download history in the software certificate may be updated. Further, the download history may be communicated to the software agent 1560 and then communicated a remote device, such as the game licensing server.

In a gaming environment, regulators may require an audit trail that traces a path of a software application, such as 1562, from a point of origin, such as a manufacturer, to its current location, such as gaming machine 1550. Currently, an audit trail is generated manually when software is installed on a gaming machine by an installer generating a written record of when the software was installed. After the software is installed, it may be secured behind a locked door, which is sealed with evidence tape. The current methods of generating an audit trail do not provide for electronic transfers of game software from one gaming device to another.

The software certificate 1564 may include records of how the software application 1562 has been used. The software agent 1560 may monitor the game usage (e.g., count all the handle pull events, time, coin-in events, denomination, percentage retained, location, machine ID info, player ID info, etc.) and periodically update the game usage data stored on the certificate 1564. Depending on the licensing rules, the software certificate 1564 may require metering information that is different from what is recorded by other meters on the gaming machine. Thus, the software certificate may use its own software usage meters to gather the usage information and/or may utilize hardware/software meters already on the gaming device to gather the usage information. When the software certificate is integrated into the software application 1562, the software certificate 1562 including its usage information may travel with the software application 1562 when the software application 1562 is copied or moved to another gaming device.

The usage information may be incorporated into the software certificate 1564. In addition, the certificate 1564 may upload, via the software agent 1560, the usage data to the server for accounting and billing purposes. In one embodiment, an upload of usage data on the software certificate may be triggered when game software including a software certificate 1564 is removed to make room for new game software that is being downloaded. Also, the software agent 1560 may monitor and upload this data separately from the software certificate 1564 as described with respect to FIG. 17A. These different information sources may be used in reconciliation reports.

The gaming machine may be operable to record specific download history information and usage history information. A gaming jurisdiction may specify what information has to be recorded and these requirements may vary from jurisdiction to jurisdiction. In one embodiment, the gaming machine 1550 may be designed to configure itself to gather and record the download history information as a function of the gaming jurisdiction in which it is located i.e., to satisfy jurisdictional requirements. This functionality may be built into the software certificate 1564.

The software certificate 1564 or the software agent 1560 may compare the usage history against any licensing rules specifying usage limits. For example, as described above, the licensing rules may dictate how many times the software application 1562 may be executed before a new license is required. When a usage limit is exceeded, the software certificate may initiate a response of some type as was described with respect to FIG. 17A.

In one embodiment, when a usage limit has been exceeded, the software certificate 1562 may attempt to renew its certificate by sending a renewal request to a remote gaming device, such as the licensing server 1552. The software certificate 1564 may negotiate a renewal request with the software agent 1560. After receiving the certificate renewal request, the game-licensing server 1552 may reply to the request based upon a number of certificate renewal rules. For example, some certificates may be renewed a number of times. As another example, some certificates may be non-renewable. In yet another example, the licensing rules, duplication rules or locations rules may be changed when a certificate is renewed and these changes may be sent to the software certificate 1564.

When an approved renewal request is received, any rule changes that are specified in the message may be updated on the software certificate 1564. The update may be performed by software embedded on the certificate, on the software agent, or other logic on the gaming device. Further, some of the internal usage history meters on the software certificate 1564 may be reset. These meters may be used to compare against licensing rules in the software certificate. For example, the software certificate 1564 may track the total number times the software application 1562 has been used and track a number of times it has been used since its last renewal. When a renewal is approved, the software certificate 1564 may reset the number of times it has been used since the last renewal to zero while it continues to track its total usage.

The software certificate 1564 provides a dynamically updateable record that uniquely identifies how the software application 1562 has been used. This record provides a unique "finger print" for the software application 1562 as it changes with time. For security, the fingerprint may be encrypted and/or stored in one or more secure memory locations on the gaming machine and/or at a remote location. In addition, a CRC or other one-way algorithm may be applied to all or a portion of the software certificate, recorded and later recalled for the purposes of verifying the authenticity of the certificate. The logic authenticating the certificate may be "trusted" software and/or "trusted" hardware as described with respect to FIG. 16. For example, the software agent 1560 or logic embedded in the application may provide this function.

Typically, in gaming environments and computational environments in general, one copy of an application is considered the same as any other copy of an application in that they will have the same CRC and provide the same functions. A product activation code or a serial number may be attached to each copy of an application. However, this information is static, i.e., it does not change after it has been attached to copy of a particular program. Advantages of dynamic certification of information regarding each copy of a software application is that it allows for detailed auditing and complex licensing agreements that may be useful and/or required in a gaming environment. The dynamic certification may be applied to any of the licensing/downloading scenarios described with respect to FIGS. 17A-D and is not limited to the example in FIG. 17B.

In FIG. 17C, the capability of game downloading is added to scenario #1 and some of the interactions that may arise when game downloading and game licensing are performed concurrently are described. As described in scenario #1 of FIG. 17A, scenario #3 includes the game license server 1552 that is operable to centrally control licensing, apply group licensing rules and provide centralized usage monitoring. In addition, a game software host 1572 is included. Other examples of game software hosts of the present invention are described with respect to FIGS. 8-16.

The game software host 1572 may include logic for: 1) software auditing 1580, 2) software maintenance 1580 that may include directing other gaming devices to purge software, 3) software certificate generation, revocation and renewal 1574, 4) responding to game software requests from other gaming devices and 5) software for requesting license related tokens. The game software host may also include a game software library with a variety of game software/firmware that is available for download and a certificate database with records of software certificates that have been generated or renewed on the game software host 1572. Further, the game software host 1572 may store records of game software download requests received from other gaming devices and downloads generated by the server 1572. These records may be used by the software auditing logic 1580 for reporting purposes.

In the present invention, the game software host 1572 may be used game players and/or game operators for "game-on-demand" services. With game-on-demand, the game players and the game operators may select games or other applications not residing as software on a particular gaming machine and request a download of the application to the gaming machine from the game software host 1572. In one of embodiment of game-on-demand, a software application menu, such as a menu of games, may be displayed on the gaming device, such as gaming machine 1550.

When a user, player or operator, selects an application from the menu, such as a game of chance, the application may be downloaded. After download, the application may be executed immediately or at some later time on the gaming device. The gaming device may be designed to display different menus to the operator as opposed to the player and even different players may be presented with different menus.

In particular embodiments, the gaming machine 1550 or the game play host 1572 may be operable to determine software requirements (e.g., hardware and software) for the device requesting game software. For instance, the gaming machine 1550 may be designed to request specific game software that is compatible with its capabilities or after determining the capabilities of a device requesting game software the game play host may select software that is compatible with the requesting device. Further, after receiving the game software, a requesting device may be operable to determine if the received game software is compatible with its operational capabilities.

As an example, in different embodiments, the gaming machine 1550 may be a casino type gaming machine or a cell phone and game software for the same game may be available for each device. Nevertheless, the game software for the cell phone may be quite different than the game software for the casino type gaming machine. It is likely that cell phone game software may be stripped down relative to the game software for the casino type gaming machine. In either case, the game download transaction, between the cell phone and the game play host 1572 or the casino type gaming machine and the game play host 1572, may be constructed to insure that the correct game software is downloaded in each instance to the respective gaming devices.

In yet another embodiment, the gaming machine 1550 may be remotely configured. For instance, an operator at a remote terminal may be able to remotely configure the gaming machine 1550 when a connection is established between the gaming machine 1550 and/or the game software host 1572 and the remote gaming terminal. The game menu may be displayed on the remote terminal and after a selection is made a download may be triggered. In another example, an operator carrying a hand-held device may be able to communicate with gaming devices using the hand-held device and configure gaming devices on the casino floor using menus generated on the hand-held device and a communication interface between the hand-held device and a particular gaming device or the game software host 1572.

After receiving a download request from a game software download request from a gaming device, the game software host 1572 may send a software token request to the game licensing server 1552. The software token request may contain the same set of information as if the gaming device were sending the token request directly to the game licensing server as described with respect to FIG. 17A. If the host 1572 receives a token from the game licensing server 1552, the game software host 1572 may initiate the software download to the requesting gaming device, such as 1550. If no tokens are available, the game software host or the game-licensing server 1552 may notify the gaming device that no tokens are currently available and the gaming device may be placed on a waiting list.

When the token is available, the game software host 1572 may move (duplicate, transfer and delete) or copy (duplicate and transfer) the requested software application to the gaming device. When the software application is moved from the game software host 1572, the game software host may update one or more copies of certificates included with the software application. For example, a record of the time, location, data about the requesting device, data about the sending device and other information describing the transfer may be added to the software certificate. In addition, the software host 1572 may also store a record of the transfer in a local database.

As described with respect to FIG. 17A, the number of copies that can be made of a software application may be specified in a licensing rule. Therefore, the game software host may send copy information, such as how many copies have been made, to the game-licensing server 1552 when a token request is made. In some instances, a token request may be denied based upon the how many copies of an application have been made.

When a copy of the software application is made, the software host 1572 may generate a new certificate for the software application to give it a unique identity. The certificate may include certificate information from the parent software application from which it was copied as well as additional information particular to the child application. This information may provide a unique signature for the child application. As described with respect to FIG. 17B, the game software host 1572 may also receive and process requests for software certificate renewals for expired software certificates.

As example of certificate generation, the child application may be the $5^{th}$ copy made from the parent software application and this information may be included in the certificate. Further, different usage or licensing rules may be attached to the certificate for each copy. For instance, a copy downloaded from the host server 1572 may be recopied at the requesting location and sent to another gaming device or the copy may be read-only. This information may be included in a certificate generated for the child software application.

As described with respect to FIGS. 17A-B, the software host 1572 may perform software auditing. For example, the game software host 1572 may send out a message to one or more gaming devices requesting a current configuration of software on each of the gaming devices. Further, the software host 1572 may perform software maintenance, such as providing software updates to the gaming device or directing gaming devices to purge old software.

In another embodiment, for network efficiency, the game software host may redistribute software applications throughout a game system. For example, when peer-to-peer transfers of software are allowed (see FIG. 18), the game software host 1572 may determine the distribution of software on the system. Then, the game software host 1572 may take actions, such as but not limited to, 1) adding additional copies of a software application to the network, 2) redistributing existing copies of the software application in the network and 3) purging some copies of the software application on the network. The distribution including the number of copies of a software application in the network may be based on factors, such as the popularity of a given software application, current or past network performance and predictions of distributions that will result in efficient download times.

In FIG. 17D, a fourth scenario involving game downloads and game authorization. In addition to centrally controlled licensing, group licensing rules and central usage monitoring, the scenario also includes distributed game downloads and central product activation and authentication. As described with respect to FIG. 17B, the game-licensing server 1552 maybe used to authenticate software certificates. In addition, the game-licensing server may be used to provide product activation keys or codes when a software application is first installed on a gaming device.

In a system with distributed game downloads, the system may include a number of servers and/or gaming devices (e.g., 1550, 1572 and 1582) that are enabled to receive a request for download of game software and download the software application to another device. In FIG. 17D, device 1582 functions as both a game play interface for generating and displaying a game of chance and a game software host operable to download game software 1584 to another gaming device. In this example, device 1582 may receive a request for a download of game software from gaming machine 1550. In response, the device 1582 may send a token request to the game-licensing server 1552. When a token is available, the device 1582 may send a duplication or movement request to the central game software 1572.

As previously described with respect to FIGS. 17A-C, the movement or duplication of software applications may be limited in a system. The central game software host 1572 may be used to approve or reject the movement and/or duplication of software in the system. When a duplicate copy of a software application is made, the central game software host 1572 may also provide a software certificate for the new copy of the application. When a token is available and the movement or copy has been approved, the game play interface 1582 may transfer the software application to the requesting device, gaming machine 1550.

In a particular embodiment, the central game software host 1572 may include a game distribution system that maps which gaming machine has which game(s) on the casino floor. The mapping of games on the casino floor may be linked to information regarding the network architecture and its associated capabilities (e.g., bandwidth of various segments), gaming machine usage data, gaming machine hardware data and game popularity data. This data may be used to approve or reject the movement and/or duplication of software in the system. The game distribution system may include applications for graphically displaying game locations, gaming machine locations, network architecture and current usage, gaming machine usage data and gaming popularity on a map of a casino floor. An operator may use the graphical display to assess the performance of the system.

The transfer of software may occur while games are being played on one or both of the gaming devices, 1550 and 1582. For instance, if a software transfer is going to take a significant amount time, the gaming machine 1550 may notify the user of how long the transfer will take and provides updates indicating the status of the transfer. While the transfer is taking place, the player may play another game on the gaming machine 1550 or the gaming machine may provide another source of entertainment. On game play interface 1582, the transfer of software to gaming machine 1550 may have occurred while a player is playing a game on the interface and the player is likely to be aware that the transfer took place.

As previously described, when a token is not available, the requesting machine may be placed on a waiting list to receive the software application has been requested. If a player has requested the software, the player may be notified that the software is not available and may be offered other game play options. While waiting, the player may be informed of the status of their request and engage in game play on the gaming machine 1550.

As described with respect to FIG. 17C, the gaming machine 1550 or the game play interface 1582 may also request software from the central game software host 1572. Further, the gaming machine 1550 and the game play interface 1582 may also send requests to the host 1572 to renew certificates on software applications that have expired. In addition, both game devices, 1550 and 1582, may communicate with the central game play host 1572 in regards to software maintenance and auditing.

FIG. 18 is a block diagram of a gaming system 1300 and associated network topology providing game-on-demand services. Game players may use the game-on-demand services to select games for game play currently not residing on a particular gaming machine and initiate a download of the selected game to the gaming machine. Game operators may use the game-on-demand services to alter the game software on gaming machines and game hosts in the gaming system 1300.

The operator or the player of the gaming machine may initiate game software downloads from the gaming machines, such as 55, 56, 57 or 58 or the operator may remotely initiate the download. For instance, an operator at a remote terminal may be able to remotely configure a gaming device when a connection is established between the gaming device and the remote gaming terminal. In another example, an operator carrying a hand-held device may be able to communicate with gaming devices using the hand-held device and configure gaming devices on the casino floor using menus generated on the hand-held device and a communication interface between the hand-held device and a particular gaming device.

The gaming system 1300 comprises a central game software host 1572, a local software download authorization agent 1506 for authorizing software downloads, a license server 1552, two software caches, 1304 and 1306, a game play host 1503 connected to two game play interfaces, 1511, four gaming machines, 55, 56, 57 and 58 and five antennas 1308. The components of the gaming system 1300 are linked using a local area network 1303. The local area network 1303 is comprised of wired and wireless connections for communications. The wireless communications are implemented via the antennas 1308. The local area network may be connected to a wide area network.

The gaming system 1300 is only one embodiment of the present invention and is provided for illustrative purposes only. In other embodiments, any number of gaming machines, game play hosts, game clients, software caches and antennas may be employed. In other embodiments, other servers, such as player tracking, cashless systems, accounting, bonus, entertainment content and prize, may also be connected to the local area network 1303.

Further, as described with respect to FIG. 16, the functions of the various devices in the gaming system 1300 may be combined or overlapped. For example, a single server may provide the functions of the central game software host 1572, the local software download authorization agent 1506 and the license server 1552. In another example, the gaming machine, in some instances, may act as a game software host, a software cache and/or a license server. Details of these gaming machine functions are described with respect to FIG. 19. In addition, details of a gaming machine that may be used to store and distribute software are described in co-pending U.S. application Ser. No. 09/595,798 previously incorporated herein.

The components of the gaming system 1300 are not necessarily located on a local area network and may be distributed over a wide area network, such as described with respect to FIGS. 3 and 8. For instance, a gaming machine may be in communication with the licenser server via the Internet or a telephone network. In another example, the game play host 1503 may communicate with the game play interfaces via the Internet. In yet another example, the central game software host 1572 may be located on a WAN 1305 and may communicate with the gaming machines as well as the software caches, 1304 and 1306.

A number of embodiments of the gaming system 1300 are now described. In particular, features of the network architecture are emphasized. These network related embodiments include but are not limited to 1) redundant network mediation and service mediation to ensure uninterrupted gaming services and 2) decreasing download times using peer-to-peer transfers between gaming machines and network load balancing. These network features are described with respect to some of the licensing and downloading methods previously described.

As described with respect to FIGS. 17A-D, after game software with a built-in license certificate and a licensing agent are executed on the gaming device, communication between the game software and the licensing agent is established. When a game or any other software is loaded with multiple instances of identical license certificates that were attached to different software components of comprising the game software, the licensing agent may sort through the different licensing certificates to determine whether the certificate are duplicates. If the certificates are not duplicates and the licensing agent determines that they should be duplicates an error condition may be generated on the gaming machine.

After the licensing agent obtains the information on the license certificate, the licensing agent, in the case of centralized licensing, may make a license request for a license token from the license manager 1552 or another device providing licensing services. For instance, the license manager 1552, the software cache 1304, one of the gaming machines, such as 58, or the game play host 1503 may be operable to provide licensing services. Thus, depending on which device is acting as a licensing server, a license agent on gaming machine 57 may make a request for a license token from one of these devices.

The system 1300 may include a number of redundancies, such as alternate network paths or back-up devices, to prevent interruptions in licensing services. For example, when the licensing server 1552 is used for providing licensing servers and for some reason the gaming machine 56 can't establish communications with the license server 1552 via a first communication path, then the gaming machine 56 may try one or more alternate communication paths to establish communications with the licensing server. For example, gaming machine 56 may communicate licensing communications via a wired portion of LAN 1303. When wired communication is not available, the gaming machine may attempt to communicate via wired communications from an antenna on the gaming machine 56 to an antenna on the license server 1552.

When a gaming device, such as gaming machine 55, does not include an antenna 1308 and a wired communication connection can not be established with a target device, then the device may attempt to route communicates via another device that does include a wireless communication connection. For example, the gaming machine 55 may attempt to establish wired communications with the license server 1552. When the wired communication link can't be established, the gaming machine 55 or another device handling the routing of messages may attempt to route communication through the software cache 1304 or the gaming machine 56.

When multiple communications path are provided in a network, the dominant or preferred mode of communication may vary from network to network, from device to device and/or from time to time. For example, in some networks or some portions of a network, wireless communication paths may be the preferred mode of communication and wired communication may provide a secondary communication path. In other portions of the network, wired communication paths may be preferred over wireless communication paths.

The preferred communication path may depend on the capabilities of the device and/or the capabilities of the communication path. For instance, some devices may not offer wireless capabilities and thus, wired communications may be preferred. Nevertheless, a secondary device, such as the software cache 1304, may be used to provide a secondary wireless communication path. In another example, one type communication path may be significantly faster than another communication path. Thus, the faster communication path may be favored over the slower communication path. However, when the faster communication path is slowed due to usage, then the slower communication path may be more desirable. Therefore, as stated above, the preferred communication path may vary with time.

In one embodiment of the present invention, a software cache, such as 1304 or 1306, may be used to provide an alternate communication path. The software cache may provide a wired and wireless communication path. The software cache 1304 may be coupled to a gaming machine or may be embodied as separate stand-alone device on the network 1303. An example of software cache that may be used with the present invention is described in co-pending U.S. application Ser. No. 10/187,059, filed Jun. 28, 2002 by Nguyen, and titled "REDUNDANT GAMING NETWORK MEDIATION," which is incorporated herein in its entirety and for all purposes.

Fast download times are important for providing game-on-demand services. It may not be acceptable to a gaming operator to provide game-on-demand services to game players if the cash throughput on a gaming machine is decreased as a result of slow download times. For example, if the number of games played on a gaming machine is decreased because the players are waiting for game software downloads, the gaming operator may not implement this feature for the players. Even when the download times are relative fast and acceptable to the game player, it may not be acceptable to the gaming operator to provide this feature to the game players if it results in a net decrease in gaming revenue on a gaming machine.

Nevertheless, even if game-on-demand is not provided to game players because of download time concerns, game operators may still desire this capability to simplify and speed-up the process of configuring games on a group of gaming machines distributed on a casino floor if it can be shown to be more efficient than manually performing this task.

A number of approaches may be used to decrease download times. The approaches that are applied may depend on a bandwidth of the network and a size of the game software that is being downloaded. In one example, the storage caches, 1304 and 1306, may be used temporarily to store game software to lessen traffic on a portion of the network 1303 when usage on the network is high. Thus, the storage cache 1304 or another gaming device may monitor traffic on the network 1303 and current software download times. In another example, the storage cache 1304 may be used temporarily while a gaming machine is being used, such as generating game play, to prevent performance degradation on the gaming machine. In one embodiment, the storage cache may be embodied as a component of a player tracking unit.

In another embodiment of the present invention, peer-to-peer transfer between gaming devices may be used to decrease download times. For instance, gaming machine 55 may be used to transfer a desired software program to gaming machine 56 and gaming machine 56 may be used to transfer a desired game software program to gaming machine 58. This approach may be faster than having the gaming devices, such as 55, 56, 57, 58, 1503 and 1511 all download their software from a central server, such as central game software host 1572.

To allow for peer-to-peer transfers, in one embodiment, a gaming device may randomly or using a pre-defined algorithm start contacting its neighbors to locate a desired piece software on the network 1303. In another embodiment, the gaming device may broadcast a message to a plurality of gaming devices on the network and then employ an algorithm that allows it to select a device to use for the download when it receives more than two responses. In yet another embodiment, one or more devices may maintain a directory listing the location of game software on the network 1303 and the gaming device may use this listing service to locate a nearby neighbor that can provide a fast download of the desired game software.

In one embodiment of the present invention, a device in the network, such as 1572, may monitor the distribution of game software on the network 1303. Based on a current distribution of game software, the distribution-monitoring device may redistribute the game software on the network 1303 to decrease download times. For example, if a group of gaming machines configured in a token ring did not share a particularly popular game software title, then the monitoring device might move or copy this software from one location on the network to a gaming machine on the token ring.

Another function of distribution monitoring device may be to seed the network 1303 with new game software. For example, when new game software is introduce to the network 1303, the distribution monitoring device may download the game software to a number of devices in the network in a manner that will provide efficient peer-to-peer transfers of game software. In one embodiment, the distribution-monitoring device may perform this initial seeding of game software in the network 1303 by simultaneously broadcasting the program to a number of target devices.

FIG. 19 is block diagram of software 1400 on a gaming machine 2 of the present invention. The gaming machine software 1400 may include Operating System (OS) software 1450. The OS 1450 may be used to load and unload game software modules, such as game software modules 1401, download/upload software modules 1418, download procedure software 1416, licensing procedure software 1432, game software configuration management software modules 1442 and game play hosting software 1460, from a mass storage device on the gaming machine 2 into RAM for execution as processes on the gaming machine. A master gaming controller on the gaming machine 2 may execute the software 1400.

The OS software 1450 may include logic 1452 for maintaining operation integrity of the gaming machine 2. This logic may be used to prevent the degradation of game play performance on the gaming machine 2 when it is performing other tasks, such as during the downloading and uploading software. For instance as part of operational integrity 1452, the OS 1450 may maintain a directory structure, monitor the status of processes, schedule the processes for execution and perform load balancing. During game play on the gaming machine, the gaming OS 1450 may load and unload processes from RAM in a dynamic manner. Details of an OS 1450 and other processes that may be used in the present invention are described in U.S. application Ser. No. 10/040,239 previously incorporated herein.

The process verification software 1454 may be used to verify that processes executing on the gaming machine are authorized processes. The authenticity of the game software applications temporarily stored in RAM may be verified by using methods to compare it with certified game software (trusted information source as described with respect to FIG. 16) stored on one or more local or remote file storage devices accessible to the master gaming controller on the gaming machine. The verification process may be used to satisfy gaming regulatory entities within gaming jurisdictions that require certified game software to be operating on the gaming machine at all times as well as to prevent tampering.

The process verification logic may be embodied as trusted firmware and/or software. For example, during the boot process for the gaming machine 2, software used in the verification process may be loaded from an EPROM on the gaming machine. Details of process verification that may be used in the present invention are described in U.S. Pat. No. 6,685,567, filed Aug. 8, 2001, and titled "PROCESS VERIFICATION," previously incorporated herein.

The communication logic 1456 may provide logic and communication protocols that allow the gaming machine to communication with gaming devices in the gaming system. Different communication protocols may be used for communicating different types of information. For example, a first communication protocol may be used for downloading game software, a second communication protocol may be used for communicating licensing information and a third communication protocol may be used for game play hosting where the gaming machine provides information used to generate a game of chance on a remote gaming device.

Game software 1401 may be executed on the gaming machine to present a game of chance (see FIG. 2). A few example of game software components used in the game software 1401 may include 1) game logic 1402 that control a flow of the game on the gaming machine, 2) presentation logic 1404 including graphics and audio information for presenting the game of chance on the gaming machine 2, 3) configuration files including data, such as pay tables, used by the game software and 4) copy protection 1408 software/data, such as multiple copies of a software certificate attached to different game software components.

The download/upload software 1418 may comprise software 1410 for uploading and downloading software, 1415 and 1416. In addition, the download/upload software 1418 may include logic for optimizing the transfer of software, such as identifying a least congested communication path or identifying a nearest neighbor for a peer-to-peer communication. The software inventory module 1412 may be used to provide a software inventory of the software residing on the gaming machine 2. A remote device may request this inventory to determine a distribution of game software in a game system or a portion of a game system.

In another embodiment, the software inventory module 1412 may include logic that allows the gaming machine send out software inventory request for compiling a distribution of software over an entire game system or a portion of a game system. For instance, one gaming machine, such as gaming machine 2, in a group of gaming machine connected in a fiber loop or a token ring may determine the distribution of software in the group of gaming machines. The software distribution compiled by gaming machine 2 may be used in peer-to-peer transfers where other gaming machines contact gaming machine 2 to find out a location of particular game software. Further, the gaming machine 2 may act as concentrator such that it reports a distribution of software (software inventory) for a group of gaming machines to a remote device rather than each gaming machine reporting its software inventory to the remote device. The remote device may combine concentrated software inventories from a number of gaming machines into a larger software distribution (see FIGS. 16, 17A-D, for more details).

The gaming machine 2 may include software 1430 for acting as a download authorization host as described with respect to FIGS. 9 (software authorization agent 50) or FIGS. 16 and 18 (software download authorization agent 1506). As a download authorization host, the gaming machine may receive requests from other gaming devices requesting permission to download software to another the device. The requested software may reside on the gaming machine 2 or another gaming device. In some embodiments, the requested game software may not be downloaded until an approval is received from the gaming machine 2.

The gaming machine software may include download procedure software 1416. The download procedure software 1416 may include software, firmware and/or data for 1) determining if a download is authorized 1424, such as copy, movement and location rules described with respect to FIGS. 17A-D, 2) specifying jurisdictional rules 1428 in regards to downloading, 3) establishing and verifying an identity of a device involved in a transfer of game software 1426, 4) authenticating downloaded game software 1422 and 5) authenticating a software license attached to downloaded software.

The configuration management software 1442 may be used to generate interfaces for configuring software on the gaming machine, such as downloads or licensing. The interfaces may be displayed on the gaming machine or on a remote device in communication with the gaming machine. The player configuration software 1444 may be used to generate an interface for use by a game player, such as a player that selects a game for download. The operator configuration software 1436 may be used to generate an interface for use by a gaming machine operator. The operator interface may have more options than the player interface. For instance, an operator interface may allow the operator to adjust the licenses for software while a player interface may not provide this feature.

The licensing procedure software 1432 may include modules for allowing the gaming machine 2 to act as a license host server 1434 or as license client 1436. For example, the license client software 1436 may include the license software agent described with respect to FIGS. 17A-D. The licensing host logic 1434 may allow the gaming machine as a licensing host server as described with respect to FIGS. 17A-D. For example, the gaming machine may be able to distribute licensing to tokens to other gaming devices.

The game play hosting software 1460 may be used to allow the gaming machine 2 to generate games of chance for display on one or more remote gaming devices or receive for display a game of chance generated on a remote gaming device. The game host software 1462 may be used to generate games on remote devices. The game client software 1464 may be used for receiving and displaying games generated on the remote device.

The generation of games by the host may allow for a number of levels of control in regards to the host-client relationship. For example, the host may simply generate random numbers that can be used with a pay table on the host or the client to determine a game outcome. These numbers can be sent to the client where the client generates under its own control a graphical presentation. In another example, the host may generate the random numbers determine the game outcome and control a graphical presentation on the client. In another example, the host may generate the outcome and the graphical presentation and stream it to the host.

FIG. 20 is a flow chart illustrating a method of providing game downloading and game licensing on a gaming machine of the present invention. In 1600, the gaming machine may send a request to a game software host. The request may be initiated by a player, an operator or automatically from triggers on the gaming machine. In 1602, the gaming machine receives a download of the software from the host. The downloaded software may be stored to a mass storage device and authenticated.

In 1604, the downloaded game software and a software agent (see FIGS. 17A-17D) may be loaded into RAM and scheduled for execution by the operating system on the gaming machine. In 1606, the gaming machine may determine whether the license control for the downloaded game software is provided from a remote device or is built into the software. In one embodiment, the software agent may establish communication with the game software to determine whether control is remote or built into the game software.

In 1608, when licensing is handled centrally, the software agent may send a request for a licensing token to the remote server and receive the token 1610. In 1612, information in a license certificate for the downloaded software may be compared with the information in the license token. As described with respect to FIG. 17B, the licensing certificate may specify a number of conditions that can prevent the downloaded software from executing in an unfettered manner. In 1614, when the token is valid, the downloaded software is executed. In 1618, when the token is not valid, the downloaded game software may generate a non-valid token response.

In 1620, when the licensing is built into the downloaded game software, the software certificate in the software may be checked. If the certificate has expired, then in 1624 a certificate renewal request may be sent to a remote gaming device and in 1626 the gaming machine may receive a new or renewed certificate. In 1628, the downloaded software may determine requirements in the certificate.

In 1630, the requirements or rules specified in the software certificate may be checked against its current status on the gaming machine. This check may require the game software to gather information from other processes executing on the gaming machine. In 1616, when the status of the software on the gaming machine complies with the rules specified in the certificate, the game software may be executed normally. In 1632, when the status of the software on the gaming machine does not meet one or more requirements specified in the certificate, then it is possible that the game software may be executed in a manner that deviates from normal mode of operation.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A gaming machine for providing wagering on a game of chance, the gaming machine comprising:
    a master gaming controller designed or configured i) to generate a game of chance played on the gaming machine by executing a plurality of game software modules including a first game software module and a second game software module wherein the first game software module is executed according to rules specified in a first license; ii) to validate that the first game software module is being used according to the rules specified in the first license; iii) to request a first license token from a first remote gaming device for the first game software module; iv) to download from a second remote gaming device the second game software module;
    wherein the gaming machine is part of a gaming system comprising a plurality of gaming devices including the first remote gaming device and the second remote gaming device and wherein a copy of the second game software module is stored on a portion of the plurality of gaming devices and wherein the master gaming controller is further designed or configured to select between two or more of the gaming devices storing the second game software module and request a download of the second game software module from the selected gaming device;
    a memory device for storing the plurality of game software modules;
    a trusted memory device for storing authentication logic used to determine that the plurality of game software modules are authorized for use on the gaming machine;
    a gaming operating system comprising logic to load and unload the plurality of game software modules into a RAM from the memory device and to control the play of the game of chance;
    a non-volatile memory for storing state information wherein during play of the game of chance the gaming machine advances between a plurality of states and stores the state information for each of the plurality of states to the non-volatile memory and wherein when a malfunction occurs between a first state and a second state in the plurality of states the gaming machine is operable to restore itself to the first state using the state information for the first state stored in the non-volatile memory;
    an input device for receiving cash or indicia of credit used for the wagering;
    an output device for outputting cash or indicia of credit;
    a display for displaying a presentation of the game of chance; and
    a network interface for communicating with the first remote gaming device or the second remote gaming device.

2. The gaming machine of claim 1, wherein the first remote gaming device or the second remote gaming device is first gaming machine operable to provide wagering on a first game of chance in a casino and wherein the first gaming machine includes a housing, a first input device coupled to the housing for receiving the cash or the indicia of credit, a first output device coupled to the housing for outputting the cash or indicia and a first display for displaying the first game of chance.

3. The gaming machine of claim 1, wherein memory device stores game software modules that require a license token.

4. The gaming machine of claim 3, wherein the master gaming controller is further designed or configured to determine which of the game software modules requires the license token.

5. The gaming machine of claim 1, further comprising: executable logic for determining a response when the first license token is not available for the first game software module.

6. The gaming machine of claim 5, wherein the executable logic is embedded in the first game software module.

7. The gaming machine of claim 5, wherein executable logic is stored on the trusted memory device.

8. The gaming machine of claim 5, wherein the response is one or more of 1) sending a message notifying an operator or user of the gaming machine that the license token is not available, 2) preventing execution of the second game software module, 3) disabling one or more features of the second game software module, 4) altering an output of data from the second game software module and 5) combinations thereof.

9. The gaming machine of claim 1, wherein the first license token is required to execute the game of chance.

10. The gaming machine of claim 1, wherein the gaming machine is operable to execute a plurality of instances of the game of chance.

11. The gaming machine of claim 10, wherein a first instance of the game of chance requires a license token for execution and wherein a second instance of the game of chance does not require any license token.

12. The gaming machine of claim 11, wherein, when a request is made for the first instance of the game of chance and in response to the license token not being available for the first instance, the second instance of the game chance is executed.

13. The gaming machine of claim 10, wherein a first instance of the game of chance is executed according to rules specified in the first license and a second instance of the game of chance is executed according to rules specified in a second license different from the first license.

14. The gaming machine of claim 13, wherein the first instance of the game of chance is from a first game software content provider and wherein the second instance of the game of chance is from a second game software content provider.

15. The gaming machine of claim 10, wherein a first instance of the game of chance and a second instance of the game of chance share a common license.

16. The gaming machine of claim 10, wherein the master gaming controller is further designed or configured to track usage information for each of the plurality of instances of the game of chance.

17. The gaming machine of claim 16, wherein the master gaming controller is further designed or configured to report the usage information to the first remote gaming device or the second remote gaming device.

18. The gaming machine of claim 1, wherein the master gaming controller, the first remote gaming device or the second remote gaming device is further designed or configured to determine a licensing cost for playing the game of chance.

19. The gaming machine of claim 18, wherein the licensing cost is based upon one or more of 1) a popularity of the game of chance, 2) a time that the game of chance is played, 3) a wager amount that is made on the game of chance, 4) a type of gaming machine on which the game of chance is played, 5) a location in the casino of the gaming machine, 6) a fixed cost per game, 7) a fixed cost per game that varies as a function of time, 8) a fixed cost per game that varies according to a total number of times the game of chance has been played on the gaming machine, 9) a number of games of chance that are being played on the gaming machine simultaneously, 10) player information of a player playing the game of chance, 11) whether the gaming machine is linked to other gaming machines, 12) whether the gaming machine is linked to a progressive system, 13) whether the gaming machine is linked to a bonus system, 14) whether the gaming machine is linked to a central determination system, 15) a denomination of the game, 16) a fixed cost per game that varies according to a total number times the game of chance has been played on a group of gaming machines, 17) a discount provided to the gaming machine operator and 18) combinations thereof.

20. The gaming machine of claim 1, wherein the RAM is loaded with two or more game software modules that are executed according to rules specified in two or more different licenses.

21. The gaming machine of claim 1, wherein the RAM is loaded with two or more game software that each use a different license token.

22. The gaming machine of claim 1, wherein an identity of the remote gaming device is authenticated using a zero knowledge proof.

23. The gaming machine of claim 1, wherein the master gaming controller is further designed or configured to request a product activation code from a remote gaming device for the first game software module.

24. The gaming machine of claim 1, wherein the master gaming controller is further designed or configured to determine its game software configuration and send information describing its game software configuration to the remote gaming device.

25. The gaming machine of claim 1, wherein the first remote gaming device and the second remote gaming device is the same gaming device.

26. The gaming machine of claim 1, wherein the gaming machine is part of a gaming system including a plurality of gaming machines and wherein only a limited number of license tokens including the first license token are available to the gaming machines in the gaming system.

27. The gaming machine of claim 1, wherein the gaming machine is part of a gaming system including a plurality of gaming machines and wherein only a limited number of copies of the second game software module are allowed to exist in the gaming system.

28. The gaming machine of claim 1, wherein the master gaming controller is further designed or configured to determine whether one or more of the plurality of game software modules is permitted in a gaming jurisdiction where the gaming machine is located.

29. The gaming machine of claim 1, wherein the master gaming controller is further designed or configured to determine whether a software configuration comprising one or more software configuration parameters for the plurality of game software modules is permitted in a gaming machine jurisdiction where the gaming machine is located.

30. The gaming machine of claim 1, wherein the gaming machine is part of a gaming system comprising a plurality of gaming devices including the first remote gaming device and the second remote gaming device and wherein a copy of the second game software module is stored on at least one of the plurality of gaming devices and wherein the master gaming controller is further designed or configured to find the copy of the second game software module in the gaming system.

31. The gaming machine of claim 30, wherein the gaming machine is operable to find the copy of the second game software module by requesting device identification information for a first gaming device storing the copy of the second game software module from a second gaming device.

32. The gaming machine of claim 31, wherein the gaming machine is operable to contact the second gaming device using the device identification information received from the first gaming device and to request a download of the second game software module.

33. The gaming machine of claim 1, wherein the selection between the two or more of the gaming devices storing the second game software module is based upon one or more of a) a load status of each of the gaming devices, b) a traffic load on a network connecting the gaming machine to the two or more gaming devices, c) a distance over a network between the gaming machine and each of the gaming devices and d) combinations thereof.

34. The gaming machine of claim 1, wherein the master gaming controller is operable to render on the display a list comprising one or more of 1) instances of the game of chance available for play on the gaming machine, 2) instances of bonus games available for play on the gaming machine and 3) instances of progressive games available for play on the gaming machine.

35. The gaming machine of claim 34, wherein the download of the second game software module is initiated in response to the master gaming controller receiving a selection from the list.

36. The gaming machine of claim 34, wherein the request for the first license token is initiated in response to the master gaming controller receiving a selection from the list.

37. The gaming machine of claim 1, wherein the first license includes one or more expiration limits after which the first license expires.

38. The gaming machine of claim 37, wherein the one or more expiration limits are selected from the group consisting of a date, an interval of time and a number of uses.

39. The gaming machine of claim 37, wherein the master gaming controller is further designed or configured to determine whether the one or more of the expiration limits have been exceeded.

40. The gaming machine of claim 37, wherein the master gaming controller is further designed or configured to request a new license when the first license is near expiration or has expired.

41. The gaming machine of claim 1, wherein first game software module includes a software certificate that is attached to or integrated into the first game software module wherein the software certificate comprises one or more of 1) licensing rules specified in the first license, 2) jurisdictional rules specifying use limitations in different gaming jurisdictions for the first game software module, 3) duplication rules specifying copying restrictions for the first game software module, 4) movement rules for determining whether the first game software module can be moved to another gaming device, 5) location rules specifying types of gaming devices allowed to store and execute the first game software module, 6) a download history for the first game software module, 7) an usage history for the first game software module and 8) combinations thereof.

42. The gaming machine of claim 41, wherein the master gaming controller is further designed or configured to periodically update the software certificate with usage information describing usage of the first game software module on the gaming machine.

43. The gaming machine of claim 41, wherein the master gaming controller is further designed or configured to send information stored on the software certificate to a remote gaming device.

44. The gaming machine of claim 41, wherein the master gaming controller is further designed or configured to request a new software certificate for the first game software module.

45. The gaming machine of claim 41, wherein the master gaming controller is further designed or configured to authenticate a validity of the software certificate.

46. The gaming machine of claim 41, wherein the master gaming controller is further designed or configured to generate a unique digital signature for the software certificate using at least information from the usage history stored on the software certificate.

47. The gaming machine of claim 1, wherein the master gaming controller is further designed to receive a request for a copy of the first game software module from a remote gaming device.

48. The gaming machine of claim 47, wherein the remote gaming device is a first gaming machine providing the play of a wagering game of chance.

49. The gaming machine of claim 47, wherein in response to receiving the request, the gaming machine is operable to generate the copy of the first game software module and send the copy to the remote gaming device.

50. The gaming machine of claim 49, wherein after the copy is sent to the remote gaming device, the gaming machine is operable to delete the copy of the first game software module stored on the gaming machine.

51. The gaming machine of claim 1, wherein the first remote gaming device or the second remote gaming device is selected from a group consisting of a billing/accounting server, a player tracking server, a gaming machine, a wireless mobile gaming device, a game play hosting server and a game software hosting server.

52. The gaming machine of claim 1, wherein the master gaming controller is further designed or configured, prior to the download of the second game software module, to notify of the second remote gaming device of its hardware and software capabilities.

53. The gaming machine of claim 1, wherein the master gaming controller is further designed or configured, prior to the download of the second game software module, to request a specific version of the second game software module that it is compatible with the gaming machine.

54. The gaming machine of claim 1, wherein the master gaming controller is further designed or configured, after the download of the second game software module, to determine whether the second game software module is compatible with the gaming machine.

55. A gaming machine for providing wagering on a game of chance, the gaming machine comprising:
  a master gaming controller designed or configured i) to generate a game of chance played on the gaming machine by executing a plurality of game software modules including a first game software module and a second game software module wherein the first game software module is executed according to rules specified in a first license; ii) to validate that the first game software module is being used according to the rules specified in the first license; iii) to request a first license token from a first remote gaming device for the first game software module; iv) to download from a second remote gaming device the second game software module;
  a memory device for storing the plurality of game software modules;
  a trusted memory device for storing authentication logic used to determine that the plurality of game software modules are authorized for use on the gaming machine;
  a gaming operating system comprising logic to load and unload the plurality of game software modules into a RAM from the memory device and to control the play of the game of chance;
  a non-volatile memory for storing state information wherein during play of the game of chance the gaming machine advances between a plurality of states and stores the state information for each of the plurality of states to the non-volatile memory and wherein when a malfunction occurs between a first state and a second state in the plurality of states the gaming machine is operable to restore itself to the first state using the state information for the first state stored in the non-volatile memory;
  an input device for receiving cash or indicia of credit used for the wagering;
  an output device for outputting cash or indicia of credit;
  a display for displaying a presentation of the game of chance; and
  a network interface for communicating with the first remote gaming device or the second remote gaming device
  wherein first game software module includes a software certificate that is attached to or integrated into the first game software module wherein the software certificate comprises an usage history for the first game software module; and
  wherein the master gaming controller is further designed or configured to generate a unique digital signature for the software certificate using at least information from the usage history stored on the software certificate.

56. The gaming machine of claim 55, wherein the first remote gaming device or the second remote gaming device is first gaming machine operable to provide wagering on a first game of chance in a casino and wherein the first gaming machine includes a housing, a first input device coupled to the housing for receiving the cash or the indicia of credit, a first output device coupled to the housing for outputting the cash or indicia and a first display for displaying the first game of chance.

57. The gaming machine of claim 55, wherein memory device stores game software modules that require a license token.

58. The gaming machine of claim 57, wherein the master gaming controller is further designed or configured to determine which of the game software modules requires the license token.

59. The gaming machine of claim 55, further comprising: executable logic for determining a response when the first license token is not available for the first game software module.

60. The gaming machine of claim 59, wherein the executable logic is embedded in the first game software module.

61. The gaming machine of claim 59, wherein executable logic is stored on the trusted memory device.

62. The gaming machine of claim 59, wherein the response is one or more of 1) sending a message notifying an operator or user of the gaming machine that the license token is not available, 2) preventing execution of the second game software module, 3) disabling one or more features of the second game software module, 4) altering an output of data from the second game software module and 5) combinations thereof.

63. The gaming machine of claim 55, wherein the first license token is required to execute the game of chance.

64. The gaming machine of claim 55, wherein the gaming machine is operable to execute a plurality of instances of the game of chance.

65. The gaming machine of claim 64, wherein a first instance of the game of chance requires a license token for execution and wherein a second instance of the game of chance does not require any license token.

66. The gaming machine of claim 65, wherein, when a request is made for the first instance of the game of chance and in response to the license token not being available for the first instance, the second instance of the game chance is executed.

67. The gaming machine of claim 64, wherein a first instance of the game of chance is executed according to rules specified in the first license and a second instance of the game of chance is executed according to rules specified in a second license different from the first license.

68. The gaming machine of claim 67, wherein the first instance of the game of chance is from a first game software content provider and wherein the second instance of the game of chance is from a second game software content provider.

69. The gaming machine of claim 64, wherein a first instance of the game of chance and a second instance of the game of chance share a common license.

70. The gaming machine of claim 64, wherein the master gaming controller is further designed or configured to track usage information for each of the plurality of instances of the game of chance.

71. The gaming machine of claim 70, wherein the master gaming controller is further designed or configured to report the usage information to the first remote gaming device or the second remote gaming device.

72. The gaming machine of claim 55, wherein the master gaming controller, the first remote gaming device or the second remote gaming device is further designed or configured to determine a licensing cost for playing the game of chance.

73. The gaming machine of claim 72, wherein the licensing cost is based upon one or more of 1) a popularity of the game of chance, 2) a time that the game of chance is played, 3) a wager amount that is made on the game of chance, 4) a type of gaming machine on which the game of chance is played, 5) a location in the casino of the gaming machine, 6) a fixed cost per game, 7) a fixed cost per game that varies as a function of time, 8) a fixed cost per game that varies according to a total number of times the game of chance has been played on the gaming machine, 9) a number of games of chance that are being played on the gaming machine simultaneously, 10) player information of a player playing the game of chance, 11) whether the gaming machine is linked to other gaming machines, 12) whether the gaming machine is linked to a progressive system, 13) whether the gaming machine is linked to a bonus system, 14) whether the gaming machine is linked to a central determination system, 15) a denomination of the game, 16) a fixed cost per game that varies according to a total number times the game of chance has been played on a group of gaming machines, 17) a discount provided to the gaming machine operator and 18) combinations thereof.

74. The gaming machine of claim 55, wherein the RAM is loaded with two or more game software modules that are executed according to rules specified in two or more different licenses.

75. The gaming machine of claim 55, wherein the RAM is loaded with two or more game software that each use a different license token.

76. The gaming machine of claim 55, wherein an identity of the remote gaming device is authenticated using a zero knowledge proof.

77. The gaming machine of claim 55, wherein the master gaming controller is further designed or configured to request a product activation code from a remote gaming device for the first game software module.

78. The gaming machine of claim 55, wherein the master gaming controller is further designed or configured to determine its game software configuration and send information describing its game software configuration to the remote gaming device.

79. The gaming machine of claim 55, wherein the first remote gaming device and the second remote gaming device is the same gaming device.

80. The gaming machine of claim 55, wherein the gaming machine is part of a gaming system including a plurality of gaming machines and wherein only a limited number of license tokens including the first license token are available to the gaming machines in the gaming system.

81. The gaming machine of claim 55, wherein the gaming machine is part of a gaming system including a plurality of gaming machines and wherein only a limited number of copies of the second game software module are allowed to exist in the gaming system.

82. The gaming machine of claim 55, wherein the master gaming controller is further designed or configured to determine whether one or more of the plurality of game software modules is permitted in a gaming jurisdiction where the gaming machine is located.

83. The gaming machine of claim 55, wherein the master gaming controller is further designed or configured to determine whether a software configuration comprising one or more software configuration parameters for the plurality of game software modules is permitted in a gaming machine jurisdiction where the gaming machine is located.

84. The gaming machine of claim 55, wherein the gaming machine is part of a gaming system comprising a plurality of gaming devices including the first remote gaming device and the second remote gaming device and wherein a copy of the second game software module is stored on at least one of the plurality of gaming devices and wherein the master gaming controller is further designed or configured to find the copy of the second game software module in the gaming system.

85. The gaming machine of claim 84, wherein the gaming machine is operable to find the copy of the second game software module by requesting device identification information for a first gaming device storing the copy of the second game software module from a second gaming device.

86. The gaming machine of claim 85, wherein the gaming machine is operable to contact the second gaming device using the device identification information received from the first gaming device and to request a download of the second game software module.

87. The gaming machine of claim 55, wherein the gaming machine is part of a gaming system comprising a plurality of gaming devices including the first remote gaming device and the second remote gaming device and wherein a copy of the second game software module is stored on a portion of the plurality of gaming devices and wherein the master gaming controller is further designed or configured to select between two or more of the gaming devices storing the second game software module and request a download of the second game software module from the selected gaming device.

88. The gaming machine of claim 87, wherein the selection between the two or more of the gaming devices storing the second game software module is based upon one or more of a) a load status of each of the gaming devices, b) a traffic load on a network connecting the gaming machine to the two or more gaming devices, c) a distance over a network between the gaming machine and each of the gaming devices and d) combinations thereof.

89. The gaming machine of claim 55, wherein the master gaming controller is operable to render on the display a list comprising one or more of 1) instances of the game of chance available for play on the gaming machine, 2) instances of bonus games available for play on the gaming machine and 3) instances of progressive games available for play on the gaming machine.

90. The gaming machine of claim 89, wherein the download of the second game software module is initiated in response to the master gaming controller receiving a selection from the list.

91. The gaming machine of claim 89, wherein the request for the first license token is initiated in response to the master gaming controller receiving a selection from the list.

92. The gaming machine of claim 55, wherein the first license includes one or more expiration limits after which the first license expires.

93. The gaming machine of claim 92, wherein the one or more expiration limits are selected from the group consisting of a date, an interval of time and a number of uses.

94. The gaming machine of claim 92, wherein the master gaming controller is further designed or configured to determine whether the one or more of the expiration limits have been exceeded.

95. The gaming machine of claim 92, wherein the master gaming controller is further designed or configured to request a new license when the first license is near expiration or has expired.

96. The gaming machine of claim 55, wherein first game software module includes a software certificate that is attached to or integrated into the first game software module wherein the software certificate comprises one or more of 1) licensing rules specified in the first license, 2) jurisdictional rules specifying use limitations in different gaming jurisdictions for the first game software module, 3) duplication rules specifying copying restrictions for the first game software module, 4) movement rules for determining whether the first game software module can be moved to another gaming device, 5) location rules specifying types of gaming devices allowed to store and execute the first game software module, 6) a download history for the first game software module and 7) combinations thereof.

97. The gaming machine of claim 96, wherein the master gaming controller is further designed or configured to periodically update the software certificate with usage information describing usage of the first game software module on the gaming machine.

98. The gaming machine of claim 96, wherein the master gaming controller is further designed or configured to send information stored on the software certificate to a remote gaming device.

99. The gaming machine of claim 96, wherein the master gaming controller is further designed or configured to request a new software certificate for the first game software module.

100. The gaming machine of claim 96, wherein the master gaming controller is further designed or configured to authenticate a validity of the software certificate.

101. The gaming machine of claim 55, wherein the master gaming controller is further designed to receive a request for a copy of the first game software module from a remote gaming device.

102. The gaming machine of claim 101, wherein the remote gaming device is a first gaming machine providing the play of a wagering game of chance.

103. The gaming machine of claim 101, wherein in response to receiving the request, the gaming machine is operable to generate the copy of the first game software module and send the copy to the remote gaming device.

104. The gaming machine of claim 103, wherein after the copy is sent to the remote gaming device, the gaming machine is operable to delete the copy of the first game software module stored on the gaming machine.

105. The gaming machine of claim 55, wherein the first remote gaming device or the second remote gaming device is selected from a group consisting of a billing/accounting server, a player tracking server, a gaming machine, a wireless mobile gaming device, a game play hosting server and a game software hosting server.

106. The gaming machine of claim 55, wherein the master gaming controller is further designed or configured, prior to the download of the second game software module, to notify of the second remote gaming device of its hardware and software capabilities.

107. The gaming machine of claim 55, wherein the master gaming controller is further designed or configured, prior to the download of the second game software module, to request a specific version of the second game software module that it is compatible with the gaming machine.

108. The gaming machine of claim 55, wherein the master gaming controller is further designed or configured, after the download of the second game software module, to determine whether the second game software module is compatible with the gaming machine.

109. A gaming machine for providing wagering on a game of chance, the gaming machine comprising:

a master gaming controller designed or configured i) to generate a game of chance played on the gaming machine by executing a plurality of game software modules including a first game software module and a second game software module wherein the first game software module is executed according to rules specified in a first license; ii) to validate that the first game software module is being used according to the rules specified in the first license; iii) to request a first license token from a first remote gaming device for the first game software module; iv) to download from a second remote gaming device the second game software module;

wherein the master gaming controller is further designed to receive a request for a copy of the first game software module from a remote gaming device and wherein in response to receiving the request, the gaming machine is operable to generate the copy of the first game software module and send the copy to the remote gaming device and wherein after the copy is sent to the remote gaming device, the gaming machine is operable to delete the copy of the first game software module stored on the gaming machine;

a memory device for storing the plurality of game software modules;

a trusted memory device for storing authentication logic used to determine that the plurality of game software modules are authorized for use on the gaming machine;

a gaming operating system comprising logic to load and unload the plurality of game software modules into a RAM from the memory device and to control the play of the game of chance;

a non-volatile memory for storing state information wherein during play of the game of chance the gaming machine advances between a plurality of states and stores the state information for each of the plurality of states to the non-volatile memory and wherein when a malfunction occurs between a first state and a second state in the plurality of states the gaming machine is operable to restore itself to the first state using the state information for the first state stored in the non-volatile memory;

an input device for receiving cash or indicia of credit used for the wagering;

an output device for outputting cash or indicia of credit;

a display for displaying a presentation of the game of chance; and a network interface for communicating with the first remote gaming device or the second remote gaming device.

110. The gaming machine of claim 109, wherein the first remote gaming device or the second remote gaming device is first gaming machine operable to provide wagering on a first game of chance in a casino and wherein the first gaming machine includes a housing, a first input device coupled to the housing for receiving the cash or the indicia of credit, a first output device coupled to the housing for outputting the cash or indicia and a first display for displaying the first game of chance.

111. The gaming machine of claim 109, wherein memory device stores game software modules that require a license token.

112. The gaming machine of claim 111, wherein the master gaming controller is further designed or configured to determine which of the game software modules requires the license token.

113. The gaming machine of claim 109, further comprising: executable logic for determining a response when the first license token is not available for the first game software module.

114. The gaming machine of claim 113, wherein the executable logic is embedded in the first game software module.

115. The gaming machine of claim 113, wherein executable logic is stored on the trusted memory device.

116. The gaming machine of claim 113, wherein the response is one or more of 1) sending a message notifying an operator or user of the gaming machine that the license token is not available, 2) preventing execution of the second game software module, 3) disabling one or more features of the second game software module, 4) altering an output of data from the second game software module and 5) combinations thereof.

117. The gaming machine of claim 109, wherein the first license token is required to execute the game of chance.

118. The gaming machine of claim 109, wherein the gaming machine is operable to execute a plurality of instances of the game of chance.

119. The gaming machine of claim 118, wherein a first instance of the game of chance requires a license token for execution and wherein a second instance of the game of chance does not require any license token.

120. The gaming machine of claim 119, wherein, when a request is made for the first instance of the game of chance and in response to the license token not being available for the first instance, the second instance of the game chance is executed.

121. The gaming machine of claim 118, wherein a first instance of the game of chance is executed according to rules specified in the first license and a second instance of the game of chance is executed according to rules specified in a second license different from the first license.

122. The gaming machine of claim 121, wherein the first instance of the game of chance is from a first game software content provider and wherein the second instance of the game of chance is from a second game software content provider.

123. The gaming machine of claim 118, wherein a first instance of the game of chance and a second instance of the game of chance share a common license.

124. The gaming machine of claim 118, wherein the master gaming controller is further designed or configured to track usage information for each of the plurality of instances of the game of chance.

125. The gaming machine of claim 124, wherein the master gaming controller is further designed or configured to report the usage information to the first remote gaming device or the second remote gaming device.

126. The gaming machine of claim 109, wherein the master gaming controller, the first remote gaming device or the second remote gaming device is further designed or configured to determine a licensing cost for playing the game of chance.

127. The gaming machine of claim 126, wherein the licensing cost is based upon one or more of 1) a popularity of the game of chance, 2) a time that the game of chance is played, 3) a wager amount that is made on the game of chance, 4) a type of gaming machine on which the game of chance is played, 5) a location in the casino of the gaming machine, 6) a fixed cost per game, 7) a fixed cost per game that varies as a function of time, 8) a fixed cost per game that varies according to a total number of times the game of chance has been played on the gaming machine, 9) a number of games of chance that are being played on the gaming machine simultaneously, 10) player information of a player playing the game of chance, 11) whether the gaming machine is linked to other gaming machines, 12) whether the gaming machine is linked to a progressive system, 13) whether the gaming machine is linked to a bonus system, 14) whether the gaming machine is linked to a central determination system, 15) a denomination of the game, 16) a fixed cost per game that varies according to a total number times the game of chance has been played on a group of gaming machines, 17) a discount provided to the gaming machine operator and 18) combinations thereof.

128. The gaming machine of claim 109, wherein the RAM is loaded with two or more game software modules that are executed according to rules specified in two or more different licenses.

129. The gaming machine of claim 109, wherein the RAM is loaded with two or more game software that each use a different license token.

130. The gaming machine of claim 109, wherein an identity of the remote gaming device is authenticated using a zero knowledge proof.

131. The gaming machine of claim 109 wherein the master gaming controller is further designed or configured to request a product activation code from a remote gaming device for the first game software module.

132. The gaming machine of claim 109 wherein the master gaming controller is further designed or configured to determine its game software configuration and send information describing its game software configuration to the remote gaming device.

133. The gaming machine of claim 109 wherein the first remote gaming device and the second remote gaming device is the same gaming device.

134. The gaming machine of claim 109 wherein the gaming machine is part of a gaming system including a plurality of gaming machines and wherein only a limited number of license tokens including the first license token are available to the gaming machines in the gaming system.

135. The gaming machine of claim 109 wherein the gaming machine is part of a gaming system including a plurality of gaming machines and wherein only a limited number of copies of the second game software module are allowed to exist in the gaming system.

136. The gaming machine of claim 109 wherein the master gaming controller is further designed or configured to determine whether one or more of the plurality of game software modules is permitted in a gaming jurisdiction where the gaming machine is located.

137. The gaming machine of claim 109 wherein the master gaming controller is further designed or configured to determine whether a software configuration comprising one or more software configuration parameters for the plurality of game software modules is permitted in a gaming machine jurisdiction where the gaming machine is located.

138. The gaming machine of claim 109 wherein the gaming machine is part of a gaming system comprising a plurality of gaming devices including the first remote gaming device and the second remote gaming device and wherein a copy of the second game software module is stored on at least one of the plurality of gaming devices and wherein the master gaming controller is further designed or configured to find the copy of the second game software module in the gaming system.

139. The gaming machine of claim 138, wherein the gaming machine is operable to find the copy of the second game software module by requesting device identification information for a first gaming device storing the copy of the second game software module from a second gaming device.

140. The gaming machine of claim 139, wherein the gaming machine is operable to contact the second gaming device using the device identification information received from the first gaming device and to request a download of the second game software module.

141. The gaming machine of claim 109 wherein the gaming machine is part of a gaming system comprising a plurality of gaming devices including the first remote gaming device and the second remote gaming device and wherein a copy of the second game software module is stored on a portion of the plurality of gaming devices and wherein the master gaming controller is further designed or configured to select between two or more of the gaming devices storing the second game software module and request a download of the second game software module from the selected gaming device.

142. The gaming machine of claim 141, wherein the selection between the two or more of the gaming devices storing the second game software module is based upon one or more of a) a load status of each of the gaming devices, b) a traffic load on a network connecting the gaming machine to the two or more gaming devices, c) a distance over a network between the gaming machine and each of the gaming devices and d) combinations thereof.

143. The gaming machine of claim 109 wherein the master gaming controller is operable to render on the display a list comprising one or more of 1) instances of the game of chance available for play on the gaming machine, 2) instances of bonus games available for play on the gaming machine and 3) instances of progressive games available for play on the gaming machine.

144. The gaming machine of claim 143, wherein the download of the second game software module is initiated in response to the master gaming controller receiving a selection from the list.

145. The gaming machine of claim 143, wherein the request for the first license token is initiated in response to the master gaming controller receiving a selection from the list.

146. The gaming machine of claim 109 wherein the first license includes one or more expiration limits after which the first license expires.

147. The gaming machine of claim 146, wherein the one or more expiration limits are selected from the group consisting of a date, an interval of time and a number of uses.

148. The gaming machine of claim 146, wherein the master gaming controller is further designed or configured to determine whether the one or more of the expiration limits have been exceeded.

149. The gaming machine of claim 146, wherein the master gaming controller is further designed or configured to request a new license when the first license is near expiration or has expired.

150. The gaming machine of claim 109 wherein first game software module includes a software certificate that is attached to or integrated into the first game software module wherein the software certificate comprises one or more of 1) licensing rules specified in the first license, 2) jurisdictional rules specifying use limitations in different gaming jurisdictions for the first game software module, 3) duplication rules specifying copying restrictions for the first game software module, 4) movement rules for determining whether the first game software module can be moved to another gaming device, 5) location rules specifying types of gaming devices allowed to store and execute the first game software module, 6) a download history for the first game software module, 7) an usage history for the first game software module and 8) combinations thereof.

151. The gaming machine of claim 150, wherein the master gaming controller is further designed or configured to periodically update the software certificate with usage information describing usage of the first game software module on the gaming machine.

152. The gaming machine of claim 150, wherein the master gaming controller is further designed or configured to send information stored on the software certificate to a remote gaming device.

153. The gaming machine of claim 150, wherein the master gaming controller is further designed or configured to request a new software certificate for the first game software module.

154. The gaming machine of claim 150, wherein the master gaming controller is further designed or configured to authenticate a validity of the software certificate.

155. The gaming machine of claim 150, wherein the master gaming controller is further designed or configured to generate a unique digital signature for the software certificate using at least information from the usage history stored on the software certificate.

156. The gaming machine of claim 109, wherein the remote gaming device is a first gaming machine providing the play of a wagering game of chance.

157. The gaming machine of claim 109 wherein the first remote gaming device or the second remote gaming device is selected from a group consisting of a billing/accounting server, a player tracking server, a gaming machine, a wireless mobile gaming device, a game play hosting server and a game software hosting server.

158. The gaming machine of claim 109 wherein the master gaming controller is further designed or configured, prior to the download of the second game software module, to notify of the second remote gaming device of its hardware and software capabilities.

159. The gaming machine of claim 109 wherein the master gaming controller is further designed or configured, prior to the download of the second game software module, to request a specific version of the second game software module that it is compatible with the gaming machine.

160. The gaming machine of claim 109 wherein the master gaming controller is further designed or configured, after the download of the second game software module, to determine whether the second game software module is compatible with the gaming machine.

\* \* \* \* \*